United States Patent
Li et al.

(10) Patent No.: US 10,893,472 B2
(45) Date of Patent: Jan. 12, 2021

(54) ACCESS POINT AND STATION TO REDUCE ENERGY CONSUMPTION IN DATA TRANSMISSION IN A WIRELESS LOCAL AREA NETWORK BASED UPON WAKEUP PROCEDURES

(71) Applicant: Huawei Technologies Co., Ltd., Guangdong (CN)

(72) Inventors: Bo Li, Xi'an (CN); Mao Yang, Xi'an (CN); Jian Yu, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 83 days.

(21) Appl. No.: 16/047,724

(22) Filed: Jul. 27, 2018

(65) Prior Publication Data

US 2018/0376418 A1 Dec. 27, 2018

Related U.S. Application Data

(63) Continuation of application No. PCT/CN2016/091950, filed on Jul. 27, 2016.

(30) Foreign Application Priority Data

Jan. 29, 2016 (CN) .......................... 2016 1 0070554

(51) Int. Cl.
*H04W 52/02* (2009.01)
*H04W 72/04* (2009.01)
(Continued)

(52) U.S. Cl.
CPC ....... *H04W 52/0216* (2013.01); *H04L 5/0055* (2013.01); *H04W 52/0229* (2013.01);
(Continued)

(58) Field of Classification Search
CPC ......... H04W 52/0216; H04W 52/0229; H04W 72/0446; H04W 74/006; H04W 74/0833;
(Continued)

(56) References Cited

U.S. PATENT DOCUMENTS

2012/0250597 A1 10/2012 Park
2014/0204821 A1* 7/2014 Seok ................. H04W 52/0206
370/311
(Continued)

FOREIGN PATENT DOCUMENTS

CN 102076067 A 5/2011
CN 103096439 A 5/2013
(Continued)

OTHER PUBLICATIONS

Chittabrata Ghosh (INTEL), "Power Save with Random Access", IEEE 802.11-15/1107r0, Sep. 14, 2015, 22 pages, XP068098349.
(Continued)

*Primary Examiner* — Ian N Moore
*Assistant Examiner* — Latresa A McCallum
(74) *Attorney, Agent, or Firm* — Womble Bond Dickinson (US) LLP

(57) ABSTRACT

The present invention relates to the communications field, and in particular, to a method, an access point, and a station for data transmission in a wireless local area network, so as to reduce energy consumption in a data transmission process. In the invention, the STA may not listen to a trigger frame after receiving the first indication information, and wakes up at the first target wakeup moment. In addition, after waking up, the STA does not miss time for listening to the target trigger frame. This reduces energy consumption in a data transmission process.

16 Claims, 16 Drawing Sheets

(51) Int. Cl.
H04W 74/00 (2009.01)
H04L 5/00 (2006.01)
H04W 74/08 (2009.01)
H04W 88/08 (2009.01)
H04W 84/12 (2009.01)

(52) U.S. Cl.
CPC ..... *H04W 72/0446* (2013.01); *H04W 74/006* (2013.01); *H04W 74/0833* (2013.01); *H04W 88/085* (2013.01); *H04W 84/12* (2013.01); *Y02D 30/70* (2020.08)

(58) Field of Classification Search
CPC .. H04W 88/085; H04W 84/12; H04L 5/0055; Y02D 70/14
See application file for complete search history.

(56) References Cited

U.S. PATENT DOCUMENTS

| 2014/0307602 | A1 | 10/2014 | Seok | |
|---|---|---|---|---|
| 2014/0314054 | A1* | 10/2014 | Seok | H04W 8/26 370/336 |
| 2015/0382283 | A1* | 12/2015 | Wang | H04W 52/0216 370/328 |

FOREIGN PATENT DOCUMENTS

| CN | 103348742 A | 10/2013 |
|---|---|---|
| CN | 105025585 A | 11/2015 |
| CN | 105052209 | 11/2015 |

OTHER PUBLICATIONS

Tomoko Adachi et al., (Toshiba Corporation), "Regarding trigger frame in UL MU" IEEE 802.11-15/0608r1, May 10, 2015, 16 pages, XP068094476.

Alfred Asterjadhi et al., "Scheduled Trigger frames", Jul. 4, 2015, 18 pages, XP055414090.

IEEE Std 802.11ac™-2013, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz." 425 pages.

IEEE P802.11ah™/D5.0, Mar. 2015, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation. 632 pages.

IEEE Std 802.11e™-2005, "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 8: Medium Access Control (MAC) Quality of Service Enhancements". Nov. 2005, 211 pages.

IEEE Std 802.11g-2003, "IEEE Standard for Information technologl Telecommunications and information exchange between systems Local and metropolitan area networks Specific requirements, Pad 11: Wireless LAN Medium Access Control (MAC) and Physical Layer (PHY) specifications, Amendment 4: Further Higher Data Rate Extension in the 2.4 GHz Band". 77 pages.

IEEE Std 802.11n-2009, "IEEE Standard for Information technologl Telecommunications and information exchange between systems Local and metropolitan area networks Specific requirements, Part 11: Wireless LAN Medium Access Control (MAC) and Physical Layer (PHY) specifications, Amendment 5: Enhancements for Higher Throughput". Oct. 2009, 536 pages.

* cited by examiner

In the figure: STA is a station, AID is an association identifier, and Data is data

ACCESS POINT AND STATION TO REDUCE ENERGY CONSUMPTION IN DATA TRANSMISSION IN A WIRELESS LOCAL AREA NETWORK BASED UPON WAKEUP PROCEDURES

CROSS-REFERENCE TO RELATED APPLICATIONS

This application is a continuation of International Application No. PCT/CN2016/091950, filed on Jul. 27, 2016, which claims priority to Chinese Patent Application No. 201610070554.8, filed on Jan. 29, 2016. The disclosures of the aforementioned applications are hereby incorporated by reference in their entireties.

TECHNICAL FIELD

Embodiments of the present application relate to the communications field, and in particular, to a method, an access point, and a station for data transmission in a wireless local area network.

BACKGROUND

A wireless local area network (WLAN) technology is a wireless local area network based on the IEEE 802.11 standard, and allows a wireless connection in a local area network environment by using a 2.4 GHz or 5 GHz radio frequency band of a license-free industrial, scientific, and medical (ISM) band. Due to flexible mobility and easy scalability of the wireless local area network, at present, the wireless local area network is widely deployed in homes and enterprises.

Due to a sharp increase of user data and extensive deployment of WLANs, data transmission efficiency is low if an original distributed coordination function (DCF) or enhanced distributed channel access (EDCA) transmission mechanism based on carrier sense multiple access with collision avoidance (CSMA/CA) is used. This cannot be applicable to a future WLAN in a complicated scenario of high-density deployment.

The new-generation standard 802.11ax proposes a multi-user uplink transmission mode triggered by an access point (AP), and further proposes that an AP triggers a plurality of stations (STA) to simultaneously perform contention-based random access based on uplink orthogonal frequency division multiple access (OFDMA). Specifically, in one beacon frame period, the AP successively sends a plurality of trigger frames (TF-R) enabling the STAs to obtain a resource in a contention mode. After detecting the trigger frame, the STA enters the contention mode, obtains the resource through contention in the contention mode, and transmits data on the resource obtained through contention. In another implementation, in an OFDMA system, the AP sends a trigger frame to the STA to indicate configuration information such as a resource preallocated by the AP to the STA. The trigger frame instructs the STA to determine the resource in a scheduling mode. After detecting the trigger frame, the STA determines the resource that is included in the trigger frame and that is preallocated by the AP to the STA, and transmits data on the resource allocated by the AP to the STA.

In the foregoing content, regardless of whether the AP requires the STA to obtain the data frame sending resource in the contention mode or the scheduling mode, the STA needs to continuously listen to every trigger frame sent by the AP. This results in an energy consumption problem.

To sum up, a method, an access point, and a station for data transmission in a wireless local area network are urgently needed, to reduce energy consumption in a data transmission process.

SUMMARY

Embodiments of the present disclosure provide a method, an access point, and a station for data transmission in a wireless local area network, to reduce energy consumption in a data transmission process.

An embodiment of the present disclosure provides a method for data transmission in a wireless local area network, including:

generating, by an access point AP, first indication information when a station STA has a data transmission requirement and the AP accepts the data transmission requirement, where the first indication information includes information used to indicate a first target wakeup moment, and the first target wakeup moment is not later than a sending moment of a target trigger frame that the STA needs to listen to next time, and is not earlier than a sending moment of the first beacon frame in a beacon frame period in which the target trigger frame is sent; and sending, by the AP, the first indication information to the STA.

The AP sends the first indication information to the STA when the STA has the data transmission requirement and the AP accepts the data transmission requirement. The first indication information includes the information used to indicate the first target wakeup moment, and the first target wakeup moment is not later than the sending moment of the target trigger frame that the STA needs to listen to next time, and is not earlier than the sending moment of the first beacon frame in the beacon frame period in which the target trigger frame is sent. Therefore, after receiving the first indication information, the STA may enter a power saving mode, and does not listen to a trigger frame or wake up until the first target wakeup moment. In addition, after waking up, the STA does not miss time for listening to the target trigger frame. This reduces energy consumption in a data transmission process.

Optionally, information about the first target wakeup moment is any one of the following content:

the sending moment of the first beacon frame in the beacon frame period in which the target trigger frame is sent;

a sending moment of the first trigger frame included in a trigger frame subgroup to which the target trigger frame belongs;

the sending moment of the target trigger frame; and the first target wakeup moment.

In this way, the first target wakeup moment is relatively close to the sending moment of the target trigger frame in terms of time, so that the STA wakes up at the sending moment of the target trigger frame or a moment relatively close to the sending moment of the target trigger frame, as far as possible. Therefore, the STA can prolong, as far as possible, duration between a moment at which the first indication information is received and the first target wakeup moment. In other words, the STA prolongs, as far as possible, a time during which the STA is in the power saving mode.

Optionally, when the first target wakeup moment is the sending moment of the first beacon frame in the beacon frame period in which the target trigger frame is sent, the information used to indicate the first target wakeup moment is information capable of indicating a quantity of beacon frame periods between the beacon frame period in which the target trigger frame is sent and a current beacon frame period.

In this way, the STA may determine, based on the quantity of beacon frame periods between the beacon frame period in which the target trigger frame is sent and the current beacon frame period, a beacon frame sending interval that is known to the STA, and a sending moment of a beacon frame that has been sent in the current beacon frame period, the sending moment of the first beacon frame in the beacon frame period in which the target trigger frame is sent.

Optionally, when the first target wakeup moment is the sending moment of the first trigger frame included in the trigger frame subgroup to which the target trigger frame belongs, the information used to indicate the first target wakeup moment is information capable of indicating a quantity of beacon frame periods between the beacon frame period in which the target trigger frame is sent and a current beacon frame period, and information capable of indicating a subgroup identifier of the trigger frame subgroup to which the target trigger frame belongs.

In this way, the STA may determine, based on the quantity of beacon frame periods between the beacon frame period in which the target trigger frame is sent and the current beacon frame period, a beacon frame sending interval that is known to the STA, and a sending moment of a beacon frame that has been sent in the current beacon frame period, the sending moment of the first beacon frame in the beacon frame period in which the target trigger frame is sent, and obtain, in the first beacon frame in the beacon frame period in which the target trigger frame is sent, sending time of all preset trigger frames in the beacon frame period in which the target trigger frame is sent, to obtain the sending moment of the first trigger frame in the trigger frame subgroup corresponding to the subgroup identifier of the trigger frame subgroup in the beacon frame period in which the target trigger frame is sent.

Optionally, when the first target wakeup moment is the sending moment of the target trigger frame, the information used to indicate the first target wakeup moment is information capable of indicating a quantity of beacon frame periods between the beacon frame period in which the target trigger frame is sent and a current beacon frame period, information capable of indicating a subgroup identifier of the trigger frame subgroup to which the target trigger frame belongs, and information capable of indicating a location identifier that represents a sequence number of the target trigger frame in the trigger frame subgroup to which the target trigger frame belongs, where each preset trigger frame in one beacon frame period is corresponding to one trigger frame subgroup, each trigger frame subgroup includes at least one trigger frame, and all trigger frames included in each trigger frame subgroup are corresponding to one subgroup identifier.

In this way, the STA may determine, based on the quantity of beacon frame periods between the beacon frame period in which the target trigger frame is sent and the current beacon frame period, a beacon frame sending interval that is known to the STA, and a sending moment of a beacon frame that has been sent in the current beacon frame period, the sending moment of the first beacon frame in the beacon frame period in which the target trigger frame is sent, and obtain, in the first beacon frame in the beacon frame period in which the target trigger frame is sent, sending time of all preset trigger frames in the beacon frame period in which the target trigger frame is sent, to obtain the sending moment of the first trigger frame in the trigger frame subgroup corresponding to the subgroup identifier of the trigger frame subgroup in the beacon frame period in which the target trigger frame is sent. The STA further determines the sending moment of the target trigger frame based on a sending interval of a trigger frame in each trigger frame subgroup and the location identifier that represents the sequence number of the target trigger frame in the trigger frame subgroup to which the target trigger frame belongs.

Optionally, when the first target wakeup moment is the sending moment of the first trigger frame included in the trigger frame subgroup to which the target trigger frame belongs, if the beacon frame period in which the target trigger frame is sent is the current beacon frame period, the information capable of indicating the quantity of beacon frame periods between the beacon frame period in which the target trigger frame is sent and the current beacon frame period is empty; or when the first target wakeup moment is the sending moment of the target trigger frame, if the beacon frame period in which the target trigger frame is sent is the current beacon frame period and the trigger frame subgroup to which the target trigger frame belongs is a current trigger frame subgroup, the information capable of indicating the quantity of beacon frame periods between the beacon frame period in which the target trigger frame is sent and the current beacon frame period is empty, and the information capable of indicating the subgroup identifier of the trigger frame subgroup to which the target trigger frame belongs is empty.

This can reduce a data volume occupied by the first indication information, and thereby reduce network resource consumption.

Optionally, the first indication information further includes:

information used to indicate a mode in which the STA obtains a target resource, where the target resource is used by the STA after the STA receives the target trigger frame; where the information used to indicate the mode in which the STA obtains the target resource is information that causes the STA to obtain the target resource in a contention mode after receiving the target trigger frame; or the information used to indicate the mode in which the STA obtains the target resource is an identifier of the target resource allocated by the AP to the STA and an identity of the STA, so that the STA obtains, in a scheduling mode after receiving the target trigger frame, the target resource corresponding to the identifier of the target resource.

In this way, the STA can determine the target resource directly based on mode information of the target resource after receiving the target trigger frame, and then send data by using the target resource.

Optionally, when determining not to accept the data transmission requirement of the STA, the AP generates second indication information used to indicate that the AP does not accept the data transmission requirement of the STA; and the AP sends the second indication information to the STA.

In this way, the STA can know that the AP does not accept the data transmission requirement of the STA, and thereby adjust a data transmission policy of the STA when the AP does not accept the data transmission requirement of the STA.

Optionally, the second indication information includes information that indicates a second target wakeup moment as an invalid value; and the second target wakeup moment is any one of the following content:

the sending moment of the first beacon frame in the beacon frame period in which the target trigger frame is sent;

the sending moment of the first trigger frame included in the trigger frame subgroup to which the target trigger frame belongs; and the sending moment of the target trigger frame.

In this way, the STA can be efficiently and conveniently informed that the AP does not accept the data transmission requirement of the STA.

Optionally, when the second target wakeup moment is the sending moment of the first beacon frame in the beacon frame period in which the target trigger frame is sent, the information that indicates the second target wakeup moment as the invalid value is information that indicates, as an invalid value, the quantity of beacon frame periods between the beacon frame period in which the target trigger frame is sent and the current beacon frame period.

In this way, the STA may determine, based on the quantity of beacon frame periods between the beacon frame period in which the target trigger frame is sent and the current beacon frame period, a beacon frame sending interval that is known to the STA, and a sending moment of a beacon frame that has been sent in the current beacon frame period, the sending moment of the first beacon frame in the beacon frame period in which the target trigger frame is sent. When the STA determines that the second target wakeup moment is a past moment, the STA determines that the AP does not accept the data transmission requirement of the STA.

Optionally, when the second target wakeup moment is the sending moment of the first trigger frame included in the trigger frame subgroup to which the target trigger frame belongs, the information that indicates the second target wakeup moment as the invalid value is information that indicates, as an invalid value or a special value, the quantity of beacon frame periods between the beacon frame period in which the target trigger frame is sent and the current beacon frame period, and information that indicates, as an invalid value, the subgroup identifier of the trigger frame subgroup to which the target trigger frame belongs.

In this way, the STA may determine, based on the quantity of beacon frame periods between the beacon frame period in which the target trigger frame is sent and the current beacon frame period, a beacon frame sending interval that is known to the STA, and a sending moment of a beacon frame that has been sent in the current beacon frame period, the sending moment of the first beacon frame in the beacon frame period in which the target trigger frame is sent, and obtain, in the first beacon frame in the beacon frame period in which the target trigger frame is sent, sending time of all preset trigger frames in the beacon frame period in which the target trigger frame is sent, to obtain the sending moment of the first trigger frame in the trigger frame subgroup corresponding to the subgroup identifier of the trigger frame subgroup in the beacon frame period in which the target trigger frame is sent. When the STA determines that the second target wakeup moment is a past moment, the STA determines that the AP does not accept the data transmission requirement of the STA.

Optionally, when the second target wakeup moment is the sending moment of the target trigger frame, the information that indicates the second target wakeup moment as the invalid value is information that indicates, as an invalid value or a special value, the quantity of beacon frame periods between the beacon frame period in which the target trigger frame is sent and the current beacon frame period, information that indicates, as an invalid value or a special value, the subgroup identifier of the trigger frame subgroup to which the target trigger frame belongs, and information that indicates, as an invalid value, the location identifier that represents the sequence number of the target trigger frame in the trigger frame subgroup to which the target trigger frame belongs, where each preset trigger frame in one beacon frame period is corresponding to one trigger frame subgroup, each trigger frame subgroup includes at least one trigger frame, and all trigger frames included in each trigger frame subgroup are corresponding to one subgroup identifier.

In this way, the STA may determine, based on the quantity of beacon frame periods between the beacon frame period in which the target trigger frame is sent and the current beacon frame period, a beacon frame sending interval that is known to the STA, and a sending moment of a beacon frame that has been sent in the current beacon frame period, the sending moment of the first beacon frame in the beacon frame period in which the target trigger frame is sent, and obtain, in the first beacon frame in the beacon frame period in which the target trigger frame is sent, sending time of all preset trigger frames in the beacon frame period in which the target trigger frame is sent, to obtain the sending moment of the first trigger frame in the trigger frame subgroup corresponding to the subgroup identifier of the trigger frame subgroup in the beacon frame period in which the target trigger frame is sent. The STA further determines the sending moment of the target trigger frame based on a sending interval of a trigger frame in each trigger frame subgroup and the location identifier that represents the sequence number of the target trigger frame in the trigger frame subgroup to which the target trigger frame belongs. When the STA determines that the second target wakeup moment is a past moment, the STA determines that the AP does not accept the data transmission requirement of the STA.

Optionally, when the second target wakeup moment is the sending moment of the first trigger frame included in the trigger frame subgroup to which the target trigger frame belongs, the information that indicates, as the special value, the quantity of beacon frame periods between the beacon frame period in which the target trigger frame is sent and the current beacon frame period is empty; or when the second target wakeup moment is the sending moment of the target trigger frame, the information that indicates, as the special value, the quantity of beacon frame periods between the beacon frame period in which the target trigger frame is sent and the current beacon frame period is empty, and/or the information that indicates, as the invalid value, the subgroup identifier of the trigger frame subgroup to which the target trigger frame belongs is empty.

This can reduce a data volume occupied by the first indication information, and thereby reduce network resource consumption.

Optionally, the AP determines, in the following manner, whether to accept the data transmission requirement of the STA:

determining, by the AP, a quantity of times that the STA has a data transmission requirement in a preset time period; and when the determined quantity of times that the STA has a data transmission requirement is not greater than a quantity-of-times threshold, determining, by the AP, to accept the data transmission requirement of the STA; or otherwise, determining not to accept the data transmission requirement of the STA.

This can effectively control a STA that frequently has a data transmission requirement due to a fault or another cause, and therefore can reduce a quantity of times that the STA frequently preempts a resource due to the fault or the another cause. In this way, resources are saved, and network resource consumption is reduced.

Optionally, before the generating, by an AP, first indication information, the method further includes:

sending, by the AP, a source trigger frame to the STA, where the source trigger frame includes an identifier of a source resource that is allocated by the AP to the STA and that is used by the STA when the STA sends a data frame, and the identity of the STA; and the sending, by the AP, the second indication information to the STA specifically includes:

when the AP does not successfully receive, within specified duration after sending the source trigger frame, the data frame transmitted by the STA, adding, by the AP, the second indication information to a negative acknowledgement frame, and sending the negative acknowledgement frame to the STA.

In this way, the second indication information can be sent to the STA by using the negative acknowledgement frame, and the second indication information does not need to be sent separately. This reduces signaling overheads, and is better compatible with the prior art.

Optionally, before the generating, by an AP, first indication information, the method further includes:

sending, by the AP, a source trigger frame to the STA, where the source trigger frame includes an identifier of a source resource that is allocated by the AP to the STA and that is used by the STA when the STA sends a data frame, and the identity of the STA; and the sending, by the AP, the first indication information to the STA specifically includes:

when the AP does not successfully receive, within specified duration after sending the source trigger frame, the data frame transmitted by the STA, adding, by the AP, the first indication information to a negative acknowledgement frame, and sending the negative acknowledgement frame to the STA.

In this way, the first indication information can be sent to the STA by using the negative acknowledgement frame, and the first indication information does not need to be sent separately. This reduces signaling overheads, and is better compatible with the prior art.

Optionally, the sending, by the AP, the second indication information to the STA specifically includes:

when successfully receiving the data frame transmitted by the STA, adding, by the AP, the second indication information to an acknowledgement frame, and sending the acknowledgement frame to the STA.

In this way, the second indication information can be sent to the STA by using the acknowledgement frame, and the second indication information does not need to be sent separately. This reduces signaling overheads, and is better compatible with the prior art.

Optionally, the sending, by the AP, the first indication information to the STA specifically includes:

when successfully receiving the data frame transmitted by the STA, adding, by the AP, the first indication information to an acknowledgement frame, and sending the acknowledgement frame to the STA.

In this way, the first indication information can be sent to the STA by using the acknowledgement frame, and the first indication information does not need to be sent separately. This reduces signaling overheads, and is better compatible with the prior art.

Optionally, before the generating, by an AP, first indication information, the method further includes:

receiving, by the AP, third indication information that is sent by the STA and that is used to indicate that the STA has the data transmission requirement; and when successfully receiving the third indication information, determining, by the AP, that the STA has the data transmission requirement.

In this way, when the STA has data to transmit, that is, has a data transmission requirement, the STA may send the third indication information to the AP, so that the AP quickly and accurately determines that the STA has the data transmission requirement.

Optionally, the third indication information is any one or more of the following content:

indication information on a newly added random access request flag bit RAR in the data frame;

indication information in a more data field (More Data Field) in the data frame; and indication information in a buffer (Buffer) field in the data frame.

In this way, the third indication information can be transmitted by using the data frame, instead of being sent separately by using another signaling message. This reduces signaling overheads, and reduces resource consumption.

Optionally, the method further includes:

sending, by the AP to the STA, the target trigger frame that the STA needs to listen to next time, where the target trigger frame includes information that causes the STA to obtain a target resource in a contention mode after receiving the target trigger frame, where the target trigger frame is used to cause the STA to obtain the target resource through contention by using N backoff processes, N is an integer greater than or equal to 1, one backoff process is corresponding to one beacon frame period, one beacon frame period is corresponding to information about one minimum contention window and one maximum contention window, the minimum contention window and the maximum contention window are two numbers greater than or equal to 0, and the maximum contention window is greater than the minimum contention window; and for the $i^{th}$ backoff process in the N backoff processes, where i is an integer greater than 1 and less than or equal to N, performing the following operations:

when determining that, in the $(i-1)^{th}$ backoff process, a value of a backoff counter still does not decrease to 0 when the STA receives the first trigger frame in a next beacon frame period of a beacon frame period corresponding to the $(i-1)^{th}$ backoff process, starting, by the STA, the $i^{th}$ backoff process, and updating the value of the backoff counter by using a calculated backoff value corresponding to the $i^{th}$ backoff process, where the value of the backoff counter decreases by 1 when a resource that can be randomly accessed is received; and the backoff value corresponding to the $i^{th}$ backoff process is calculated by using the following formula:

$$Bocurr = \min[Bopre, rand[0, CWO-1]], \text{ where}$$

Bocurr is the backoff value corresponding to the $i^{th}$ backoff process;

Bopre is a value of the backoff counter read when the STA receives the first trigger frame in the next beacon frame period of the beacon frame period corresponding to the $(i-1)^{th}$ backoff process;

CWO is a random integer in a minimum contention window and a maximum contention window that are corresponding to a beacon frame period corresponding to the $i^{th}$ backoff process;

rand[0, CWO−1] represents a random integer between 0 and (CWO−1); and min[Bopre, rand[0, CWO−1]] represents a smaller number in Bopre and rand[0, CWO−1].

It can be learned that an advantage of the foregoing method lies in the following: When there are a large quantity of active STAs in a WLAN, a plurality of random resource access attempts made by a STA are likely to fail. As a result, a value of a backoff counter multiplies. In this case, for a STA that does not successfully back off to 0 in a beacon frame period and needs to start a next backoff process in a next beacon frame period, the method provided in this embodiment of the present disclosure is used, so that in the started next backoff process, an initial value of the backoff counter is a smaller value of a remaining value of the backoff counter in a current backoff process and an initial value calculated by the backoff counter in the next backoff process. This avoids a problem in the prior art that a backoff window multiplies when a new backoff process is started, but achieves an objective of minimizing a backoff window in a next backoff process for a STA that has started a backoff process, and improves resource access efficiency of the STA that has started a backoff process.

An embodiment of the present disclosure provides a method for data transmission in a wireless local area network, including:

receiving, by a station STA, first indication information sent by an access point AP, where the first indication information is generated by the AP when the STA has a data transmission requirement and the AP accepts the data transmission requirement, the first indication information includes information used to indicate a first target wakeup moment, and the first target wakeup moment is not later than a sending moment of a target trigger frame that the STA needs to listen to next time, and is not earlier than a sending moment of the first beacon frame in a beacon frame period in which the target trigger frame is sent; and waking up, by the STA, at the first target wakeup moment, and listening to the target trigger frame.

The AP sends the first indication information to the STA when the STA has the data transmission requirement and the AP accepts the data transmission requirement. The first indication information includes the information used to indicate the first target wakeup moment, and the first target wakeup moment is not later than the sending moment of the target trigger frame that the STA needs to listen to next time, and is not earlier than the sending moment of the first beacon frame in the beacon frame period in which the target trigger frame is sent. Therefore, after receiving the first indication information, the STA may enter a power saving mode, and does not listen to a trigger frame or wake up until the first target wakeup moment. In addition, after waking up, the STA does not miss time for listening to the target trigger frame. This reduces energy consumption in a data transmission process.

Optionally, information about the first target wakeup moment is any one of the following content:

the sending moment of the first beacon frame in the beacon frame period in which the target trigger frame is sent;

a sending moment of the first trigger frame included in a trigger frame subgroup to which the target trigger frame belongs;

the sending moment of the target trigger frame; and the first target wakeup moment.

In this way, the first target wakeup moment is relatively close to the sending moment of the target trigger frame in terms of time, so that the STA wakes up at the sending moment of the target trigger frame or a moment relatively close to the sending moment of the target trigger frame, as far as possible. Therefore, the STA can prolong, as far as possible, duration between a moment at which the first indication information is received and the first target wakeup moment. In other words, the STA prolongs, as far as possible, a time during which the STA is in the power saving mode.

Optionally, when the first target wakeup moment is the sending moment of the first beacon frame in the beacon frame period in which the target trigger frame is sent, the information used to indicate the first target wakeup moment is information capable of indicating a quantity of beacon frame periods between the beacon frame period in which the target trigger frame is sent and a current beacon frame period.

In this way, the STA may determine, based on the quantity of beacon frame periods between the beacon frame period in which the target trigger frame is sent and the current beacon frame period, a beacon frame sending interval that is known to the STA, and a sending moment of a beacon frame that has been sent in the current beacon frame period, the sending moment of the first beacon frame in the beacon frame period in which the target trigger frame is sent.

Optionally, when the first target wakeup moment is the sending moment of the first trigger frame included in the trigger frame subgroup to which the target trigger frame belongs, the information used to indicate the first target wakeup moment is information capable of indicating a quantity of beacon frame periods between the beacon frame period in which the target trigger frame is sent and a current beacon frame period, and information capable of indicating a subgroup identifier of the trigger frame subgroup to which the target trigger frame belongs.

In this way, the STA may determine, based on the quantity of beacon frame periods between the beacon frame period in which the target trigger frame is sent and the current beacon frame period, a beacon frame sending interval that is known to the STA, and a sending moment of a beacon frame that has been sent in the current beacon frame period, the sending moment of the first beacon frame in the beacon frame period in which the target trigger frame is sent, and obtain, in the first beacon frame in the beacon frame period in which the target trigger frame is sent, sending time of all preset trigger frames in the beacon frame period in which the target trigger frame is sent, to obtain the sending moment of the first trigger frame in the trigger frame subgroup corresponding to the subgroup identifier of the trigger frame subgroup in the beacon frame period in which the target trigger frame is sent.

Optionally, when the first target wakeup moment is the sending moment of the target trigger frame, the information used to indicate the first target wakeup moment is information capable of indicating a quantity of beacon frame periods between the beacon frame period in which the target trigger frame is sent and a current beacon frame period, information capable of indicating a subgroup identifier of the trigger frame subgroup to which the target trigger frame belongs, and information capable of indicating a location identifier that represents a sequence number of the target trigger frame in the trigger frame subgroup to which the target trigger frame belongs, where each preset trigger frame in one beacon frame period is corresponding to one trigger frame subgroup, each trigger frame subgroup includes at least one trigger frame, and all trigger frames included in each trigger frame subgroup are corresponding to one subgroup identifier.

In this way, the STA may determine, based on the quantity of beacon frame periods between the beacon frame period in which the target trigger frame is sent and the current beacon frame period, a beacon frame sending interval that is known to the STA, and a sending moment of a beacon frame that has been sent in the current beacon frame period, the sending moment of the first beacon frame in the beacon frame period in which the target trigger frame is sent, and obtain, in the first beacon frame in the beacon frame period in which the target trigger frame is sent, sending time of all preset trigger frames in the beacon frame period in which the target trigger frame is sent, to obtain the sending moment of the first trigger frame in the trigger frame subgroup corresponding to the subgroup identifier of the trigger frame subgroup in the beacon frame period in which the target trigger frame is sent. The STA further determines the sending moment of the target trigger frame based on a sending interval of a trigger frame in each trigger frame subgroup and the location identifier that represents the sequence number of the target trigger frame in the trigger frame subgroup to which the target trigger frame belongs.

Optionally, when the first target wakeup moment is the sending moment of the first trigger frame included in the trigger frame subgroup to which the target trigger frame belongs, if the beacon frame period in which the target trigger frame is sent is the current beacon frame period, the information capable of indicating the quantity of beacon frame periods between the beacon frame period in which the target trigger frame is sent and the current beacon frame period is empty; or when the first target wakeup moment is the sending moment of the target trigger frame, if the beacon frame period in which the target trigger frame is sent is the current beacon frame period and the trigger frame subgroup to which the target trigger frame belongs is a current trigger frame subgroup, the information capable of indicating the quantity of beacon frame periods between the beacon frame period in which the target trigger frame is sent and the current beacon frame period is empty, and the information capable of indicating the subgroup identifier of the trigger frame subgroup to which the target trigger frame belongs is empty.

This can reduce a data volume occupied by the first indication information, and thereby reduce network resource consumption.

Optionally, the first indication information further includes:

information used to indicate a mode in which the STA obtains a target resource, where the target resource is used by the STA after the STA receives the target trigger frame; where the information used to indicate the mode in which the STA obtains the target resource is information that causes the STA to obtain the target resource in a contention mode after receiving the target trigger frame; or the information used to indicate the mode in which the STA obtains the target resource is an identifier of the target resource allocated by the AP to the STA and an identity of the STA, so that the STA obtains, in a scheduling mode after receiving the target trigger frame, the target resource corresponding to the identifier of the target resource.

In this way, the STA can determine the target resource directly based on mode information of the target resource after receiving the target trigger frame, and then send data by using the target resource.

Optionally, the method further includes:

receiving, by the STA, second indication information that is sent by the AP and that is used to indicate that the AP does not accept the data transmission requirement of the STA, where the second indication information is generated by the AP when the AP determines not to accept the data transmission requirement of the STA.

In this way, the STA can know that the AP does not accept the data transmission requirement of the STA, and thereby adjust a data transmission policy of the STA when the AP does not accept the data transmission requirement of the STA.

Optionally, the second indication information includes information that indicates a second target wakeup moment as an invalid value; and the second target wakeup moment is any one of the following content:

the sending moment of the first beacon frame in the beacon frame period in which the target trigger frame is sent;

the sending moment of the first trigger frame included in the trigger frame subgroup to which the target trigger frame belongs; and the sending moment of the target trigger frame.

In this way, the STA can be efficiently and conveniently informed that the AP does not accept the data transmission requirement of the STA.

Optionally, when the second target wakeup moment is the sending moment of the first beacon frame in the beacon frame period in which the target trigger frame is sent, the information that indicates the second target wakeup moment as the invalid value is information that indicates, as an invalid value, the quantity of beacon frame periods between the beacon frame period in which the target trigger frame is sent and the current beacon frame period.

In this way, the STA may determine, based on the quantity of beacon frame periods between the beacon frame period in which the target trigger frame is sent and the current beacon frame period, a beacon frame sending interval that is known to the STA, and a sending moment of a beacon frame that has been sent in the current beacon frame period, the sending moment of the first beacon frame in the beacon frame period in which the target trigger frame is sent. When the STA determines that the second target wakeup moment is a past moment, the STA determines that the AP does not accept the data transmission requirement of the STA.

Optionally, when the second target wakeup moment is the sending moment of the first trigger frame included in the trigger frame subgroup to which the target trigger frame belongs, the information that indicates the second target wakeup moment as the invalid value is information that indicates, as an invalid value or a special value, the quantity of beacon frame periods between the beacon frame period in which the target trigger frame is sent and the current beacon frame period, and information that indicates, as an invalid value, the subgroup identifier of the trigger frame subgroup to which the target trigger frame belongs.

In this way, the STA may determine, based on the quantity of beacon frame periods between the beacon frame period in which the target trigger frame is sent and the current beacon frame period, a beacon frame sending interval that is known to the STA, and a sending moment of a beacon frame that has been sent in the current beacon frame period, the sending moment of the first beacon frame in the beacon frame period in which the target trigger frame is sent, and obtain, in the first beacon frame in the beacon frame period in which the target trigger frame is sent, sending time of all preset trigger frames in the beacon frame period in which the target trigger frame is sent, to obtain the sending moment of the first trigger frame in the trigger frame subgroup corresponding to the subgroup identifier of the trigger frame subgroup in the beacon frame period in which the target trigger frame is sent. When the STA determines that the second target wakeup moment is a past moment, the STA determines that the AP does not accept the data transmission requirement of the STA.

Optionally, when the second target wakeup moment is the sending moment of the target trigger frame, the information that indicates the second target wakeup moment as the invalid value is information that indicates, as an invalid value or a special value, the quantity of beacon frame periods between the beacon frame period in which the target trigger frame is sent and the current beacon frame period, information that indicates, as an invalid value or a special value, the subgroup identifier of the trigger frame subgroup to which the target trigger frame belongs, and information that indicates, as an invalid value, the location identifier that represents the sequence number of the target trigger frame in the trigger frame subgroup to which the target trigger frame belongs, where each preset trigger frame in one beacon frame period is corresponding to one trigger frame subgroup, each trigger frame subgroup includes at least one trigger frame, and all trigger frames included in each trigger frame subgroup are corresponding to one subgroup identifier.

In this way, the STA may determine, based on the quantity of beacon frame periods between the beacon frame period in which the target trigger frame is sent and the current beacon frame period, a beacon frame sending interval that is known to the STA, and a sending moment of a beacon frame that has been sent in the current beacon frame period, the sending moment of the first beacon frame in the beacon frame period in which the target trigger frame is sent, and obtain, in the first beacon frame in the beacon frame period in which the target trigger frame is sent, sending time of all preset trigger frames in the beacon frame period in which the target trigger frame is sent, to obtain the sending moment of the first trigger frame in the trigger frame subgroup corresponding to the subgroup identifier of the trigger frame subgroup in the beacon frame period in which the target trigger frame is sent. The STA further determines the sending moment of the target trigger frame based on a sending interval of a trigger frame in each trigger frame subgroup and the location identifier that represents the sequence number of the target trigger frame in the trigger frame subgroup to which the target trigger frame belongs. When the STA determines that the second target wakeup moment is a past moment, the STA determines that the AP does not accept the data transmission requirement of the STA.

Optionally, when the second target wakeup moment is the sending moment of the first trigger frame included in the trigger frame subgroup to which the target trigger frame belongs, the information that indicates, as the invalid value, the quantity of beacon frame periods between the beacon frame period in which the target trigger frame is sent and the current beacon frame period is empty; or when the second target wakeup moment is the sending moment of the target trigger frame, the information that indicates, as the invalid value, the quantity of beacon frame periods between the beacon frame period in which the target trigger frame is sent and the current beacon frame period is empty, and/or the information that indicates, as the invalid value, the subgroup identifier of the trigger frame subgroup to which the target trigger frame belongs is empty.

This can reduce a data volume occupied by the first indication information, and thereby reduce network resource consumption.

Optionally, before the receiving, by a STA, first indication information sent by an AP, the method further includes:

receiving, by the STA, a source trigger frame sent by the AP, where the source trigger frame includes an identifier of a source resource that is allocated by the AP to the STA and that is used by the STA when the STA sends a data frame, and the identity of the STA; and sending, by the STA, the data frame to the AP by using the source resource corresponding to the identifier of the source resource in the source trigger frame; and the receiving, by the STA, second indication information sent by the AP specifically includes:

receiving, by the STA, a negative acknowledgement frame sent by the AP, where the negative acknowledgement frame is sent by the AP when the AP does not successfully receive, within specified duration after sending the source trigger frame, the data frame transmitted by the STA, and the negative acknowledgement frame includes the second indication information.

In this way, the second indication information can be sent to the STA by using the negative acknowledgement frame, and the second indication information does not need to be sent separately. This reduces signaling overheads, and is better compatible with the prior art.

Optionally, before the receiving, by a STA, first indication information sent by an AP, the method further includes:

receiving, by the STA, a source trigger frame sent by the AP, where the source trigger frame includes an identifier of a source resource that is allocated by the AP to the STA and that is used by the STA when the STA sends a data frame, and the identity of the STA; and sending, by the STA, the data frame to the AP by using the source resource corresponding to the identifier of the source resource in the source trigger frame; and the receiving, by a STA, first indication information sent by an AP specifically includes:

receiving, by the STA, a negative acknowledgement frame sent by the AP, where the negative acknowledgement frame is sent by the AP when the AP does not successfully receive, within specified duration after sending the source trigger frame, the data frame transmitted by the STA, and the negative acknowledgement frame includes the first indication information.

In this way, the first indication information can be sent to the STA by using the negative acknowledgement frame, and the first indication information does not need to be sent separately. This reduces signaling overheads, and is better compatible with the prior art.

Optionally, before the AP generates the first indication information, the method further includes:

sending, by the STA, the data frame to the AP; and the receiving, by the STA, second indication information sent by the AP specifically includes:

receiving, by the STA, an acknowledgement frame sent by the AP, where the acknowledgement frame is sent by the AP when the AP successfully receives the data frame transmitted by the STA, and the acknowledgement frame includes the second indication information.

In this way, the second indication information can be sent to the STA by using the acknowledgement frame, and the second indication information does not need to be sent separately. This reduces signaling overheads, and is better compatible with the prior art.

Optionally, before the AP generates the first indication information, the method further includes:

sending, by the STA, the data frame to the AP; and the receiving, by a STA, first indication information sent by an AP specifically includes:

receiving, by the STA, an acknowledgement frame sent by the AP, where the acknowledgement frame is sent by the AP when the AP successfully receives the data frame transmitted by the STA, and the acknowledgement frame includes the first indication information.

In this way, the first indication information can be sent to the STA by using the acknowledgement frame, and the first indication information does not need to be sent separately. This reduces signaling overheads, and is better compatible with the prior art.

Optionally, before the receiving, by a STA, first indication information sent by an AP, the method further includes:

sending, by the STA to the AP, third indication information used to indicate that the STA has the data transmission requirement, so that the AP determines, when successfully receiving the third indication information, that the STA has the data transmission requirement.

In this way, when the STA has data to transmit, that is, has a data transmission requirement, the STA may send the third indication information to the AP, so that the AP quickly and accurately determines that the STA has the data transmission requirement.

Optionally, the third indication information is any one or more of the following content:

indication information on a newly added random access request flag bit RAR in the data frame;

indication information in a more data field (More Data Field) in the data frame; and indication information in a buffer (Buffer) field in the data frame.

In this way, the third indication information can be transmitted by using the data frame, instead of being sent separately by using another signaling message. This reduces signaling overheads, and reduces resource consumption.

An embodiment of the present disclosure provides an access point AP for data transmission in a wireless local area network, including:

a processing unit, configured to generate first indication information when a station STA has a data transmission requirement and the AP accepts the data transmission requirement, where the first indication information includes information used to indicate a first target wakeup moment, and the first target wakeup moment is not later than a sending moment of a target trigger frame that the STA needs to listen to next time, and is not earlier than a sending moment of the first beacon frame in a beacon frame period in which the target trigger frame is sent; and a sending unit, configured to send the first indication information to the STA.

The AP sends the first indication information to the STA when the STA has the data transmission requirement and the AP accepts the data transmission requirement. The first indication information includes the information used to indicate the first target wakeup moment, and the first target wakeup moment is not later than the sending moment of the target trigger frame that the STA needs to listen to next time, and is not earlier than the sending moment of the first beacon frame in the beacon frame period in which the target trigger frame is sent. Therefore, after receiving the first indication information, the STA may enter a power saving mode, and does not listen to a trigger frame or wake up until the first target wakeup moment. In addition, after waking up, the STA does not miss time for listening to the target trigger frame. This reduces energy consumption in a data transmission process.

Optionally, information about the first target wakeup moment is any one of the following content:

the sending moment of the first beacon frame in the beacon frame period in which the target trigger frame is sent;

a sending moment of the first trigger frame included in a trigger frame subgroup to which the target trigger frame belongs;

the sending moment of the target trigger frame; and the first target wakeup moment.

Optionally, when the first target wakeup moment is the sending moment of the first beacon frame in the beacon frame period in which the target trigger frame is sent, the information used to indicate the first target wakeup moment is information capable of indicating a quantity of beacon frame periods between the beacon frame period in which the target trigger frame is sent and a current beacon frame period;

when the first target wakeup moment is the sending moment of the first trigger frame included in the trigger frame subgroup to which the target trigger frame belongs, the information used to indicate the first target wakeup moment is information capable of indicating a quantity of beacon frame periods between the beacon frame period in which the target trigger frame is sent and a current beacon frame period, and information capable of indicating a subgroup identifier of the trigger frame subgroup to which the target trigger frame belongs; or when the first target wakeup moment is the sending moment of the target trigger frame, the information used to indicate the first target wakeup moment is information capable of indicating a quantity of beacon frame periods between the beacon frame period in which the target trigger frame is sent and a current beacon frame period, information capable of indicating a subgroup identifier of the trigger frame subgroup to which the target trigger frame belongs, and information capable of indicating a location identifier that represents a sequence number of the target trigger frame in the trigger frame subgroup to which the target trigger frame belongs, where each preset trigger frame in one beacon frame period is corresponding to one trigger frame subgroup, each trigger frame subgroup includes at least one trigger frame, and all trigger frames included in each trigger frame subgroup are corresponding to one subgroup identifier.

Optionally, when the first target wakeup moment is the sending moment of the first trigger frame included in the trigger frame subgroup to which the target trigger frame belongs, if the beacon frame period in which the target trigger frame is sent is the current beacon frame period, the information capable of indicating the quantity of beacon frame periods between the beacon frame period in which the target trigger frame is sent and the current beacon frame period is empty; or when the first target wakeup moment is the sending moment of the target trigger frame, if the beacon frame period in which the target trigger frame is sent is the current beacon frame period and the trigger frame subgroup to which the target trigger frame belongs is a current trigger frame subgroup, the information capable of indicating the quantity of beacon frame periods between the beacon frame period in which the target trigger frame is sent and the current beacon frame period is empty, and the information capable of indicating the subgroup identifier of the trigger frame subgroup to which the target trigger frame belongs is empty.

Optionally, the first indication information further includes:

information used to indicate a mode in which the STA obtains a target resource, where the target resource is used by the STA after the STA receives the target trigger frame; where the information used to indicate the mode in which the STA obtains the target resource is information that causes the STA to obtain the target resource in a contention mode after receiving the target trigger frame; or the information used to indicate the mode in which the STA obtains the target resource is an identifier of the target resource allocated by the AP to the STA and an identity of the STA, so that the STA obtains, in a scheduling mode after receiving the target trigger frame, the target resource corresponding to the identifier of the target resource.

Optionally, the processing unit is further configured to:

when determining not to accept the data transmission requirement of the STA, generate second indication information used to indicate that the AP does not accept the data transmission requirement of the STA; and the sending unit is further configured to:

send the second indication information to the STA.

Optionally, the second indication information includes information that indicates a second target wakeup moment as an invalid value; and the second target wakeup moment is any one of the following content:

the sending moment of the first beacon frame in the beacon frame period in which the target trigger frame is sent;

the sending moment of the first trigger frame included in the trigger frame subgroup to which the target trigger frame belongs; and the sending moment of the target trigger frame.

Optionally, when the second target wakeup moment is the sending moment of the first beacon frame in the beacon frame period in which the target trigger frame is sent, the information that indicates the second target wakeup moment as the invalid value is information that indicates, as an invalid value, the quantity of beacon frame periods between the beacon frame period in which the target trigger frame is sent and the current beacon frame period;

when the second target wakeup moment is the sending moment of the first trigger frame included in the trigger frame subgroup to which the target trigger frame belongs, the information that indicates the second target wakeup moment as the invalid value is information that indicates, as an invalid value or a special value, the quantity of beacon frame periods between the beacon frame period in which the target trigger frame is sent and the current beacon frame period, and information that indicates, as an invalid value, the subgroup identifier of the trigger frame subgroup to which the target trigger frame belongs; or when the second target wakeup moment is the sending moment of the target trigger frame, the information that indicates the second target wakeup moment as the invalid value is information that indicates, as an invalid value or a special value, the quantity of beacon frame periods between the beacon frame period in which the target trigger frame is sent and the current beacon frame period, information that indicates, as an invalid value or a special value, the subgroup identifier of the trigger frame subgroup to which the target trigger frame belongs, and information that indicates, as an invalid value, the location identifier that represents the sequence number of the target trigger frame in the trigger frame subgroup to which the target trigger frame belongs, where each preset trigger frame in one beacon frame period is corresponding to one trigger frame subgroup, each trigger frame subgroup includes at least one trigger frame, and all trigger frames included in each trigger frame subgroup are corresponding to one subgroup identifier.

Optionally, when the second target wakeup moment is the sending moment of the first trigger frame included in the trigger frame subgroup to which the target trigger frame belongs, the information that indicates, as the special value, the quantity of beacon frame periods between the beacon frame period in which the target trigger frame is sent and the current beacon frame period is empty; or when the second target wakeup moment is the sending moment of the target trigger frame, the information that indicates, as the special value, the quantity of beacon frame periods between the beacon frame period in which the target trigger frame is sent and the current beacon frame period is empty, and/or the information that indicates, as the invalid value, the subgroup identifier of the trigger frame subgroup to which the target trigger frame belongs is empty.

Optionally, the processing unit is further configured to:

determine a quantity of times that the STA has a data transmission requirement in a preset time period; and when the determined quantity of times that the STA has a data transmission requirement is not greater than a quantity-of-times threshold, determine to accept the data transmission requirement of the STA; or otherwise, determine not to accept the data transmission requirement of the STA.

Optionally, the sending unit is further configured to:

send a source trigger frame to the STA, where the source trigger frame includes an identifier of a source resource that is allocated by the AP to the STA and that is used by the STA when the STA sends a data frame, and the identity of the STA; and send a negative acknowledgement frame to the STA; and the processing unit is further configured to:

when the data frame transmitted by the STA is not successfully received within specified duration after the source trigger frame is sent, add the second indication information to the negative acknowledgement frame.

Optionally, the sending unit is further configured to:

send a source trigger frame to the STA, where the source trigger frame includes an identifier of a source resource that is allocated by the AP to the STA and that is used by the STA when the STA sends a data frame, and the identity of the STA; and send a negative acknowledgement frame to the STA; and the processing unit is further configured to:

when the data frame transmitted by the STA is not successfully received within specified duration after the source trigger frame is sent, add the first indication information to the negative acknowledgement frame.

Optionally, the processing unit is further configured to:

when the data frame transmitted by the STA is successfully received, add the second indication information to an acknowledgement frame; and the sending unit is further configured to:

send the acknowledgement frame to the STA.

Optionally, the processing unit is further configured to:

when the data frame transmitted by the STA is successfully received, add the first indication information to an acknowledgement frame; and the sending unit is further configured to:

send the acknowledgement frame to the STA.

Optionally, the AP further includes a receiving unit, configured to:

receive third indication information that is sent by the STA and that is used to indicate that the STA has the data transmission requirement; and the processing unit is specifically configured to:

when the third indication information is successfully received, determine that the STA has the data transmission requirement.

Optionally, the third indication information is any one or more of the following content:

indication information on a newly added random access request flag bit RAR in the data frame;

indication information in a more data field (More Data Field) in the data frame; and indication information in a buffer (Buffer) field in the data frame.

An embodiment of the present disclosure provides a station STA for data transmission in a wireless local area network, including:

a receiving unit, configured to receive first indication information sent by an access point AP, where the first indication information is generated by the AP when the STA has a data transmission requirement and the AP accepts the data transmission requirement, the first indication information includes information used to indicate a first target wakeup moment, and the first target wakeup moment is not later than a sending moment of a target trigger frame that the STA needs to listen to next time, and is not earlier than a sending moment of the first beacon frame in a beacon frame period in which the target trigger frame is sent; and a processing unit, configured to make the STA wake up at the first target wakeup moment and listen to the target trigger frame.

The AP sends the first indication information to the STA when the STA has the data transmission requirement and the AP accepts the data transmission requirement. The first indication information includes the information used to indicate the first target wakeup moment, and the first target wakeup moment is not later than the sending moment of the target trigger frame that the STA needs to listen to next time, and is not earlier than the sending moment of the first beacon frame in the beacon frame period in which the target trigger frame is sent. Therefore, after receiving the first indication information, the STA may enter a power saving mode, and does not listen to a trigger frame or wake up until the first target wakeup moment. In addition, after waking up, the STA does not miss time for listening to the target trigger frame. This reduces energy consumption in a data transmission process.

Optionally, information about the first target wakeup moment is any one of the following content:

the sending moment of the first beacon frame in the beacon frame period in which the target trigger frame is sent;

a sending moment of the first trigger frame included in a trigger frame subgroup to which the target trigger frame belongs;

the sending moment of the target trigger frame; and the first target wakeup moment.

Optionally, when the first target wakeup moment is the sending moment of the first beacon frame in the beacon frame period in which the target trigger frame is sent, the information used to indicate the first target wakeup moment is information capable of indicating a quantity of beacon frame periods between the beacon frame period in which the target trigger frame is sent and a current beacon frame period;

when the first target wakeup moment is the sending moment of the first trigger frame included in the trigger frame subgroup to which the target trigger frame belongs, the information used to indicate the first target wakeup moment is information capable of indicating a quantity of beacon frame periods between the beacon frame period in which the target trigger frame is sent and a current beacon frame period, and information capable of indicating a subgroup identifier of the trigger frame subgroup to which the target trigger frame belongs; or when the first target wakeup moment is the sending moment of the target trigger frame, the information used to indicate the first target wakeup moment is information capable of indicating a quantity of beacon frame periods between the beacon frame period in which the target trigger frame is sent and a current beacon frame period, information capable of indicating a subgroup identifier of the trigger frame subgroup to which the target trigger frame belongs, and information capable of indicating a location identifier that represents a sequence number of the target trigger frame in the trigger frame subgroup to which the target trigger frame belongs, where each preset trigger frame in one beacon frame period is corresponding to one trigger frame subgroup, each trigger frame subgroup includes at least one trigger frame, and all trigger frames included in each trigger frame subgroup are corresponding to one subgroup identifier.

Optionally, when the first target wakeup moment is the sending moment of the first trigger frame included in the trigger frame subgroup to which the target trigger frame belongs, if the beacon frame period in which the target trigger frame is sent is the current beacon frame period, the information capable of indicating the quantity of beacon frame periods between the beacon frame period in which the target trigger frame is sent and the current beacon frame period is empty; or when the first target wakeup moment is the sending moment of the target trigger frame, if the beacon frame period in which the target trigger frame is sent is the current beacon frame period and the trigger frame subgroup to which the target trigger frame belongs is a current trigger frame subgroup, the information capable of indicating the quantity of beacon frame periods between the beacon frame period in which the target trigger frame is sent and the current beacon frame period is empty, and the information capable of indicating the subgroup identifier of the trigger frame subgroup to which the target trigger frame belongs is empty.

Optionally, the first indication information further includes:

information used to indicate a mode in which the STA obtains a target resource, where the target resource is used by the STA after the STA receives the target trigger frame; where the information used to indicate the mode in which the STA obtains the target resource is information that causes the STA to obtain the target resource in a contention mode after receiving the target trigger frame; or the information used to indicate the mode in which the STA obtains the target resource is an identifier of the target resource allocated by the AP to the STA and an identity of the STA, so that the STA obtains, in a scheduling mode after receiving the target trigger frame, the target resource corresponding to the identifier of the target resource.

Optionally, the receiving unit is further configured to:

receive second indication information that is sent by the AP and that is used to indicate that the AP does not accept the data transmission requirement of the STA, where the second indication information is generated by the AP when the AP determines not to accept the data transmission requirement of the STA.

Optionally, the second indication information includes information that indicates a second target wakeup moment as an invalid value; and the second target wakeup moment is any one of the following content:

the sending moment of the first beacon frame in the beacon frame period in which the target trigger frame is sent;

the sending moment of the first trigger frame included in the trigger frame subgroup to which the target trigger frame belongs; and the sending moment of the target trigger frame.

Optionally, when the second target wakeup moment is the sending moment of the first beacon frame in the beacon frame period in which the target trigger frame is sent, the information that indicates the second target wakeup moment as the invalid value is information that indicates, as an invalid value, the quantity of beacon frame periods between the beacon frame period in which the target trigger frame is sent and the current beacon frame period;

when the second target wakeup moment is the sending moment of the first trigger frame included in the trigger frame subgroup to which the target trigger frame belongs, the information that indicates the second target wakeup moment as the invalid value is information that indicates, as an invalid value or a special value, the quantity of beacon frame periods between the beacon frame period in which the target trigger frame is sent and the current beacon frame period, and information that indicates, as an invalid value, the subgroup identifier of the trigger frame subgroup to which the target trigger frame belongs; or when the second target wakeup moment is the sending moment of the target trigger frame, the information that indicates the second target wakeup moment as the invalid value is information that indicates, as an invalid value or a special value, the quantity of beacon frame periods between the beacon frame period in which the target trigger frame is sent and the current beacon frame period, information that indicates, as an invalid value or a special value, the subgroup identifier of the trigger frame subgroup to which the target trigger frame belongs, and information that indicates, as an invalid value, the location identifier that represents the sequence number of the target trigger frame in the trigger frame subgroup to which the target trigger frame belongs, where each preset trigger frame in one beacon frame period is corresponding to one trigger frame subgroup, each trigger frame subgroup includes at least one trigger frame, and all trigger frames included in each trigger frame subgroup are corresponding to one subgroup identifier.

Optionally, when the second target wakeup moment is the sending moment of the first trigger frame included in the trigger frame subgroup to which the target trigger frame belongs, the information that indicates, as the invalid value, the quantity of beacon frame periods between the beacon frame period in which the target trigger frame is sent and the current beacon frame period is empty; or when the second target wakeup moment is the sending moment of the target trigger frame, the information that indicates, as the invalid value, the quantity of beacon frame periods between the beacon frame period in which the target trigger frame is sent and the current beacon frame period is empty, and/or the information that indicates, as the invalid value, the subgroup identifier of the trigger frame subgroup to which the target trigger frame belongs is empty.

Optionally, the receiving unit is further configured to:

receive a source trigger frame sent by the AP, where the source trigger frame includes an identifier of a source resource that is allocated by the AP to the STA and that is used by the STA when the STA sends a data frame, and the identity of the STA; and receive a negative acknowledgement frame sent by the AP, where the negative acknowledgement frame is sent by the AP when the AP does not successfully receive, within specified duration after sending the source trigger frame, the data frame transmitted by the STA, and the negative acknowledgement frame includes the second indication information; and the STA further includes a sending unit, configured to:

send the data frame to the AP by using the source resource corresponding to the identifier of the source resource in the source trigger frame.

Optionally, the receiving unit is further configured to:

receive a source trigger frame sent by the AP, where the source trigger frame includes an identifier of a source resource that is allocated by the AP to the STA and that is used by the STA when the STA sends a data frame, and the identity of the STA; and receive a negative acknowledgement frame sent by the AP, where the negative acknowledgement frame is sent by the AP when the AP does not successfully receive, within specified duration after sending the source trigger frame, the data frame transmitted by the STA, and the negative acknowledgement frame includes the first indication information; and the STA further includes a sending unit, configured to:

send the data frame to the AP by using the source resource corresponding to the identifier of the source resource in the source trigger frame.

Optionally, the STA further includes a sending unit, configured to:

send the data frame to the AP; and the receiving unit is specifically configured to:

receive an acknowledgement frame sent by the AP, where the acknowledgement frame is sent by the AP when the AP successfully receives the data frame transmitted by the STA, and the acknowledgement frame includes the second indication information.

Optionally, the STA further includes a sending unit, configured to:

send the data frame to the AP; and the receiving unit is specifically configured to:

receive an acknowledgement frame sent by the AP, where the acknowledgement frame is sent by the AP when the AP successfully receives the data frame transmitted by the STA, and the acknowledgement frame includes the first indication information.

Optionally, the sending unit is further configured to:

send, to the AP, third indication information used to indicate that the STA has the data transmission requirement, so that the AP determines, when successfully receiving the third indication information, that the STA has the data transmission requirement.

Optionally, the third indication information is any one or more of the following content:

indication information on a newly added random access request flag bit RAR in the data frame;

indication information in a more data field (More Data Field) in the data frame; and indication information in a buffer (Buffer) field in the data frame.

An embodiment of the present disclosure provides an access point AP for data transmission in a wireless local area network, including:

a processor, configured to generate first indication information when a station STA has a data transmission requirement and the AP accepts the data transmission requirement, where the first indication information includes information used to indicate a first target wakeup moment, and the first target wakeup moment is not later than a sending moment of a target trigger frame that the STA needs to listen to next time, and is not earlier than a sending moment of the first beacon frame in a beacon frame period in which the target trigger frame is sent; and a transceiver, configured to send the first indication information to the STA.

An embodiment of the present disclosure provides a station STA for data transmission in a wireless local area network, including:

a transceiver, configured to receive first indication information sent by an access point AP, where the first indication information is generated by the AP when the STA has a data transmission requirement and the AP accepts the data transmission requirement, the first indication information includes information used to indicate a first target wakeup moment, and the first target wakeup moment is not later than a sending moment of a target trigger frame that the STA needs to listen to next time, and is not earlier than a sending moment of the first beacon frame in a beacon frame period in which the target trigger frame is sent; and a processor, configured to make the STA wake up at the first target wakeup moment and listen to the target trigger frame.

In the embodiments of the present disclosure, when the STA has the data transmission requirement and the AP accepts the data transmission requirement, the AP generates the first indication information, where the first indication information includes the information used to indicate the first target wakeup moment, and the first target wakeup moment is not later than the sending moment of the target trigger frame that the STA needs to listen to next time, and is not earlier than the sending moment of the first beacon frame in the beacon frame period in which the target trigger frame is sent; and the AP sends the first indication information to the STA. The AP sends the first indication information to the STA when the STA has the data transmission requirement and the AP accepts the data transmission requirement. The first indication information includes the information used to indicate the first target wakeup moment, and the first target wakeup moment is not later than the sending moment of the target trigger frame that the STA needs to listen to next time, and is not earlier than the sending moment of the first beacon frame in the beacon frame period in which the target trigger frame is sent. Therefore, after receiving the first indication information, the STA may enter the power saving mode, and does not listen to a trigger frame or wake up until the first target wakeup moment. In addition, after waking up, the STA does not miss time for listening to the target trigger frame. This reduces energy consumption in a data transmission process.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and beneficial effects of the present disclosure clearer, the following further describes the present disclosure in detail with reference to the accompanying drawings and embodiments. It should be understood that, the described specific embodiments are merely used to explain the present disclosure, but not to limit the present disclosure.

In the embodiments of the present disclosure, the term "AP" includes but is not limited to a node, a station controller, a base station, or any other type of interface device that can work in a wireless environment.

A "STA" in the present disclosure may include a handheld device with a wireless communication function, an in-vehicle device, a wearable device, a computing device, another processing device connected to a wireless modem, and various forms of user equipment (UE), mobile stations (MS), terminals, terminal equipment, or the like.

The term "and/or" in this specification is merely an associative relationship for describing associated objects, and indicates that three relationships may exist. For example, A and/or B may indicate the following three cases: A alone exists, both A and B exist, and B alone exists. In addition, the character "/" in this specification usually indicates that there is an "or" relationship between former and latter associated objects.

An identifier or identification information is used to identify an object, and the object may be a resource. An identifier may include at least one of a name, a number, and an identification ID), provided that the identifier can distinguish an identified object from another object.

Figure 1A:
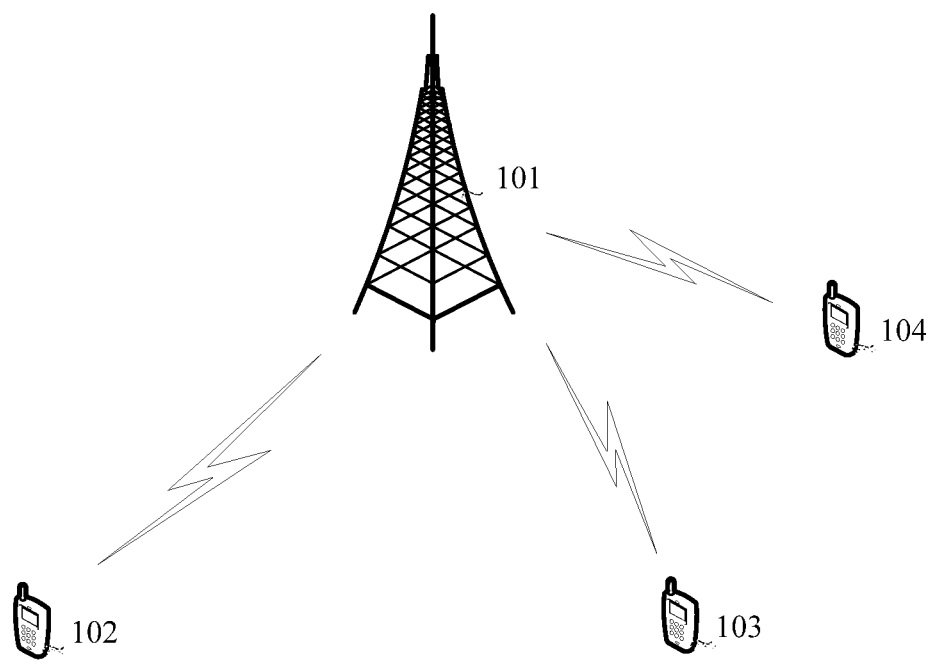
FIG. 1a is a schematic diagram of a system architecture, of data transmission in a wireless local area network, to which an embodiment of the present disclosure is applicable.

FIG. 1a is an example of a schematic diagram of a system architecture, of data transmission in a wireless local area network, to which an embodiment of the present disclosure is applicable. As shown in FIG. 1a, the system architecture, of data transmission in a wireless local area network, to which this embodiment of the present disclosure is applicable includes an AP 101 and a plurality of STAs, such as a STA 102, a STA 103, and a STA 104. The AP periodically sends a beacon frame to the STA. In each beacon frame period, the AP sends a trigger frame to the STA. After receiving the trigger frame, the STA obtains information about a resource in a contention mode or a scheduling mode, and then transmits, on the resource, data that the STA needs to transmit.

Figure 1B:
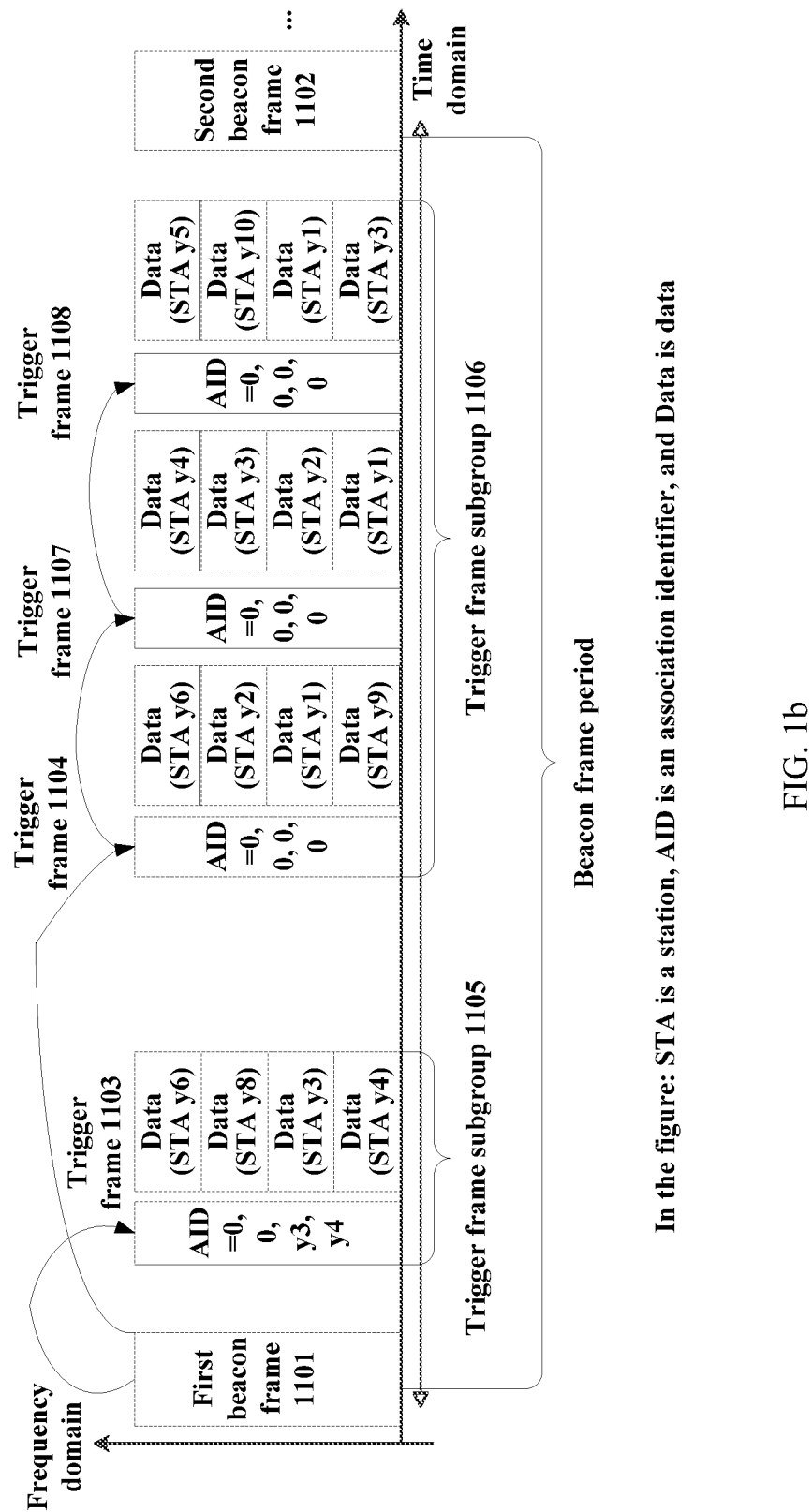
FIG. 1b is a schematic diagram of sending signaling by an AP according to an embodiment of the present disclosure.

FIG. 1b is an example of a schematic diagram of sending signaling by an AP according to an embodiment of the present disclosure. As shown in FIG. 1b, the AP periodically sends a beacon frame. One beacon frame period includes two beacon frames: a head beacon frame and a tail beacon frame. In this embodiment of the present disclosure, a beacon frame that is sent first in a beacon frame period is referred to as "the first beacon frame" in the beacon frame period, and a beacon frame that is sent next is referred to as "the second beacon frame". For example, in a beacon frame period determined by a beacon frame 1101 and a beacon frame 1102 that are adjacent to each other, the beacon frame 1101 is sent first, and therefore, the beacon frame 1101 is determined as "the first beacon frame" in the beacon frame period, and the beacon frame 1102 is referred to as "the second beacon frame". Optionally, the AP informs a STA of time at which the AP sends a beacon frame. For example, the AP informs the STA that the AP sends a beacon frame at an interval of 5 seconds, and the STA can infer sending time of a next beacon frame after receiving the first beacon frame.

The AP presets a plurality of trigger frames for each beacon frame period. The plurality of preset trigger frames are shown as a trigger frame 1103 and a trigger frame 1104 in FIG. 1b. Each preset trigger frame is corresponding to a trigger frame subgroup. For example, the trigger frame 1103 is corresponding to a trigger frame subgroup 1105, and the trigger frame 1104 is corresponding to a trigger frame subgroup 1106. In some cases, after sending one preset trigger frame, the AP determines, based on a current actual status, that currently sending one trigger frame is not adequate to satisfy a requirement of the STA. In this case, the AP temporarily and randomly sends one or more trigger frames successively after the preset trigger frame. The preset trigger frame and the one or more trigger frames successively sent after the preset trigger frame are referred to as a trigger frame subgroup. For example, after sending the trigger frame 1104, the AP randomly sends a trigger frame 1107 and a trigger frame 1108 successively. Herein, the preset trigger frame 1104, the trigger frame 1107, and the trigger frame 1108 all are trigger frames in the trigger frame subgroup 1106. In addition, each trigger frame subgroup is corresponding to one subgroup identifier. For example, a subgroup identifier of the trigger frame subgroup 1105 is a first subgroup, and a subgroup identifier of the trigger frame subgroup 1106 is a second subgroup. That is, each preset trigger frame in one beacon frame period is corresponding to one trigger frame subgroup, each trigger frame subgroup includes at least one trigger frame, and all trigger frames included in each trigger frame subgroup are corresponding to one subgroup identifier.

Optionally, the AP adds, to the first beacon frame in a beacon frame period, sending moment information of a plurality of preset trigger frames in the beacon frame period. For example, in FIG. 1b, the beacon frame 1101 sent by the AP to the STA carries information about a predicted moment at which the AP sends the trigger frame 1103 and information about a predicted moment at which the AP sends the trigger frame 1104. The information about the predicted moment at which the AP sends the trigger frame 1103 and the information about the predicted moment at which the AP sends the trigger frame 1104 may be absolute values of system physical time, or may be increment values. For example, the information about the predicted moment at which the AP sends the trigger frame 1103 is 8 o'clock or 20-minute duration, where 8 o'clock indicates that the predicted moment at which the AP sends the trigger frame 1103 is 8 o'clock, and the 20-minute duration indicates that the predicted moment at which the AP sends the trigger frame 1103 is a moment that is 20 minutes later than time at which the first beacon frame 1101 is sent.

In this embodiment of the present disclosure, there are two manners of obtaining, by the STA, a resource for data frame transmission: a contention mode and a scheduling mode. In an optional implementation, in the scheduling mode, the trigger frame sent by the AP to the STA includes information about the resource corresponding to the STA, for example, includes an identifier, such as an association identifier (AID), of the resource corresponding to the STA. The information about the resource corresponding to the STA included in the trigger frame is used to indicate which STAs are allowed to perform uplink multi-user transmission. Optionally, the trigger frame further includes information about frequency and space resources occupied by uplink transmission of each STA, and corresponding physical parameter information, such as a modulation and coding scheme. After receiving the trigger frame, the STA sends a data frame to the AP on the corresponding resource.

Optionally, the AID may be set to a specific value, to notify the STA to send the data frame in the contention mode. For example, the AID is set to 0, to notify the STA to send the data frame in the contention mode.

As shown in FIG. 1b, in the trigger frame 1103, a value of an AID corresponding to a resource 1 is 0, a value of an AID corresponding to a resource 2 is 0, a value of an AID corresponding to a resource 3 is STA y3, and a value of an AID corresponding to a resource 4 is STA y4. In this case, it indicates that the resource 1 and the resource 2 may be obtained by STAs through contention, the resource 3 is allocated to a STA y3 for use, and the resource 4 is allocated to a STA y4 for use. When receiving the trigger frame 1103, the STA y3 sends, by using the resource 3, a data frame corresponding to the STA y3. When receiving the trigger frame 1103, the STA y4 sends, by using the resource 4, a data frame corresponding to the STA y4. Other STAs determine a resource from the resource 1 and the resource 2 in the contention mode. For example, in FIG. 1b, through contention, a STA y6 obtains the resource 1, and a STA y8 obtains the resource 2. Therefore, the STA y6 sends, by using the resource 1, a data frame corresponding to the STA y6, and the STA y8 sends, by using the resource 2, a data frame corresponding to the STA y8.

As shown in FIG. 1b, values of four AIDs carried in the trigger frame 1104, the trigger frame 1107, and the trigger frame 1108 are all 0, indicating that all STAs may obtain a resource in a contention manner. Finally, after receiving the trigger frame 1104, the STA y6 obtains the resource 1 through contention, a STA y2 obtains the resource 2 through contention, a STA y1 obtains the resource 3 through contention, and a STA y9 obtains the resource 4 through contention. After receiving the trigger frame 1107, the STA y4 obtains the resource 1 through contention, the STA y3 obtains the resource 2 through contention, the STA y2 obtains the resource 3 through contention, and the STA y1 obtains the resource 4 through contention. After receiving the trigger frame 1108, a STA y5 obtains the resource 1 through contention, a STA y10 obtains the resource 2 through contention, the STA y1 obtains the resource 3 through contention, and the STA y3 obtains the resource 4 through contention.

Figure 1C:
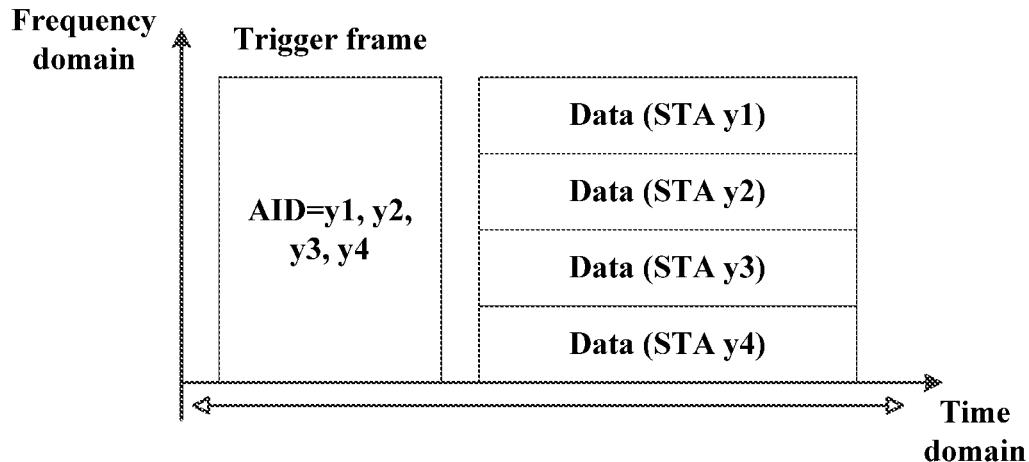
FIG. 1c is another schematic diagram of an AID included in a trigger frame according to an embodiment of the present disclosure.

FIG. 1c is an example of another schematic diagram of an AID included in a trigger frame according to an embodiment of the present disclosure. As shown in FIG. 1c, in a trigger frame 1201, a value of an AID corresponding to a resource 1 is STA y1, a value of an AID corresponding to a resource 2 is STA y2, a value of an AID corresponding to a resource 3 is STA y3, and a value of an AID corresponding to a resource 4 is STA y4. In this case, it indicates that the resource 1 is allocated to a STA y1 for use, the resource 2 is allocated to a STA y2 for use, the resource 3 is allocated to a STA y3 for use, and the resource 4 is allocated to a STA y4 for use. When the STA y1, the STA y2, the STA y3, and the STA y4 each receive the trigger frame 1201, the STA y1 sends, by using the resource 1, a data (Data) frame corresponding to the STA y1, the STA y2 sends, by using the resource 2, a data frame corresponding to the STA y2, the STA y3 sends, by using the resource 3, a data frame corresponding to the STA y3, and the STA y4 sends, by using the resource 4, a data frame corresponding to the STA y4.

In the embodiments of the present disclosure, one STA is used as an example for description. For one STA, the STA sends a data frame after receiving a source trigger frame, and then, the STA sends a data frame again after receiving a target trigger frame. The STA does not send any data frame in duration between the source trigger frame and the target trigger frame. The source trigger frame and the target trigger frame in the embodiments of the present disclosure are two of all trigger frames sent by an AP. The source trigger frame is the last trigger frame that is sent by the AP and that is received by the STA before the STA sends the data frame. There may be no trigger frame or one or more trigger frames between the source trigger frame and the target trigger frame. The source trigger frame and the target trigger frame may also be in different beacon frame periods. A source resource and a target resource in the embodiments of the present disclosure are two of a plurality of resources. The source resource is a resource that is used by the STA for sending the data frame after the STA receives the source trigger frame, and the target resource is a resource that is used by the STA for sending the data frame after the STA receives the target trigger frame.

In addition, if determining that one trigger frame is not adequate to satisfy a channel access requirement of a STA that currently intends to access a channel, the AP continues to send a trigger frame. Herein, channel access of one STA triggered by trigger frames in one subgroup is referred to as intra-trigger frame group random access, that is, a source trigger frame and a target trigger frame are in a same beacon frame period. If channel access of the STA experiences another trigger frame subgroup indicated by another beacon frame period, that is, access across different trigger frame subgroups, the access is referred to as inter-TF-R group random access, that is, a source trigger frame and a target trigger frame are in different beacon frame periods.

In the embodiments of the present disclosure, a trigger frame subgroup specifically means: In a beacon frame period, after sending a preset trigger frame, an AP additionally transmits a string of trigger frames based on a network status, and the preset trigger frame and the string of trigger frames are referred to as a trigger frame subgroup. A beacon frame period may also be referred to as a trigger frame-based random access interval.

In the embodiments of the present disclosure, there are a plurality of types of trigger frames, for example, a trigger frame for random access (TF-R). In the embodiments of the present disclosure, a trigger frame may be represented as a trigger frame (TF) or the like. A specific type of the trigger frame is not limited in the embodiments of the present disclosure.

Figure 2:
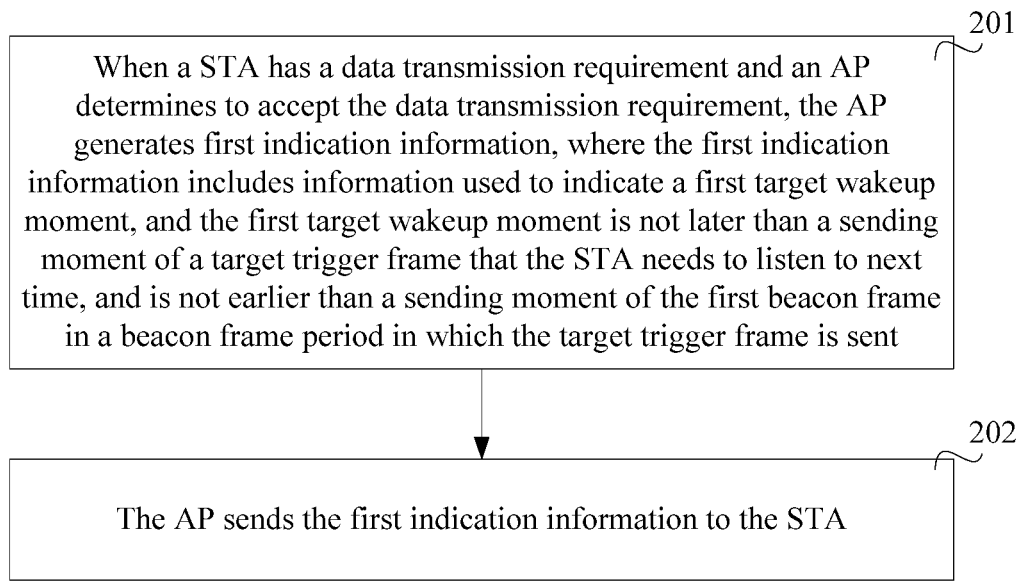
FIG. 2 is a schematic flowchart of a method for data transmission in a wireless local area network according to an embodiment of the present disclosure.

FIG. 2 is an example of a schematic flowchart of a method for data transmission in a wireless local area network according to an embodiment of the present disclosure.

Based on content shown in FIG. 1a, FIG. 1b, and FIG. 1c, and the foregoing content, as shown in FIG. 2, the method for data transmission in a wireless local area network that is provided in this embodiment of the present disclosure and that is implemented on an AP side includes the following steps.

Step 201: When a STA has a data transmission requirement and an AP determines to accept the data transmission requirement, the AP generates first indication information, where the first indication information includes information used to indicate a first target wakeup moment, and the first target wakeup moment is not later than a sending moment of a target trigger frame that the STA needs to listen to next time, and is not earlier than a sending moment of the first beacon frame in a beacon frame period in which the target trigger frame is sent.

Step 202: The AP sends the first indication information to the STA.

Specifically, in a period between a moment at which the STA receives the first indication information and the first target wakeup moment, the STA may enter a power saving mode, or may not enter a power saving mode. In other words, the STA may listen to a trigger frame or may not listen to a trigger frame, and the STA may contend for a channel or may not contend for a channel, which are all determined by the STA. In this embodiment of the present disclosure, the STA does not need to listen to a trigger frame in the power saving mode. At the first target wakeup moment, the STA wakes up. After waking up, in a working mode, the STA starts to listen to a trigger frame. In the period between the moment at which the STA receives the first indication information and the first target wakeup moment, the STA may not listen to a trigger frame or contend for a channel, and may enter the power saving mode. Therefore, compared with a prior-art solution in which a STA needs to listen to all trigger frames, the solution in this embodiment of the present disclosure can reduce energy consumption of the STA in the period between the moment at which the STA receives the first indication information and the first target wakeup moment.

What the STA specifically does in the period between the moment at which the STA receives the first indication information and the first target wakeup moment is not limited in this embodiment of the present disclosure. In this embodiment of the present disclosure, the STA merely needs to ensure that the STA listens to a trigger frame sent after the first target wakeup moment, because the target trigger frame that is allocated by the AP to the STA and that the STA needs to listen to next time is certain to be sent at the first target wakeup moment or after the first target wakeup moment.

Correspondingly, the STA receives the first indication information sent by the AP, where the first indication information is generated by the AP when the STA has the data transmission requirement and the AP accepts the data transmission requirement, the first indication information includes the information used to indicate the first target wakeup moment, and the first target wakeup moment is not later than the sending moment of the target trigger frame that the STA needs to listen to next time, and is not earlier than the sending moment of the first beacon frame in the beacon frame period in which the target trigger frame is sent. The STA wakes up at the first target wakeup moment, and listens to the target trigger frame.

Optionally, in this embodiment of the present disclosure, the information that is included in the first indication information and that is used to indicate the first target wakeup moment may be a specific system physical time, for example, 8 o'clock. In this case, the STA may enter the power saving mode when receiving the first indication information, and starts to listen to a trigger frame at 8 o'clock. Alternatively, the information that is included in the first indication information and that is used to indicate the first target wakeup moment is a system physical time increment, for example, 20 minutes. In this case, the STA may enter the power saving mode when receiving the first indication information, and starts to listen to a trigger frame 20 minutes later. Alternatively, the information used to indicate the first target wakeup moment is an identifier of some signaling. The STA may infer, based on information obtained by the STA, sending time of the signaling, or the like.

In this embodiment of the present disclosure, information about the first target wakeup moment is any one of the following content:

the sending moment of the first beacon frame in the beacon frame period in which the target trigger frame is sent;

a sending moment of the first trigger frame included in a trigger frame subgroup to which the target trigger frame belongs;

the sending moment of the target trigger frame; and the first target wakeup moment.

That is, in this embodiment of the present disclosure, the information about the first target wakeup moment is the first target wakeup moment, or may be indication information used to indicate the first target wakeup moment. Both the information about the first target wakeup moment and the first target wakeup moment may be any one of the sending moment of the first beacon frame in the beacon frame period in which the target trigger frame is sent, the sending moment of the first trigger frame included in the trigger frame subgroup to which the target trigger frame belongs, and the sending moment of the target trigger frame.

Optionally, in this embodiment of the present disclosure, a value of the sending moment of the first trigger frame included in the trigger frame subgroup to which the target trigger frame belongs is earlier than or equal to zero and is later than a sending moment of the first trigger frame in a trigger frame subgroup that is sent latest in all trigger frame subgroups included in the beacon frame period in which the target trigger frame is sent. In this embodiment of the present disclosure, a value of the sending moment of the target trigger frame is earlier than or equal to zero and is later than a sending moment of the last trigger frame in all trigger frames included in the beacon frame period in which the target trigger frame is sent.

Optionally, the information used to indicate the first target wakeup moment may directly be the first target wakeup moment. In this case, after receiving the first indication information, the STA may enter the power saving mode, and no longer listens to any trigger frame sent by the AP. When the first target wakeup moment arrives, the STA starts to listen to a trigger frame sent by the AP.

In another optional implementation, the information used to indicate the first target wakeup moment is information other than the first target wakeup moment. For example, there are the following one or more optional manners. In the following manners, each preset trigger frame in one beacon frame period is corresponding to one trigger frame subgroup, each trigger frame subgroup includes at least one trigger frame, and all trigger frames included in each trigger frame subgroup are corresponding to one subgroup identifier.

In a manner a1, in this embodiment of the present disclosure, the AP sends a beacon frame sending interval to the STA, and therefore, the STA can directly infer sending time of each beacon frame. In this case, when the first target wakeup moment is the sending moment of the first beacon frame in the beacon frame period in which the target trigger frame is sent, the information used to indicate the first target wakeup moment is information capable of indicating a quantity of beacon frame periods between the beacon frame period in which the target trigger frame is sent and a current beacon frame period.

For example, a letter T is used to represent the quantity of beacon frame periods between the beacon frame period in which the target trigger frame is sent and the current beacon frame period. When T is 0, it indicates that the target trigger frame is a trigger frame in the current beacon frame period. In this case, the STA needs to listen to the trigger frame in the current beacon frame period. If T is 3, there are three beacon frame periods between the beacon frame period in which the target trigger frame is sent and the current beacon frame period. In other words, sending time of the first beacon frame in the beacon frame period in which the target trigger frame is sent is a sum of sending time of the first beacon frame in a beacon frame period corresponding to a current moment and three beacon frame periods.

In a manner a2, when the first target wakeup moment is the sending moment of the first trigger frame included in the trigger frame subgroup to which the target trigger frame belongs, the information used to indicate the first target wakeup moment is information capable of indicating a quantity of beacon frame periods between the beacon frame period in which the target trigger frame is sent and a current beacon frame period, and information capable of indicating a subgroup identifier of the trigger frame subgroup to which the target trigger frame belongs.

Specifically, in this embodiment of the present disclosure, the AP sends a beacon frame sending interval to the STA, and therefore, the STA can directly infer sending time of each beacon frame. In addition, in the first beacon frame of each beacon frame period, the AP sends a sending moment of a preset trigger frame in the beacon frame period to the STA. Therefore, when the AP informs the STA of the trigger frame subgroup to which the target trigger frame belongs, the STA may first calculate, based on the beacon frame period in which the target trigger frame is sent, the sending moment of the first beacon frame in the beacon frame period in which the target trigger frame is sent, and determine, based on a sending moment, of a preset trigger frame in the beacon frame period in which the target trigger frame is sent, included in the first beacon frame in the beacon frame period in which the target trigger frame is sent, the sending moment of the first trigger frame in the trigger frame subgroup to which the target trigger frame belongs. Then, the STA enters the working mode at the sending moment of the first trigger frame in the trigger frame subgroup, and sequentially listens to a trigger frame in the trigger frame subgroup until the target trigger frame is detected.

For example, a letter T is used to represent the quantity of beacon frame periods between the beacon frame period in which the target trigger frame is sent and the current beacon frame period, and a letter R is used to represent the subgroup identifier of the trigger frame subgroup to which the target trigger frame belongs. When T is 0 and R is 3, it indicates that the target trigger frame is a trigger frame in the current beacon frame period and the target trigger frame is a trigger frame in the third trigger frame subgroup in the current beacon frame period. The STA can determine, based on the first beacon frame in the current beacon frame period, sending moments of all preset trigger frames in the current beacon frame period, that is, a sending moment of the first trigger frame in each trigger frame subgroup in the current beacon frame period. Therefore, when the STA receives the first indication information indicating that T is 0 and R is 3, the STA may enter the power saving mode after receiving the first indication information, and does not enter the working mode until a sending moment of the first trigger frame in the third trigger frame subgroup in the current beacon frame period. After entering the working mode, the STA sequentially listens to a trigger frame in the third trigger frame subgroup until the target trigger frame is detected.

For another example, T is 3 and R is 4 in the first indication information. In this case, there are three beacon frame periods between the beacon frame period in which the target trigger frame is sent and the current beacon frame period. In other words, sending time of the first beacon frame in the beacon frame period in which the target trigger frame is sent is a sum of sending time of the first beacon frame in a beacon frame period corresponding to a current moment and three beacon frame periods. R is 4, indicating that the target trigger frame is in the fourth trigger frame subgroup in the beacon frame period in which the target trigger frame is sent. Therefore, when the STA receives the first indication information indicating that T is 3 and R is 4, the STA may enter the power saving mode after receiving the first indication information; at a sending moment of the first beacon frame in the third beacon frame period after the current beacon frame period, the STA obtains a sending moment, of the first trigger frame in each trigger frame subgroup in the third beacon frame period, included in the first beacon frame in the third beacon frame period; and the STA enters the working mode at a sending moment of the first trigger frame in the fourth trigger frame subgroup in the third beacon frame period. After entering the working mode, the STA sequentially listens to a trigger frame in the fourth trigger frame subgroup until the target trigger frame is detected.

In a manner a3, when the first target wakeup moment is the sending moment of the target trigger frame, the information used to indicate the first target wakeup moment is information capable of indicating a quantity of beacon frame periods between the beacon frame period in which the target trigger frame is sent and a current beacon frame period, information capable of indicating a subgroup identifier of the trigger frame subgroup to which the target trigger frame belongs, and information capable of indicating a location identifier that represents a sequence number of the target trigger frame in the trigger frame subgroup to which the target trigger frame belongs.

Specifically, in this embodiment of the present disclosure, the AP sends a beacon frame sending interval to the STA, and therefore, the STA can directly infer sending time of each beacon frame. In addition, in the first beacon frame of each beacon frame period, the AP sends a sending moment of a preset trigger frame in the beacon frame period to the STA. Therefore, when the AP informs the STA of the trigger frame subgroup to which the target trigger frame belongs, the STA may first calculate, based on the beacon frame period in which the target trigger frame is sent, the sending moment of the first beacon frame in the beacon frame period in which the target trigger frame is sent, and determine, based on a sending moment, of a preset trigger frame in the beacon frame period in which the target trigger frame is sent, included in the first beacon frame in the beacon frame period in which the target trigger frame is sent, the sending moment of the first trigger frame in the trigger frame subgroup to which the target trigger frame belongs. Then, the STA directly infers the sending moment of the target trigger frame based on the location identifier that represents the sequence number of the target trigger frame in the trigger frame subgroup to which the target trigger frame belongs, and enters the working mode at the sending moment of the target trigger frame.

For example, a letter T is used to represent the quantity of beacon frame periods between the beacon frame period in which the target trigger frame is sent and the current beacon frame period, a letter R is used to represent the subgroup identifier of the trigger frame subgroup to which the target trigger frame belongs, and a letter K is used to represent the location identifier that represents the sequence number of the target trigger frame in the trigger frame subgroup to which the target trigger frame belongs. When T is 0, R is 0, and K is 3, it indicates that the target trigger frame is a trigger frame in the current beacon frame period and the target trigger frame is the third trigger frame in a current trigger frame subgroup in the current beacon frame period. The STA can determine, based on the first beacon frame in the current beacon frame period, sending moments of all preset trigger frames in the current beacon frame period, that is, a sending moment of the first trigger frame in each trigger frame subgroup in the current beacon frame period, and can further determine a sending moment of the third trigger frame in the current trigger frame subgroup in the current beacon frame period based on a time interval at which the AP sends a non-preset trigger frame. Therefore, when the STA receives the first indication information indicating that T is 0, R is 0, and K is 3, the STA may enter the power saving mode after receiving the first indication information, and does not enter the working mode or listen to the target trigger frame until the sending moment of the third trigger frame in the current trigger frame subgroup in the current beacon frame period.

For another example, when T is 0, R is 3, and K is 3, it indicates that the target trigger frame is a trigger frame in the current beacon frame period and the target trigger frame is the third trigger frame in the third trigger frame subgroup in the current beacon frame period. The STA can determine, based on the first beacon frame in the current beacon frame period, sending moments of all preset trigger frames in the current beacon frame period, that is, a sending moment of the first trigger frame in each trigger frame subgroup in the current beacon frame period, and can further determine a sending moment of the third trigger frame in the third trigger frame subgroup in the current beacon frame period based on a time interval at which the AP sends a non-preset trigger frame. Therefore, when the STA receives the first indication information indicating that T is 0, R is 3, and K is 3, the STA may enter the power saving mode after receiving the first indication information, and does not enter the working mode or listen to the target trigger frame until the sending moment of the third trigger frame in the third trigger frame subgroup in the current beacon frame period.

For another example, T is 3, R is 4, and K is 3 in the first indication information. In this case, there are three beacon frame periods between the beacon frame period in which the target trigger frame is sent and the current beacon frame period. In other words, sending time of the first beacon frame in the beacon frame period in which the target trigger frame is sent is a sum of sending time of the first beacon frame in a beacon frame period corresponding to a current moment and three beacon frame periods. R is 4, indicating that the target trigger frame is in the fourth trigger frame subgroup in the beacon frame period in which the target trigger frame is sent. K is 3, indicating that the target trigger frame is the third trigger frame in the fourth trigger frame subgroup in the beacon frame period in which the target trigger frame is sent. Therefore, when the STA receives the first indication information indicating that T is 3, R is 4, and K is 3, the STA may enter the power saving mode after receiving the first indication information; at a sending moment of the first beacon frame in the third beacon frame period after the current beacon frame period, the STA obtains a sending moment, of the first trigger frame in each trigger frame subgroup in the third beacon frame period, included in the first beacon frame in the third beacon frame period, and infers a sending moment of the third trigger frame in the fourth trigger frame subgroup in the third beacon frame period based on a time interval at which the AP sends a non-preset trigger frame; and the STA enters the working mode and listens to the target trigger frame at the sending moment of the third trigger frame in the fourth trigger frame subgroup in the third beacon frame period.

In a manner a4, in the foregoing manner a2, when the first target wakeup moment is the sending moment of the first trigger frame included in the trigger frame subgroup to which the target trigger frame belongs, if the beacon frame period in which the target trigger frame is sent is the current beacon frame period, the information capable of indicating the quantity of beacon frame periods between the beacon frame period in which the target trigger frame is sent and the current beacon frame period is empty.

For example, a letter T is used to represent the quantity of beacon frame periods between the beacon frame period in which the target trigger frame is sent and the current beacon frame period, and a letter R is used to represent the subgroup identifier of the trigger frame subgroup to which the target trigger frame belongs. When T is 0 and R is 3, T may be directly deleted from the first indication information, that is, the first indication information includes only information indicating that R is 3.

In this example, R is 3, indicating that the target trigger frame is a trigger frame in the current beacon frame period and the target trigger frame is a trigger frame in the third trigger frame subgroup in the current beacon frame period. The STA can determine, based on the first beacon frame in the current beacon frame period, sending moments of all preset trigger frames in the current beacon frame period, that is, a sending moment of the first trigger frame in each trigger frame subgroup in the current beacon frame period. Therefore, when the STA receives the first indication information indicating that T is 0 and R is 3, the STA may enter the power saving mode after receiving the first indication information, and does not enter the working mode until a sending moment of the first trigger frame in the third trigger frame subgroup in the current beacon frame period. After entering the working mode, the STA sequentially listens to a trigger frame in the third trigger frame subgroup until the target trigger frame is detected.

In a manner a5, in the foregoing manner a3, when the first target wakeup moment is the sending moment of the target trigger frame, if the beacon frame period in which the target trigger frame is sent is the current beacon frame period and the trigger frame subgroup to which the target trigger frame belongs is a current trigger frame subgroup, the information capable of indicating the quantity of beacon frame periods between the beacon frame period in which the target trigger frame is sent and the current beacon frame period is empty, and the information capable of indicating the subgroup identifier of the trigger frame subgroup to which the target trigger frame belongs is empty.

For example, a letter T is used to represent the quantity of beacon frame periods between the beacon frame period in which the target trigger frame is sent and the current beacon frame period, a letter R is used to represent the subgroup identifier of the trigger frame subgroup to which the target trigger frame belongs, and a letter K is used to represent the location identifier that represents the sequence number of the target trigger frame in the trigger frame subgroup to which the target trigger frame belongs. When T is 0, R is 0, and K is 3, T and R may be directly deleted from the first indication information, that is, the first indication information includes only information indicating that K is 3.

In this example, K is 3, indicating that the target trigger frame is a trigger frame in the current beacon frame period and the target trigger frame is the third trigger frame in a current trigger frame subgroup in the current beacon frame period. The STA can determine, based on the first beacon frame in the current beacon frame period, sending moments of all preset trigger frames in the current beacon frame period, that is, a sending moment of the first trigger frame in each trigger frame subgroup in the current beacon frame period, and can further determine a sending moment of the third trigger frame in the current trigger frame subgroup in the current beacon frame period based on a time interval at which the AP sends a non-preset trigger frame. Therefore, when the STA receives the first indication information indicating that T is 0, R is 0, and K is 3, the STA may enter the power saving mode after receiving the first indication information, and does not enter the working mode or listen to the target trigger frame until the sending moment of the third trigger frame in the current trigger frame subgroup in the current beacon frame period.

Optionally, the first indication information not only includes the information used to indicate the first target wakeup moment, but also includes information used to indicate a mode in which the STA obtains a target resource, where the target resource is used by the STA after the STA receives the target trigger frame.

The information used to indicate the mode in which the STA obtains the target resource is information that causes the STA to obtain the target resource in a contention mode after receiving the target trigger frame.

Alternatively, the information used to indicate the mode in which the STA obtains the target resource is an identifier of the target resource allocated by the AP to the STA and an identity of the STA, so that the STA obtains, in a scheduling mode after receiving the target trigger frame, the target resource corresponding to the identifier of the target resource.

Specifically, the information used to indicate the mode in which the STA obtains the target resource may be an AID corresponding to the STA. If a value of the AID corresponding to the STA is set to 0, it indicates that the STA needs to obtain the target resource in a contention manner. If the AID corresponding to the STA is set to an identifier of an available target resource, the STA does not need to contend, but directly sends a data frame in a scheduling manner by using the target resource corresponding to the identifier of the target resource.

In the foregoing step 201, there are a plurality of manners of determining, by the AP, whether to accept the data transmission requirement. For example, when a current network status is adequate to support the STA in performing single-user channel contention to transmit uplink data, the AP may not accept the data transmission requirement of the STA. In this case, when the STA intends to transmit data, the STA may perform transmission in a contention manner. In another implementable manner, the AP determines, based on a current network load status, whether to accept the data transmission requirement. If load is relatively heavy and is greater than a load threshold, the AP does not accept the data transmission requirement of the STA. If load is not greater than a load threshold, the AP accepts the data transmission requirement of the STA. For another example, in another optional implementation, the AP determines, in the following manner, whether to accept the data transmission requirement of the STA.

The AP determines a quantity of times that the STA has a data transmission requirement in a preset time period. When the determined quantity of times that the STA has a data transmission requirement is not greater than a quantity-of-times threshold, the AP determines to accept the data transmission requirement of the STA; otherwise, the AP determines not to accept the data transmission requirement of the STA.

The quantity-of-times threshold is an empirical value. For example, the quantity-of-times threshold may be set to 5. A person skilled in the art may set the quantity-of-times threshold based on a specific status. This is not limited in this embodiment of the present disclosure. Optionally, the preset time period may be specifically one beacon frame period. For example, when the STA has a data transmission requirement, the AP determines a total quantity of times that the STA has a data transmission requirement in the current beacon frame period, for example, the total quantity of times is 3. In this case, when the determined quantity of times that the STA has a data transmission requirement is not greater than a quantity-of-times threshold, the AP determines to accept the data transmission requirement of the STA. For another example, the AP determines that a total quantity of times that the STA has a data transmission requirement in the current beacon frame period is 6, and determines not to accept the data transmission requirement of the STA.

Optionally, when determining not to accept the data transmission requirement of the STA, the AP generates second indication information used to indicate that the AP does not accept the data transmission requirement of the STA; and the AP sends the second indication information to the STA. In other words, the STA receives the second indication information that is sent by the AP and that is used to indicate that the AP does not accept the data transmission requirement of the STA, where the second indication information is generated by the AP when the AP determines not to accept the data transmission requirement of the STA.

Optionally, the second indication information includes information that indicates a second target wakeup moment as an invalid value.

Specifically, the second indication information may directly be the second target wakeup moment, and in this case, the second target wakeup moment may be an invalid value, for example, a past moment. This embodiment of the present disclosure further provides the following one or more other optional implementations. Each preset trigger frame in one beacon frame period is corresponding to one trigger frame subgroup, each trigger frame subgroup includes at least one trigger frame, and all trigger frames included in each trigger frame subgroup are corresponding to one subgroup identifier.

The second target wakeup moment is any one of the following content:

the sending moment of the first beacon frame in the beacon frame period in which the target trigger frame is sent;

the sending moment of the first trigger frame included in the trigger frame subgroup to which the target trigger frame belongs; and the sending moment of the target trigger frame.

In a manner b1, when the second target wakeup moment is the sending moment of the first beacon frame in the beacon frame period in which the target trigger frame is sent, the information that indicates the second target wakeup moment as the invalid value is information that indicates, as an invalid value, the quantity of beacon frame periods between the beacon frame period in which the target trigger frame is sent and the current beacon frame period.

For example, the letter T is used to represent the quantity of beacon frame periods between the beacon frame period in which the target trigger frame is sent and the current beacon frame period. When T is a special value, or a value of T represents a beacon frame period before the current beacon frame period, it indicates that the target trigger frame is a trigger frame in the beacon frame period before the current beacon frame period. All trigger frames in the beacon frame period before the current beacon frame period have been sent before a current moment. Therefore, when T is the special value, or the value of T represents the beacon frame period before the current beacon frame period, T is an invalid value.

In a manner b2, when the second target wakeup moment is the sending moment of the first trigger frame included in the trigger frame subgroup to which the target trigger frame belongs, the information that indicates the second target wakeup moment as the invalid value is information that indicates, as an invalid value or a special value, the quantity of beacon frame periods between the beacon frame period in which the target trigger frame is sent and the current beacon frame period, and information that indicates, as an invalid value, the subgroup identifier of the trigger frame subgroup to which the target trigger frame belongs.

For example, the letter T is used to represent the quantity of beacon frame periods between the beacon frame period in which the target trigger frame is sent and the current beacon frame period, and the letter R is used to represent the subgroup identifier of the trigger frame subgroup to which the target trigger frame belongs. When T is a special value, or a value of T represents a beacon frame period before the current beacon frame period, T is an invalid value. If R is 3, the first target wakeup moment represented by T and R is a sending moment of the first trigger frame in the third trigger frame subgroup in the beacon frame period before the current beacon frame period, that is, the first target wakeup moment represented by T and R is past. Therefore, T and R are invalid values, and the STA still remains in an awake state when receiving the first indication information.

For example, the letter T is used to represent the quantity of beacon frame periods between the beacon frame period in which the target trigger frame is sent and the current beacon frame period, and the letter R is used to represent the subgroup identifier of the trigger frame subgroup to which the target trigger frame belongs. When T is 0 and R is a subgroup identifier of a previous trigger frame subgroup of a trigger frame subgroup corresponding to a current moment, where 0 is a special value of T and R is an invalid value, it indicates that the target trigger frame is a trigger frame in the previous trigger frame subgroup of the current trigger frame subgroup in the current beacon frame period. All trigger frames in the previous trigger frame subgroup of the current trigger frame subgroup in the current beacon frame period have been sent before the current moment. Therefore, when T is 0 and R is the subgroup identifier of the previous trigger frame subgroup of the trigger frame subgroup corresponding to the current moment, T is 0, and R is an invalid value. In this case, the first target wakeup moment determined by T and R is past, and the STA still remains in an awake state when receiving the first indication information.

In a manner b3, when the second target wakeup moment is the sending moment of the target trigger frame, the information that indicates the second target wakeup moment as the invalid value is information that indicates, as an invalid value or a special value, the quantity of beacon frame periods between the beacon frame period in which the target trigger frame is sent and the current beacon frame period, information that indicates, as an invalid value or a special value, the subgroup identifier of the trigger frame subgroup to which the target trigger frame belongs, and information that indicates, as an invalid value, the location identifier that represents the sequence number of the target trigger frame in the trigger frame subgroup to which the target trigger frame belongs.

Specifically, the information that indicates the second target wakeup moment as the invalid value is information that indicates, as the invalid value, the quantity of beacon frame periods between the beacon frame period in which the target trigger frame is sent and the current beacon frame period, that indicates, as the invalid value, the subgroup identifier of the trigger frame subgroup to which the target trigger frame belongs, and that indicates, as the invalid value, the location identifier that represents the sequence number of the target trigger frame in the trigger frame subgroup to which the target trigger frame belongs.

In another manner, the information that indicates the second target wakeup moment as the invalid value is information that indicates, as the invalid value, the quantity of beacon frame periods between the beacon frame period in which the target trigger frame is sent and the current beacon frame period, that indicates, as the special value, the subgroup identifier of the trigger frame subgroup to which the target trigger frame belongs, and that indicates, as the invalid value, the location identifier that represents the sequence number of the target trigger frame in the trigger frame subgroup to which the target trigger frame belongs.

In another manner, the information that indicates the second target wakeup moment as the invalid value is information that indicates, as the special value, the quantity of beacon frame periods between the beacon frame period in which the target trigger frame is sent and the current beacon frame period, that indicates, as the invalid value, the subgroup identifier of the trigger frame subgroup to which the target trigger frame belongs, and that indicates, as the invalid value, the location identifier that represents the sequence number of the target trigger frame in the trigger frame subgroup to which the target trigger frame belongs.

In another manner, the information that indicates the second target wakeup moment as the invalid value is information that indicates, as the special value, the quantity of beacon frame periods between the beacon frame period in which the target trigger frame is sent and the current beacon frame period, that indicates, as the special value, the subgroup identifier of the trigger frame subgroup to which the target trigger frame belongs, and that indicates, as the invalid value, the location identifier that represents the sequence number of the target trigger frame in the trigger frame subgroup to which the target trigger frame belongs.

Specifically, for example, the letter T is used to represent the quantity of beacon frame periods between the beacon frame period in which the target trigger frame is sent and the current beacon frame period, and the letter R is used to represent the subgroup identifier of the trigger frame subgroup to which the target trigger frame belongs. T is 0 and R is 0, where 0 is a special value. K is an identifier of a location, of a trigger frame that has been sent in a trigger frame subgroup corresponding to a current moment, in the trigger frame subgroup. For example, the fifth trigger frame in the current trigger frame subgroup is sent at the current moment, and K is 3. It can be learned that, because the third trigger frame in the current trigger frame subgroup in the current beacon frame period has been sent before the current moment, when T is 0, R is 0, and K is the identifier of the location, of the trigger frame that has been sent in the trigger frame subgroup corresponding to the current moment, in the trigger frame subgroup, T is 0, R is 0, and K is an invalid value. In this case, the STA still remains in an awake state when receiving the first indication information.

For example, the letter T is used to represent the quantity of beacon frame periods between the beacon frame period in which the target trigger frame is sent and the current beacon frame period, and the letter R is used to represent the subgroup identifier of the trigger frame subgroup to which the target trigger frame belongs. T is 0, where 0 is a special value. R is an invalid value. For example, when a trigger frame in the fourth trigger frame subgroup in the current beacon frame period currently has been sent, if R is 2, R is an invalid value. K is 3. It can be learned that, because the third trigger frame in the second trigger frame subgroup in the current beacon frame period has been sent before the current moment, when T is 0, R is 2, and K is 3, R and K are invalid values. In this case, the STA still remains in an awake state when receiving the first indication information.

In a manner b4, in the foregoing manner b2, when the second target wakeup moment is the sending moment of the first trigger frame included in the trigger frame subgroup to which the target trigger frame belongs, the information that indicates, as the invalid value, the quantity of beacon frame periods between the beacon frame period in which the target trigger frame is sent and the current beacon frame period is empty.

For example, the letter T is used to represent the quantity of beacon frame periods between the beacon frame period in which the target trigger frame is sent and the current beacon frame period, and the letter R is used to represent the subgroup identifier of the trigger frame subgroup to which the target trigger frame belongs. When T is 0 and R is a subgroup identifier of a previous trigger frame subgroup of a trigger frame subgroup corresponding to a current moment, where 0 is a special value, it indicates that the target trigger frame is a trigger frame in the previous trigger frame subgroup of the current trigger frame subgroup in the current beacon frame period. Because T is 0, T may be directly deleted from the first indication information, that is, the first indication information includes only information about R. The first indication information includes only information indicating that R is the subgroup identifier of the previous trigger frame subgroup of the trigger frame subgroup corresponding to the current moment. In this case, when the first indication information includes only the information about R, T is
  by default. Further, because all trigger frames in the previous trigger frame subgroup of the current trigger frame subgroup in the current beacon frame period have been sent before the current moment, R is an invalid value when R is the subgroup identifier of the previous trigger frame subgroup of the trigger frame subgroup corresponding to the current moment.

In a manner b5, in the foregoing manner b3, when the second target wakeup moment is the sending moment of the target trigger frame, the information that indicates, as the invalid value, the quantity of beacon frame periods between the beacon frame period in which the target trigger frame is sent and the current beacon frame period is empty, and/or the information that indicates, as the invalid value, the subgroup identifier of the trigger frame subgroup to which the target trigger frame belongs is empty.

Specifically, when the second target wakeup moment is the sending moment of the target trigger frame, the information that indicates, as the invalid value, the quantity of beacon frame periods between the beacon frame period in which the target trigger frame is sent and the current beacon frame period is empty, and the information that indicates, as the invalid value, the subgroup identifier of the trigger frame subgroup to which the target trigger frame belongs is empty.

In another implementation, when the second target wakeup moment is the sending moment of the target trigger frame, the information that indicates, as the invalid value, the quantity of beacon frame periods between the beacon frame period in which the target trigger frame is sent and the current beacon frame period is empty, and the information that indicates, as the special value, the subgroup identifier of the trigger frame subgroup to which the target trigger frame belongs is not empty.

In another implementation, when the second target wakeup moment is the sending moment of the target trigger frame, the information that indicates, as the special value, the quantity of beacon frame periods between the beacon frame period in which the target trigger frame is sent and the current beacon frame period is not empty, and the information that indicates, as the invalid value, the subgroup identifier of the trigger frame subgroup to which the target trigger frame belongs is empty.

Specifically, for example, the letter T is used to represent the quantity of beacon frame periods between the beacon frame period in which the target trigger frame is sent and the current beacon frame period, and the letter R is used to represent the subgroup identifier of the trigger frame subgroup to which the target trigger frame belongs. T is 0 and R is 0, where 0 is a special value. K is an identifier of a location, of a trigger frame that has been sent in a trigger frame subgroup corresponding to a current moment, in the trigger frame subgroup. For example, the fifth trigger frame in the current trigger frame subgroup is sent at the current moment, and K is 3. Because T is 0, T may be directly deleted from the first indication information. In other words, the information that indicates, as the invalid value, the quantity of beacon frame periods between the beacon frame period in which the target trigger frame is sent and the current beacon frame period is empty. Because R is 0, R may be directly deleted from the first indication information. In other words, the information that indicates, as the invalid value, the subgroup identifier of the trigger frame subgroup to which the target trigger frame belongs is empty. That is, the first indication information includes only information about K. The first indication information includes only information indicating that K is 3. In this case, when the first indication information includes only the information about K, T and R are 0 by default. It can be learned that, because the third trigger frame in the current trigger frame subgroup in the current beacon frame period has been sent before the current moment, K is an invalid value when T is 0, R is 0, and K is the identifier of the location, of the trigger frame that has been sent in the trigger frame subgroup corresponding to the current moment, in the trigger frame subgroup. The STA still remains in an awake state when receiving the first indication information.

Optionally, there are specifically a plurality of manners of determining, by the AP, that the STA has the data transmission requirement in the foregoing step 201. For example, the AP infers, based on information on a network, that the STA has the data transmission requirement. Alternatively, the STA sends, to the AP, an indication message used to indicate that the STA has the data transmission requirement.

In this embodiment of the present disclosure, the AP may send the first indication information and the second indication information to the STA by using an acknowledgement frame or a negative acknowledgement frame. When the AP successfully receives the data frame sent by the STA, the AP returns the acknowledgement frame to the STA. When the AP sends a source trigger frame to the STA and schedules, in a scheduling mode in the source trigger frame, the STA to send the data frame, and the AP does not successfully receive, within specified duration, the data frame returned by the STA, the AP sends the negative acknowledgement frame to the STA.

In this embodiment of the present disclosure, the acknowledgement frame may be an acknowledgement character (ACK), or may be an acknowledgement frame in another form, for example, a block acknowledgement frame (BA). In another implementation, the acknowledgement frame is returned by returning a data frame, that is, the returned data frame is used as the acknowledgement frame, or the like. In this embodiment of the present disclosure, the negative acknowledgement frame may be a negative acknowledgement character (NACK), or may be a negative acknowledgement frame in another form, for example, a block negative acknowledgement frame (BNA). In another implementation, the negative acknowledgement frame is returned by returning a data frame, that is, the returned data frame is used as the negative acknowledgement frame, or the like.

In this embodiment of the present disclosure, the following two optional implementations are described in detail.

In a manner c1, optionally, in this embodiment of the present disclosure, when the AP generates only the first indication information, the AP sends the source trigger frame to the STA before generating the first indication information, where the source trigger frame includes an identifier of a source resource that is allocated by the AP to the STA and that is used by the STA when the STA sends the data frame, and an identity of the STA. If the AP does not successfully receive, within specified duration after sending the source trigger frame, the data frame transmitted by the STA, the AP adds the first indication information to the negative acknowledgement frame, and sends the negative acknowledgement frame to the STA.

In this embodiment of the present disclosure, when the AP may generate the second indication information, the AP sends the source trigger frame to the STA before generating the first indication information, where the source trigger frame includes an identifier of a source resource that is allocated by the AP to the STA and that is used by the STA when the STA sends the data frame, and an identity of the STA. If the AP does not successfully receive, within specified duration after sending the source trigger frame, the data frame transmitted by the STA, the AP adds the second indication information to the negative acknowledgement frame, and sends the negative acknowledgement frame to the STA.

Specifically, when the AP does not successfully receive, within the specified duration after sending the source trigger frame, the data frame transmitted by the STA, the AP needs to feed back the negative acknowledgement frame to the STA. In this case, if the AP generates the first indication information, the AP adds the first indication information to the negative acknowledgement frame; or if the AP generates the second indication information, the AP adds the second indication information to the negative acknowledgement frame.

Further, optionally, when the AP does not successfully receive, within the specified duration after sending the source trigger frame, the data frame transmitted by the STA, the AP may determine that the STA has the data transmission requirement. Correspondingly, if the AP accepts the data transmission requirement of the STA, the AP generates the first indication information, and adds the first indication information to the negative acknowledgement frame; or if the AP does not accept the data transmission requirement of the STA, the AP generates the second indication information, and adds the second indication information to the negative acknowledgement frame.

Correspondingly, the STA receives the source trigger frame sent by the AP, and the STA sends the data frame to the AP by using the source resource corresponding to the identifier of the source resource in the source trigger frame. The STA receives the negative acknowledgement frame sent by the AP, where the negative acknowledgement frame is sent by the AP when the AP does not successfully receive, within the specified duration after sending the source trigger frame, the data frame transmitted by the STA, and the negative acknowledgement frame includes the first indication information or the second indication information.

Optionally, the AP may send the first indication information and the negative acknowledgement frame to the STA by using two signaling messages, for example, separately send the first indication information to the STA, or add the first indication information to information other than the negative acknowledgement frame and send the information to the STA. Optionally, the AP may send the second indication information and the negative acknowledgement frame to the STA by using two signaling messages, for example, separately send the second indication information to the STA, or add the second indication information to information other than the negative acknowledgement frame and send the information to the STA.

Further, when the AP expects, in the scheduling mode, the STA to send the data frame to the AP by using the source resource allocated to the STA, but the AP does not receive the data frame, the AP determines that the STA has the data transmission requirement. To be specific, the AP sends the source trigger frame to the STA, where the source trigger frame includes the identifier of the source resource that is allocated by the AP to the STA and that is used by the STA when the STA sends the data frame. After receiving the source trigger frame, the STA certainly sends the data frame to the AP by using the source resource. However, the AP does not successfully receive, within the specified duration, the data frame transmitted by the STA. In this case, the AP determines that the STA fails to send data, and further determines that the STA has the data transmission requirement.

When the STA has the data transmission requirement, and the AP determines to accept the data transmission requirement of the STA, the AP sends the first indication information to the STA by using the negative acknowledgement frame. The STA may resend, after receiving the target trigger frame, the data frame that previously fails to be sent, or may construct another data frame, and send the another data frame after receiving the target trigger frame. This is not limited in this embodiment of the present disclosure.

When the STA has the data transmission requirement, and the AP determines not to accept the data transmission requirement of the STA, the AP sends the second indication information to the STA by using the negative acknowledgement frame. After receiving the second indication information, the STA may contend for a resource in a contention manner and transmit data, or may not transmit data.

Optionally, in this embodiment of the present disclosure, the specified duration starts to be counted from a moment at which the AP sends the source trigger frame. The specified duration is not less than a time that the STA spends in sending the data frame by using the source resource. That is, in the specified duration, the AP can determine that the STA definitely has sent the data frame by using the source resource.

In a manner c2, optionally, in this embodiment of the present disclosure, when the AP generates only the first indication information, the AP receives, before generating the first indication information, the data frame sent by the STA. When the AP successfully receives the data frame transmitted by the STA, the AP adds the first indication information to the acknowledgement frame, and sends the acknowledgement frame to the STA.

Optionally, in this embodiment of the present disclosure, when the AP may generate the second indication information, the AP receives, before generating the first indication information, the data frame sent by the STA. When the AP successfully receives the data frame transmitted by the STA, the AP adds the second indication information to the acknowledgement frame, and sends the acknowledgement frame to the STA.

Specifically, when the AP successfully receives, after sending the source trigger frame, the data frame transmitted by the STA, the AP needs to feed back the acknowledgement frame to the STA. In this case, if the AP generates the first indication information, the AP adds the first indication information to the acknowledgement frame; or if the AP generates the second indication information, the AP adds the second indication information to the acknowledgement frame.

Further, optionally, when the STA has the data transmission requirement, the AP may add the first indication information to the acknowledgement frame if the AP accepts the data transmission requirement of the STA, or add the second indication information to the acknowledgement frame if the AP does not accept the data transmission requirement of the STA.

Correspondingly, before the AP generates the first indication information, the STA sends the data frame to the AP. The STA receives the acknowledgement frame sent by the AP, where the acknowledgement frame is sent by the AP when the AP successfully receives the data frame transmitted by the STA, and the acknowledgement frame includes the first indication information or the second indication information.

Optionally, the AP may send the first indication information and the acknowledgement frame to the STA by using two signaling messages, for example, separately send the first indication information to the STA, or add the first indication information to information other than the acknowledgement frame and send the information to the STA. Optionally, the AP may send the second indication information and the acknowledgement frame to the STA by using two signaling messages, for example, separately send the second indication information to the STA, or add the second indication information to information other than the acknowledgement frame and send the information to the STA.

Optionally, when the AP successfully receives the data frame sent by the STA, for example, in the foregoing manner c1, the AP receives, within the specified duration after sending the source trigger frame, the data frame transmitted by the STA, the AP receives third indication information that is sent by the STA and that is used to indicate that the STA has the data transmission requirement. After successfully receiving the third indication information, the AP determines that the STA has the data transmission requirement. In other words, the STA sends, to the AP, the third indication information used to indicate that the STA has the data transmission requirement, so that the AP determines, when successfully receiving the third indication information, that the STA has the data transmission requirement.

Optionally, the third indication information may be carried in the data frame that is sent by the STA to the AP after the STA receives the source trigger frame. Alternatively, the third indication information and the data frame are sent to the AP by using two signaling messages. Alternatively, the third indication information is carried in another signaling message.

When the third indication information is carried in the data frame that is sent by the STA to the AP after the STA receives the source trigger frame, the third indication information is any one or more of the following content:

indication information on a newly added random access request flag bit (RAR) in the data frame;

indication information in a more data field (More Data Field) in the data frame; and indication information in a buffer field in the data frame.

For example, a flag bit, that is, the RAR, is newly added to the data frame. When a value of the RAR flag bit is 1, it indicates that the STA has the data transmission requirement. When a value of the RAR flag bit is 0, it indicates that the STA has no data transmission requirement. A value of the more data field (More Data Field) in the data frame may be used to represent an amount of data that the STA further needs to send. When the value of the more data field (More Data Field) is not empty, the AP may determine, based on the value of the more data field (More Data Field), that the STA has the data transmission requirement. When the value of the more data field (More Data Field) is empty, it indicates that the STA has no data transmission requirement. A value of the buffer field in the data frame may be used to represent an amount of buffered data that the STA further needs to send. When the value of the buffer field is not empty, the AP may determine, based on the value of the buffer field, that the STA has the data transmission requirement. When the value of the buffer field is empty, it indicates that the STA has no data transmission requirement.

Figure 2A:
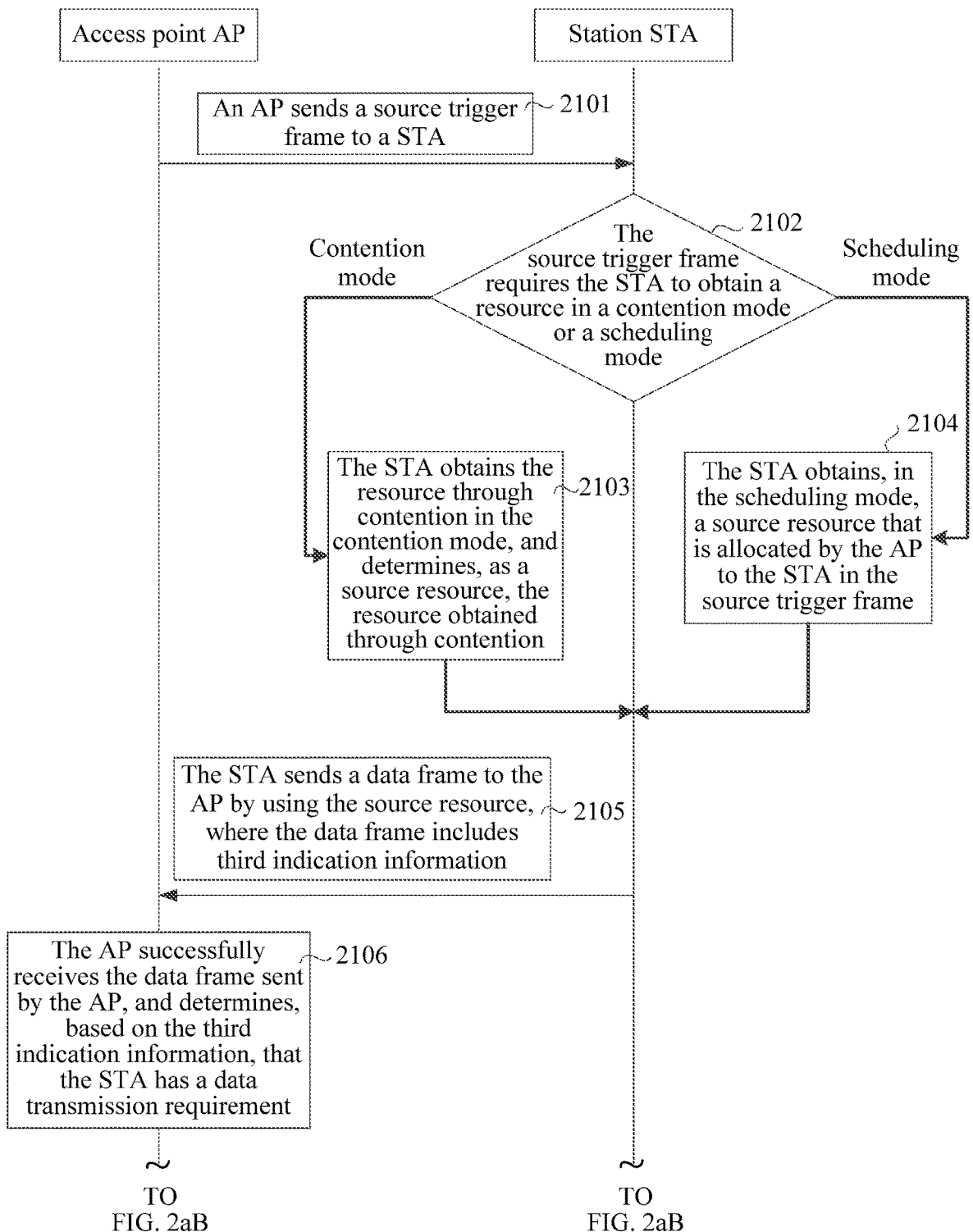
FIG. 2aA and FIG. 2aB are a schematic flowchart of another method for data transmission in a wireless local area network according to an embodiment of the present disclosure.
Figure 2A:
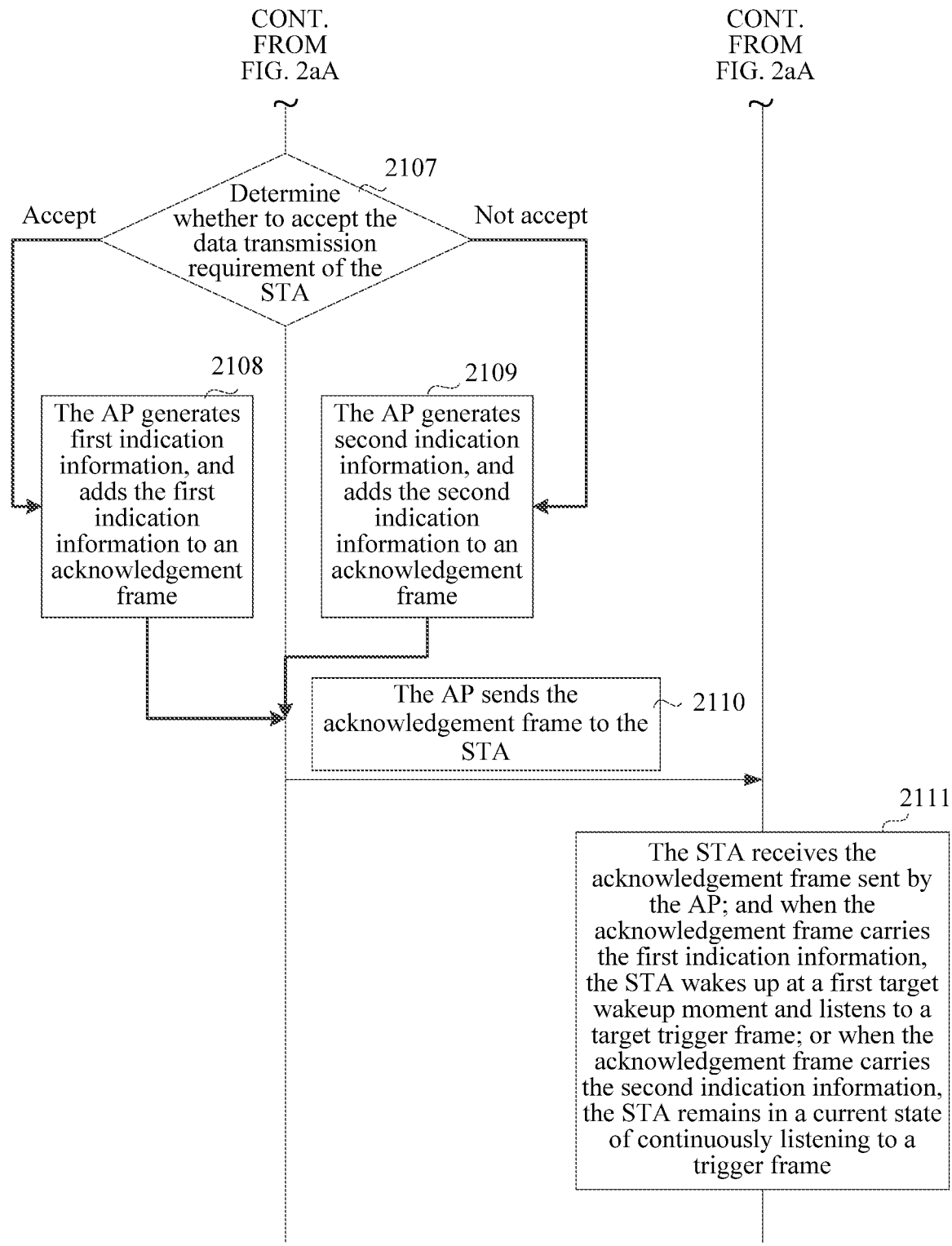

Based on the foregoing descriptions, to describe the method in the embodiments of the present disclosure more clearly, FIG. 2aA and FIG. 2aB show an example of a schematic flowchart of a method for data transmission in a wireless local area network according to an embodiment of the present disclosure. As shown in FIG. 2aA and FIG. 2aB, the method includes the following steps.

Step 2101: An AP sends a source trigger frame to a STA.

Step 2102: The STA determines whether the source trigger frame requires the STA to obtain a resource in a contention mode or a scheduling mode, and performs step 2103 when determining that the source trigger frame requires the STA to obtain the resource in the contention mode, or performs step 2104 when determining that the source trigger frame requires the STA to obtain the resource in the scheduling mode.

Step 2103: The STA obtains the resource through contention in the contention mode, and determines, as a source resource, the resource obtained through contention.

Step 2104: The STA obtains, in the scheduling mode, a source resource that is allocated by the AP to the STA in the source trigger frame.

Step 2105: The STA sends a data frame to the AP by using the source resource, where the data frame includes third indication information.

Step 2106: The AP successfully receives the data frame sent by the STA and determines, based on the third indication information, that the STA has a data transmission requirement.

Step 2107: The AP determines whether to accept the data transmission requirement of the STA, and performs step 2108 when determining to accept the data transmission requirement, or performs step 2109 when determining not to accept the data transmission requirement.

Step 2108: The AP generates first indication information, and adds the first indication information to an acknowledgement frame.

Step 2109: The AP generates second indication information, and adds the second indication information to an acknowledgement frame.

Step 2110: The AP sends the acknowledgement frame to the STA.

Step 2111: The STA receives the acknowledgement frame sent by the AP; and when the acknowledgement frame carries the first indication information, the STA wakes up at a first target wakeup moment and listens to a target trigger frame; or when the acknowledgement frame carries the second indication information, the STA remains in a current state of continuously listening to a trigger frame.

Figure 2B:
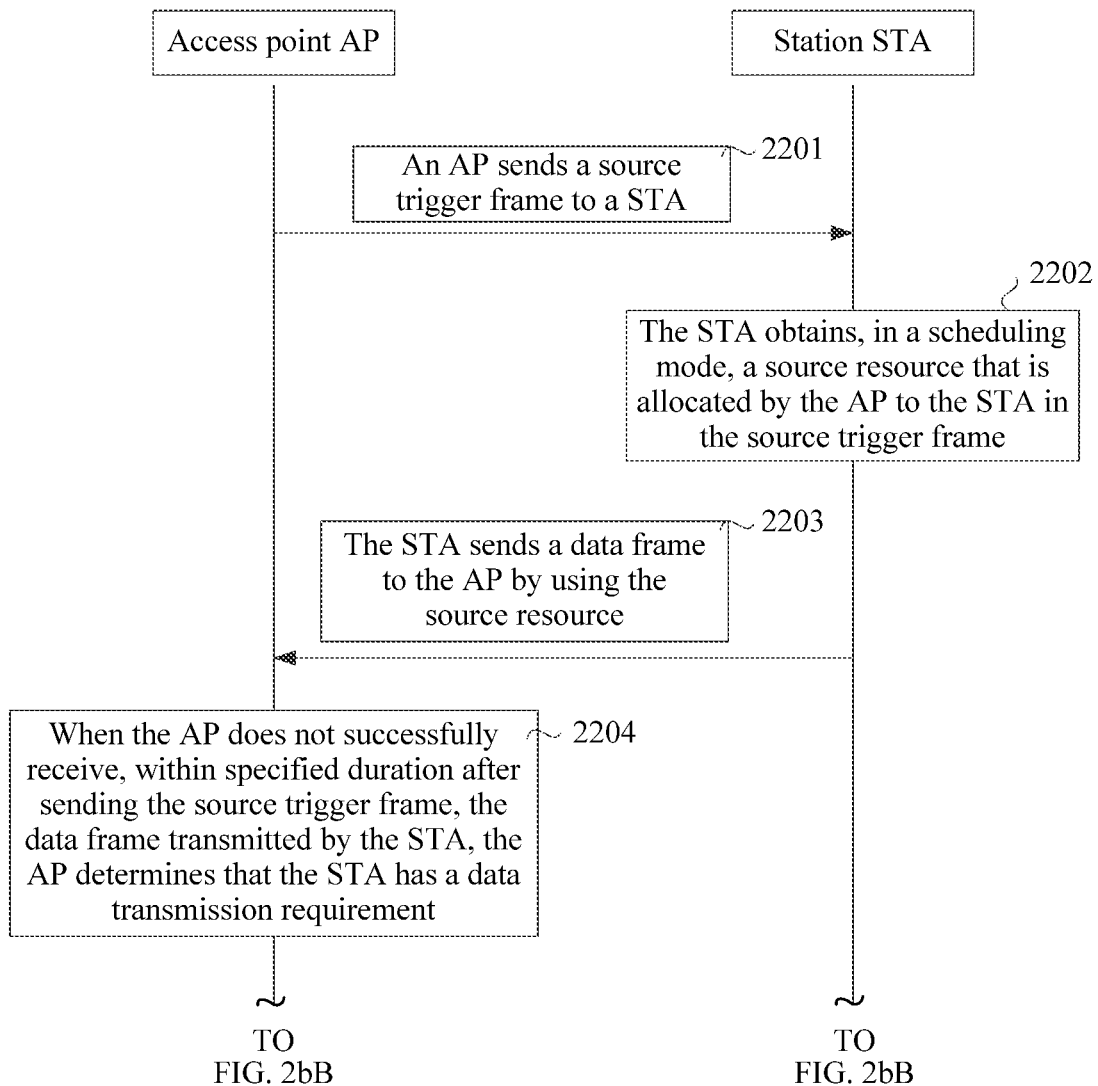
FIG. 2bA and FIG. 2bB are a schematic flowchart of another method for data transmission in a wireless local area network according to an embodiment of the present disclosure.
Figure 2B:
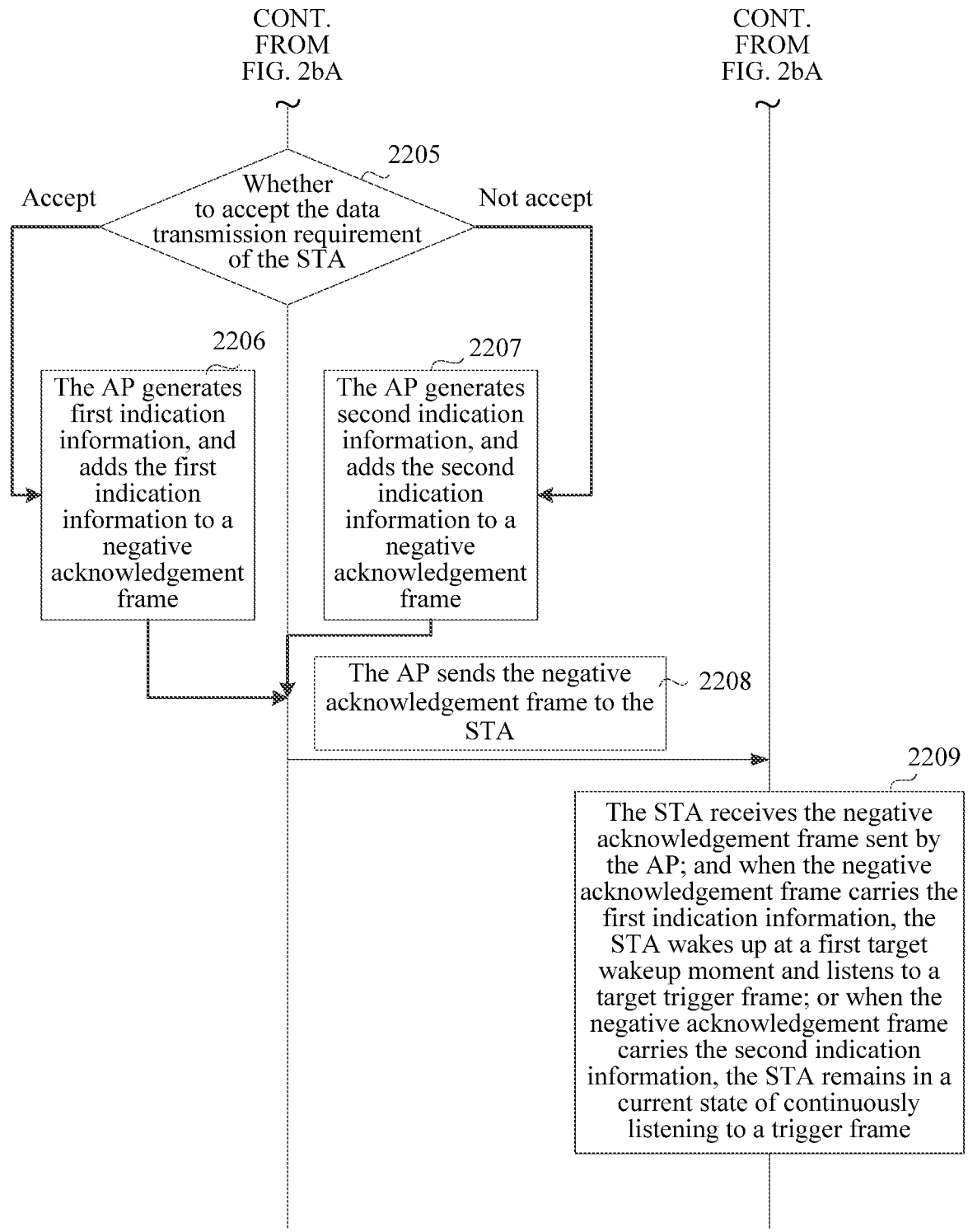

Based on the foregoing descriptions, to describe the method in the embodiments of the present disclosure more clearly, FIG. 2bA and FIG. 2bB show an example of a schematic flowchart of a method for data transmission in a wireless local area network according to an embodiment of the present disclosure. As shown in FIG. 2bA and FIG. 2bB, the method includes the following steps.

Step 2201: An AP sends a source trigger frame to a STA, where the source trigger frame includes an identifier of a source resource that is allocated by the AP to the STA.

Step 2202: The STA obtains, in a scheduling mode, the source resource that is allocated by the AP to the STA in the source trigger frame.

Step 2203: The STA sends a data frame to the AP by using the source resource, where the data frame may include third indication information or may not include third indication information.

Step 2204: When the AP does not successfully receive, within specified duration after sending the source trigger frame, the data frame transmitted by the STA, the AP determines that the STA has a data transmission requirement.

Step 2205: The AP determines whether to accept the data transmission requirement of the STA, and performs step 2206 when determining to accept the data transmission requirement, or performs step 2207 when determining not to accept the data transmission requirement.

Step 2206: The AP generates first indication information, and adds the first indication information to a negative acknowledgement frame.

Step 2207: The AP generates second indication information, and adds the second indication information to a negative acknowledgement frame.

Step 2208: The AP sends the negative acknowledgement frame to the STA.

Step 2209: The STA receives the negative acknowledgement frame sent by the AP; and when the negative acknowledgement frame carries the first indication information, the STA wakes up at a first target wakeup moment and listens to a target trigger frame; or when the negative acknowledgement frame carries the second indication information, the STA remains in a current state of continuously listening to a trigger frame.

In this embodiment of the present disclosure, optionally, the first indication information may carry information used to indicate a mode in which the STA obtains a target resource. In another implementation, the target trigger frame carries information used to indicate a mode in which the STA obtains a target resource. This can help reduce an amount of information carried in the first indication information and reduce energy consumption of the STA. In addition, the AP can allocate, based on a status of each channel, a resource to the STA shortly before the AP sends the target trigger frame. This improves accuracy of allocating a resource to the STA by the AP.

Figure 2C:
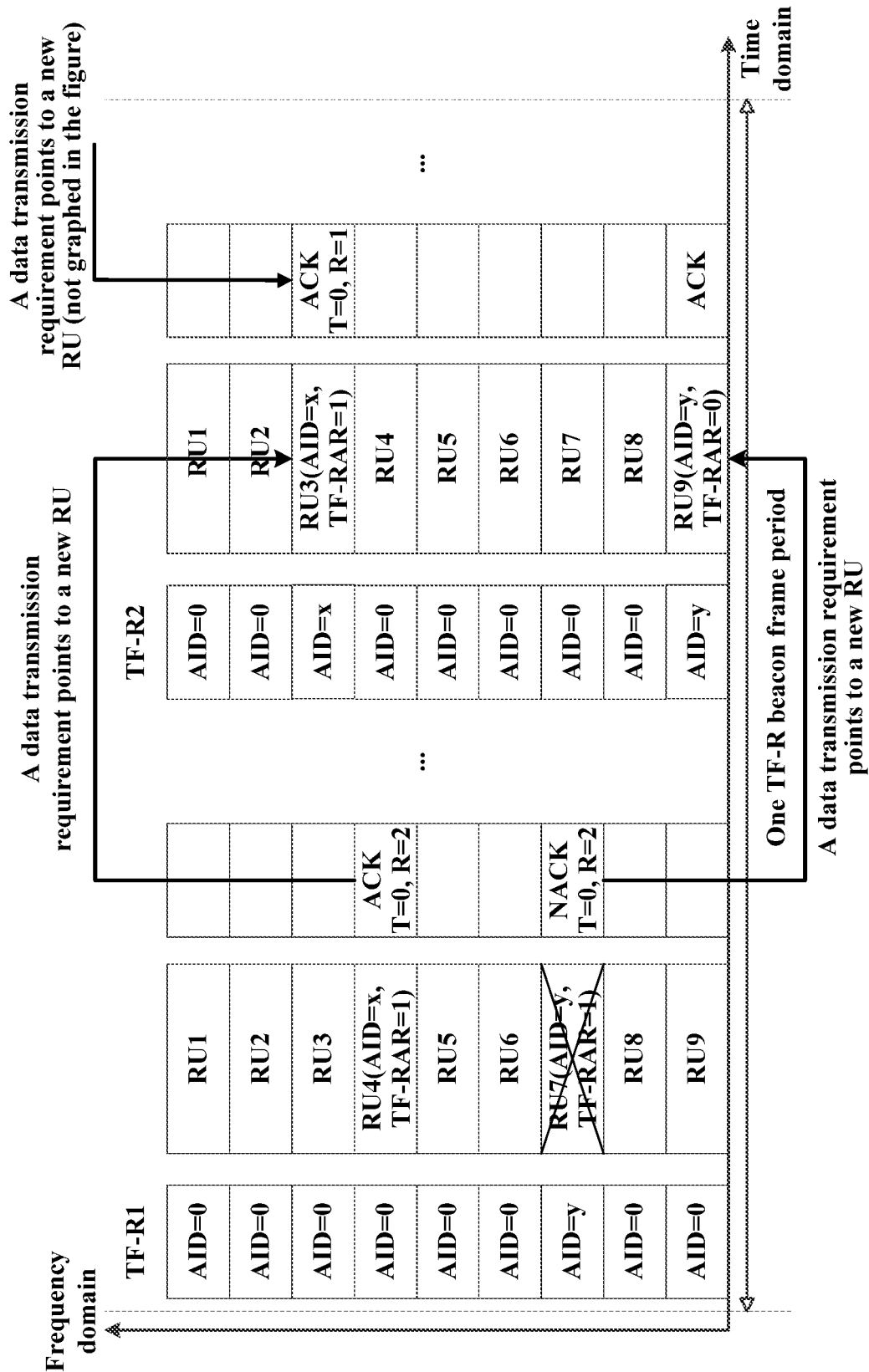
FIG. 2c is a schematic structural diagram of determining, by a STA, a target trigger frame after an AP sends first indication information or second indication information to the STA according to an embodiment of the present disclosure.
Figure 2D:
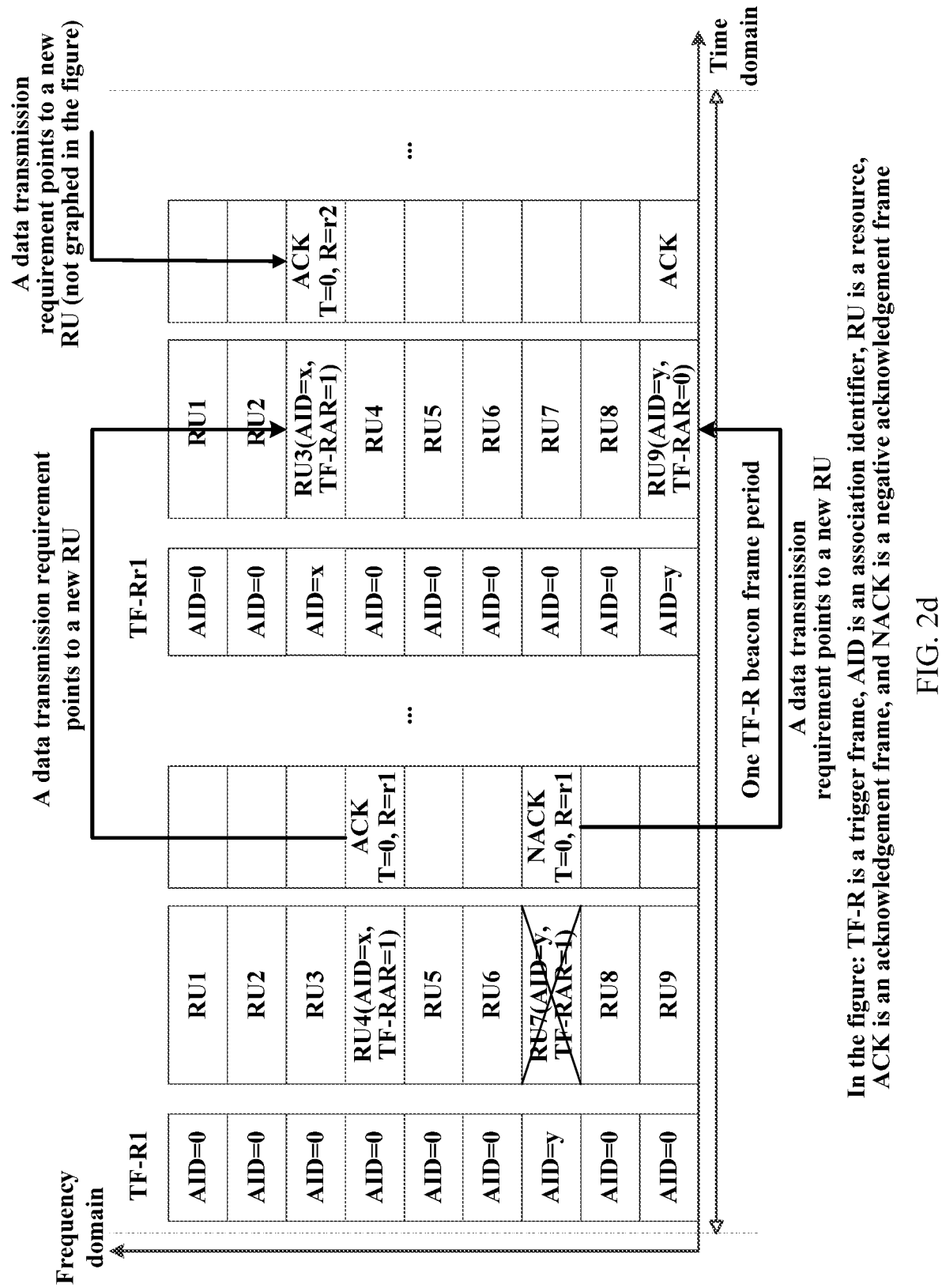
FIG. 2d is a schematic structural diagram of determining, by a STA, a target trigger frame after an AP sends first indication information or second indication information to the STA according to an embodiment of the present disclosure.
Figure 2E:
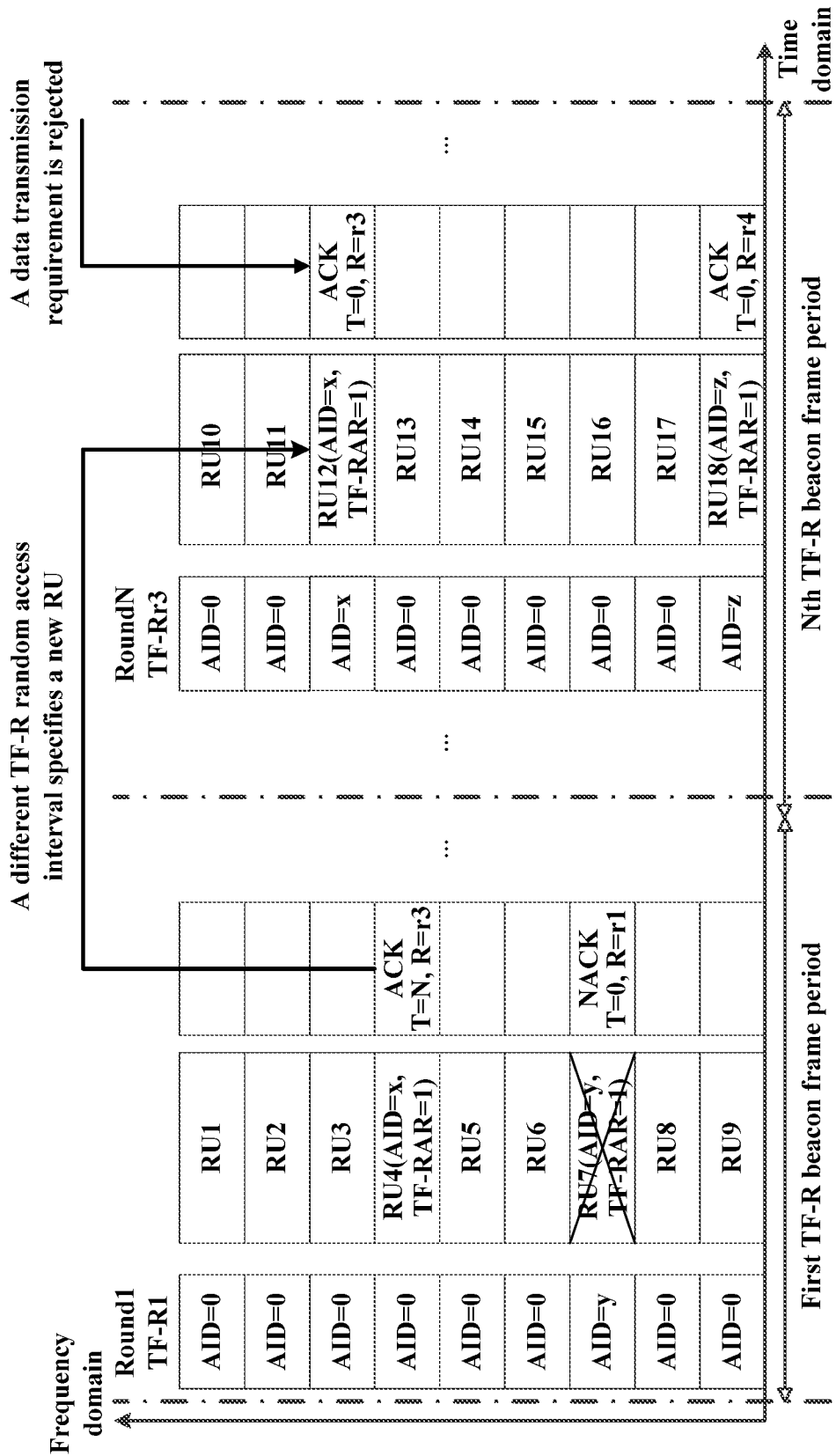
FIG. 2e is a schematic structural diagram of determining, by a STA, a target trigger frame after an AP sends first indication information or second indication information to the STA according to an embodiment of the present disclosure.
Figure 2F:
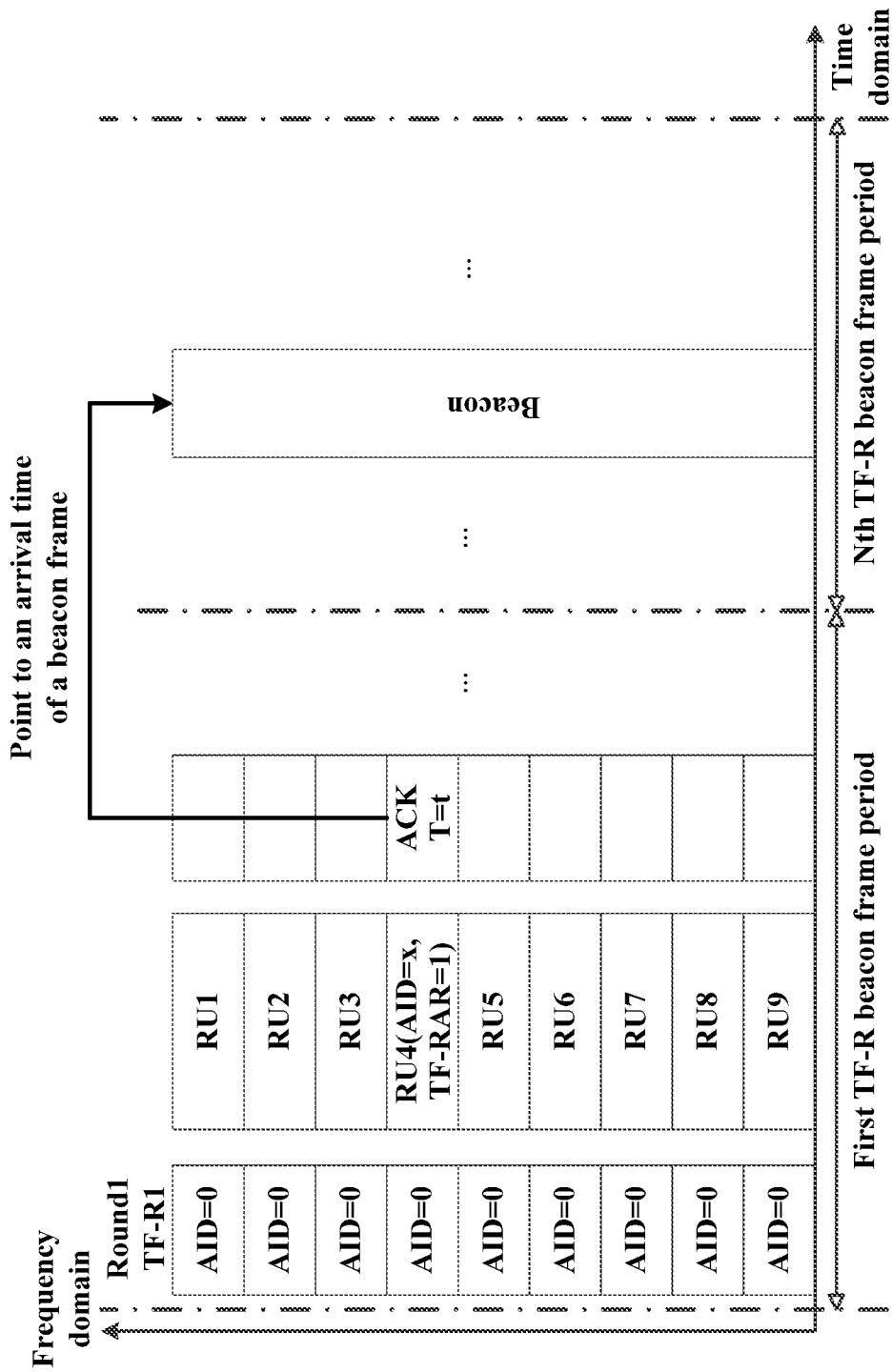
FIG. 2f is a schematic structural diagram of determining, by a STA, a target trigger frame after an AP sends first indication information or second indication information to the STA according to an embodiment of the present disclosure.
Figure 2G:
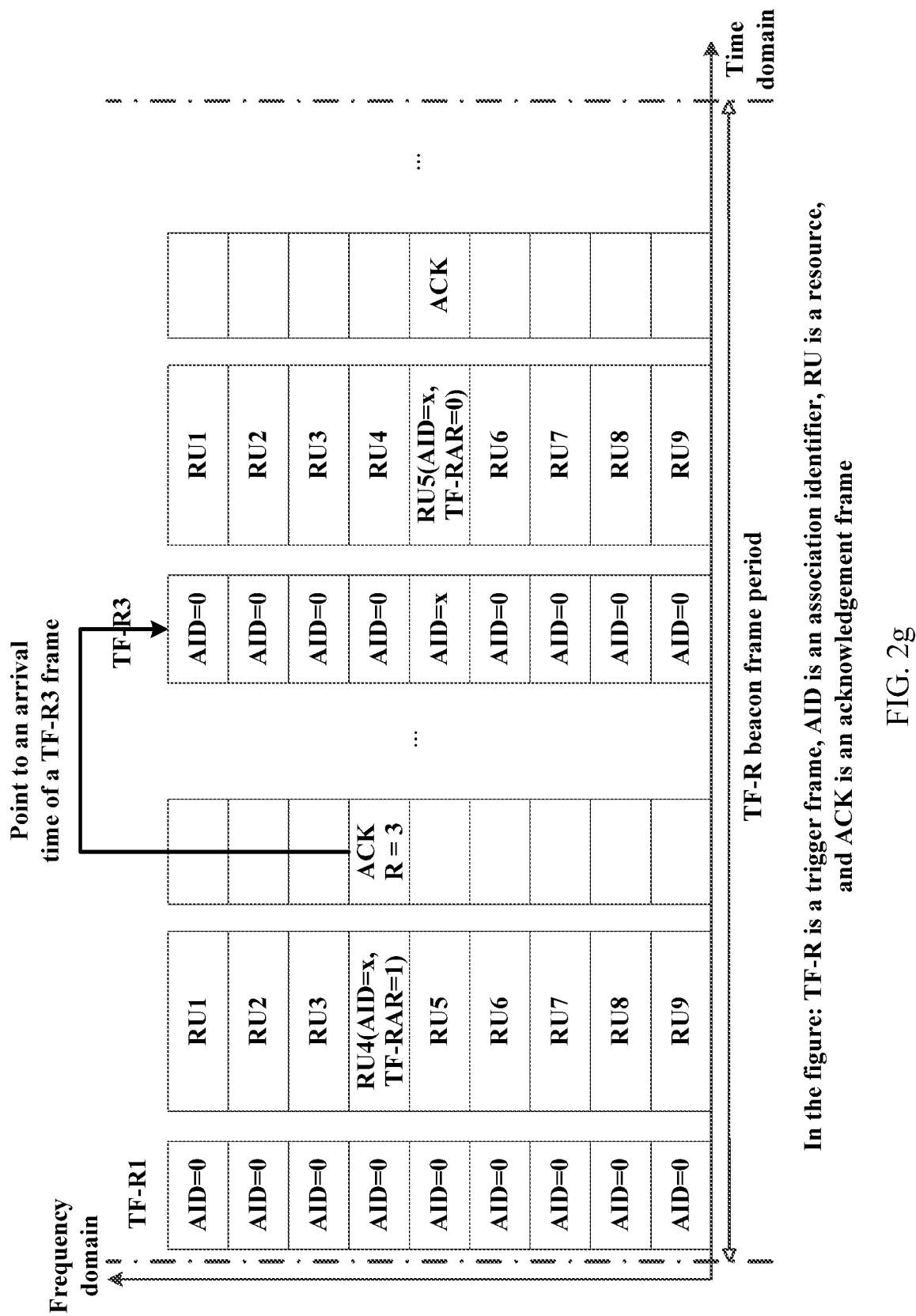
FIG. 2g is a schematic structural diagram of determining, by a STA, a target trigger frame after an AP sends first indication information or second indication information to the STA according to an embodiment of the present disclosure.
Figure 2H:
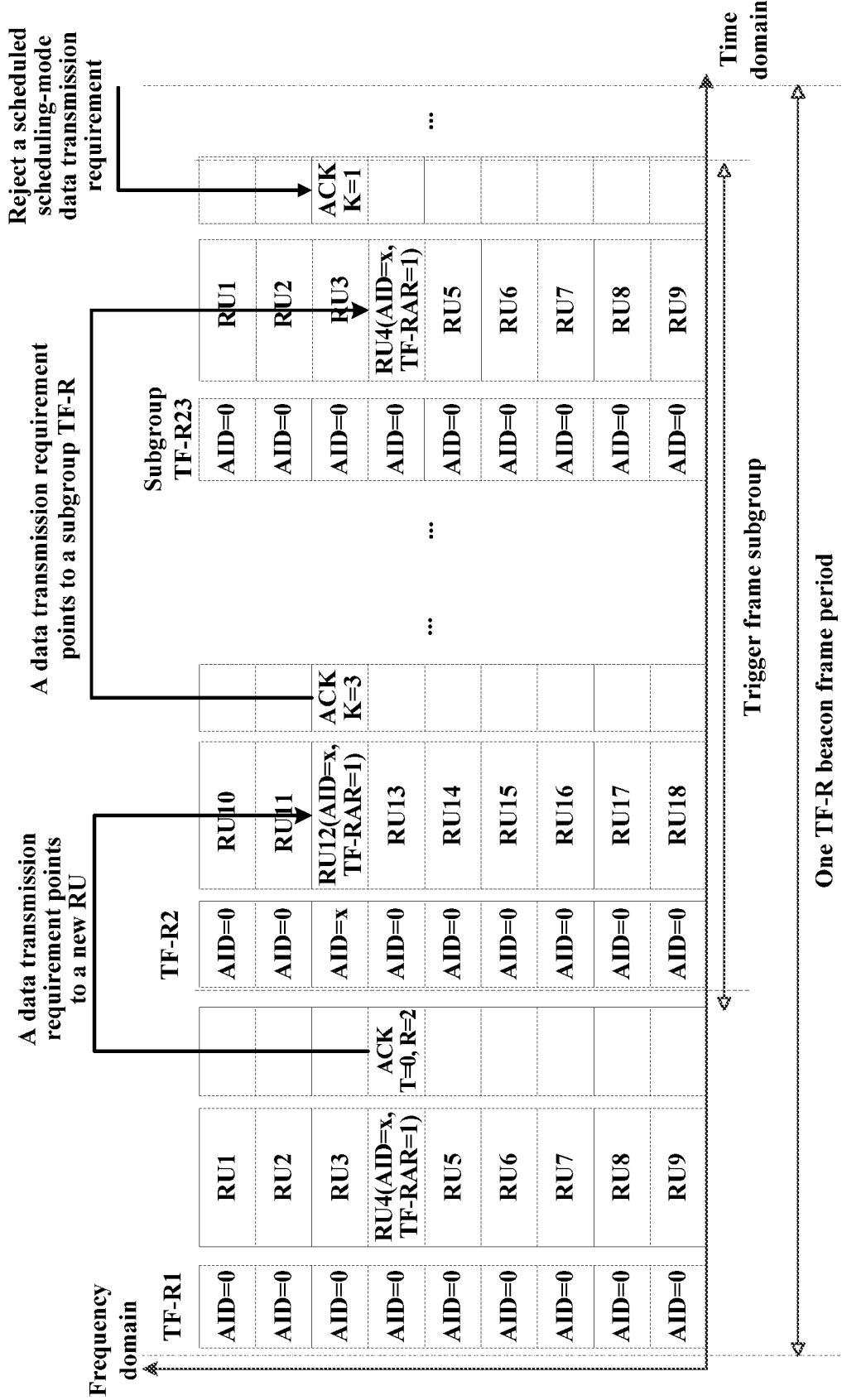
FIG. 2h is a schematic structural diagram of determining, by a STA, a target trigger frame after an AP sends first indication information or second indication information to the STA according to an embodiment of the present disclosure.
Figure 2I:
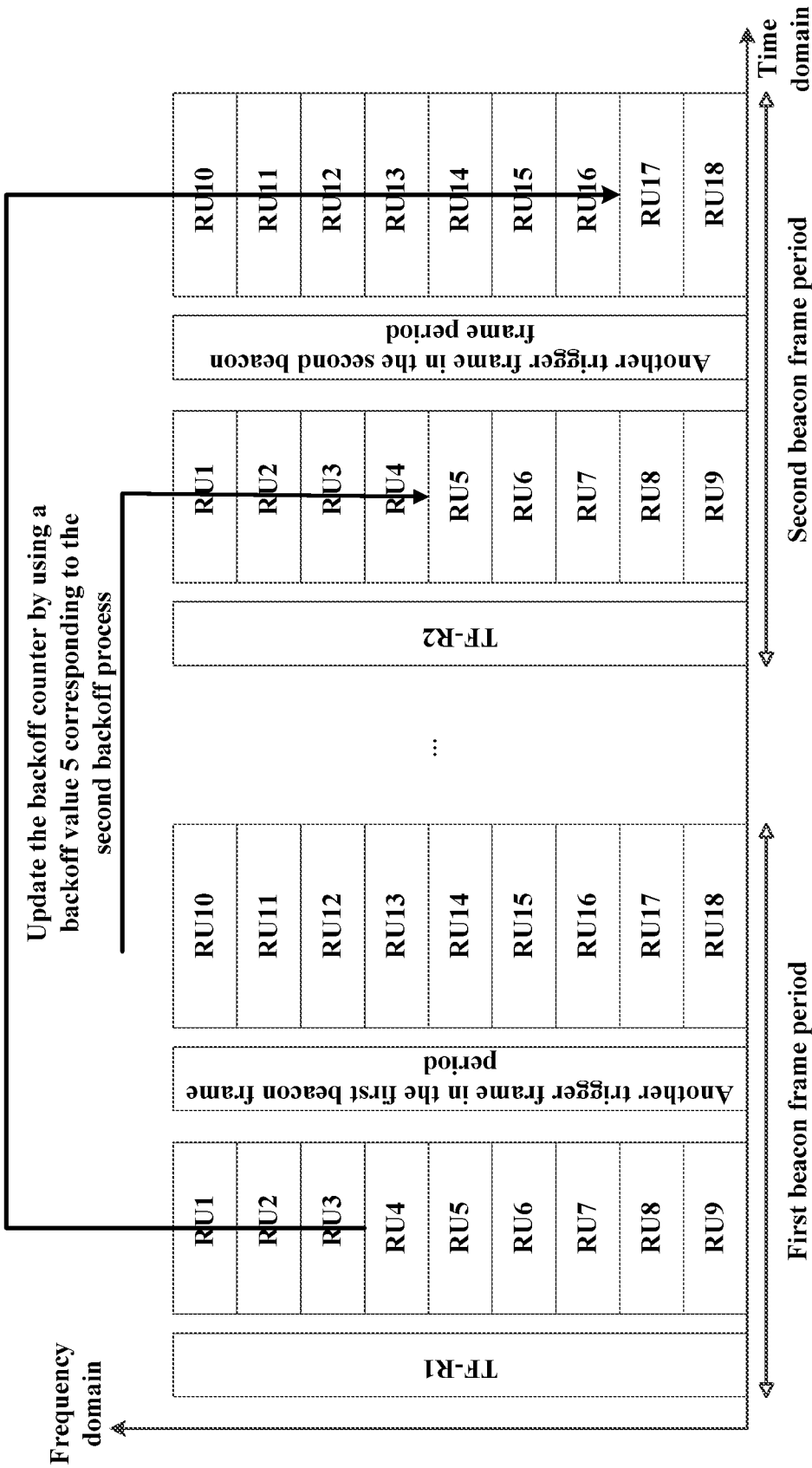
FIG. 2i is a schematic structural diagram of determining, by a STA, a target trigger frame after an AP sends first indication information or second indication information to the STA according to an embodiment of the present disclosure.

Based on the foregoing descriptions, the following uses FIG. 2c, FIG. 2d, FIG. 2e, FIG. 2f, FIG. 2g, FIG. 2h, and FIG. 2i to describe more clearly how the STA determines the target trigger frame after the AP sends the first indication information or the second indication information to the STA in the embodiments of the present disclosure. FIG. 2c is an example of a schematic structural diagram of determining, by a STA, a target trigger frame after an AP sends first indication information or second indication information to the STA according to an embodiment of the present disclosure. FIG. 2d is an example of a schematic structural diagram of determining, by a STA, a target trigger frame after an AP sends first indication information or second indication information to the STA according to an embodiment of the present disclosure. FIG. 2e is an example of a schematic structural diagram of determining, by a STA, a target trigger frame after an AP sends first indication information or second indication information to the STA according to an embodiment of the present disclosure. FIG. 2f is an example of a schematic structural diagram of determining, by a STA, a target trigger frame after an AP sends first indication information or second indication information to the STA according to an embodiment of the present disclosure. FIG. 2g is an example of a schematic structural diagram of determining, by a STA, a target trigger frame after an AP sends first indication information or second indication information to the STA according to an embodiment of the present disclosure. FIG. 2h is an example of a schematic structural diagram of determining, by a STA, a target trigger frame after an AP sends first indication information or second indication information to the STA according to an embodiment of the present disclosure. FIG. 2i is an example of a schematic structural diagram of determining, by a STA, a target trigger frame after an AP sends first indication information or second indication information to the STA according to an embodiment of the present disclosure.

The following describes identifiers in FIG. 2c, FIG. 2d, FIG. 2e, FIG. 2f, FIG. 2g, FIG. 2h, and FIG. 2i. In the figures, a horizontal coordinate represents a time domain, and a vertical coordinate represents a frequency domain. TF-R represents a trigger frame; TF-R1 represents a trigger frame 1; TF-R2 represents a trigger frame 2; TF-Rr1 represents a trigger frame r1, where r1 is an integer; TF-Rr2 represents a trigger frame r2, where r2 is an integer; and TF-Rr3 represents a trigger frame r3, where r3 is an integer. A resource in the embodiments of the present disclosure is specifically a resource unit (RU). In the figures, RU represents a resource, RU1 represents a resource 1, RU2 represents a resource 2, and so on. In the figures, AID represents an association identifier of a STA, "AID=x" represents a STA whose AID is x, "AID=y" represents a STA whose AID is y, and "AID=z" represents a STA whose AID is z. In the figures, TF-RAR represents third indication information, "TF-RAR=1" indicates that a STA has a data transmission requirement, and "TF-RAR=0" indicates that a STA has no data transmission requirement. ACK represents an acknowledgement frame, and NACK represents a negative acknowledgement frame. A beacon frame (Beacon frame) is represented as beacon frame in the figures. In the figures, Round represents a cycle, that is, a beacon frame is sent cyclically. In the figures, a letter T is used to represent a quantity of beacon frame periods between a beacon frame period in which the target trigger frame is sent and a current beacon frame period, a letter R is used to represent a subgroup identifier of a trigger frame subgroup to which the target trigger frame belongs, and a letter K is used to represent a location identifier that represents a sequence number of the target trigger frame in the trigger frame subgroup to which the target trigger frame belongs.

As shown in FIG. 2c, the AP sends a trigger frame TF-R1. In the TF-R1, an AID on an RU7 is y, indicating that a STA whose AID is y is scheduled to send a data frame by using the RU7; AIDs on other resources are all 0, indicating that the other resources may be obtained by a STA through contention. As shown in FIG. 2c, a STA whose AID is x obtains an RU4 through contention in a contention manner, transmits a data frame by using the RU4, and sets a TF-RAR bit to 1 in the data frame. That is, the STA whose AID is x informs the AP that the STA whose AID is x has a data transmission requirement. The AP successfully receives the data frame sent by the STA whose AID is x, and the AP feeds back an ACK to the STA whose AID is x. In the ACK, T is set to 0, and R is set to 2. After receiving the TF-R1, the STA whose AID is x enters a power saving mode, and does not wake up until a trigger frame TF-R2 arrives. The STA whose AID is x listens to the TF-R2, and determines, based on the TF-R2, that the AP schedules the STA whose AID is x to transmit a data frame on an RU12 this time. In this case, the STA whose AID is x transmits the data frame on the RU12, and sets a TF-RAR bit to 1 in the data frame, to inform the AP that the STA whose AID is x still has a data transmission requirement. In this case, after successfully receiving, on the RU12, data transmitted by the STA whose AID is x, the AP determines not to accept the data transmission requirement of the STA whose AID is x. Therefore, the AP feeds back an ACK to the STA whose AID is x, and sets T to 0 and R to 1 in the ACK. After receiving the ACK, the STA whose AID is x finds that a new target trigger frame is the first trigger frame in the first trigger frame subgroup in a current beacon frame period. However, the first trigger frame in the first trigger frame subgroup is the TF-R1, and the TF-R1 has been sent. Therefore, the STA whose AID is x knows that the AP does not accept the data transmission requirement, and the AP subsequently enables a contention mode, so that the STA contends for a resource.

As shown in FIG. 2c, the AP sends the trigger frame TF-R1. In the TF-R1, the AID on the RU7 is y, indicating that the STA whose AID is y is scheduled to send the data frame by using the RU7; the AIDs on the other resources are all 0, indicating that the other resources may be obtained by the STA through contention. As shown in FIG. 2c, the STA whose AID is y transmits, in a scheduling mode, the data frame by using the RU7, and sets a TF-RAR bit to 1 in the data frame. That is, the STA whose AID is y informs the AP that the STA whose AID is y has a data transmission requirement. The AP does not successfully receive, in a preset time period after sending the TF-R1, the data frame sent by the STA whose AID is y. Therefore, the AP feeds back a NACK to the STA whose AID is y. In the NACK, T is set to 0, and R is set to 2. In FIG. 2c, the RU7 that is scheduled for the STA whose AID is y is marked with a cross, indicating that the AP does not successfully receive data transmitted by the STA whose AID is y. After receiving the TF-R1, the STA whose AID is y enters a power saving mode, and does not wake up until a trigger frame TF-R2 arrives. The STA whose AID is y listens to the TF-R2, and determines, based on the TF-R2, that the AP schedules the STA whose AID is y to transmit a data frame on an RU18 this time. In this case, the STA whose AID is y transmits the data frame on the RU18. The STA may retransmit the data frame that previously fails to be transmitted, or may transmit a new data frame. This is not limited in this embodiment of the present disclosure. The STA whose AID is y sets a TF-RAR bit to 0 in the data frame, that is, informs the AP that the STA whose AID is y has no data transmission requirement. In this case, after the AP successfully receives, on the RU18, data transmitted by the STA whose AID is y, and determines that the STA whose AID is y has no data transmission requirement, the AP feeds back an ACK to the STA whose AID is y.

As shown in FIG. 2d, the AP sends a trigger frame TF-R1. In the TF-R1, an AID on the RU7 is y, indicating that a STA whose AID is y is scheduled to send a data frame by using the RU7; AIDs on other resources are all 0, indicating that the other resources may be obtained by a STA through contention. As shown in FIG. 2d, a STA whose AID is x obtains an RU4 through contention in a contention manner, transmits a data frame by using the RU4, and sets a TF-RAR bit to 1 in the data frame. That is, the STA whose AID is x informs the AP that the STA whose AID is x has a data transmission requirement. The AP successfully receives the data frame sent by the STA whose AID is x, and the AP feeds back an ACK to the STA whose AID is x. In the ACK, T is set to 0, and R is set to r1. After receiving the TF-R1, the STA whose AID is x enters a power saving mode, and does not wake up until a trigger frame TF-Rr1 arrives. The STA whose AID is x listens to the TF-Rr1, and determines, based on the TF-Rr1, that the AP schedules the STA whose AID is x to transmit a data frame on an RU3 this time. In this case, the STA whose AID is x transmits the data frame on the RU3, and sets a TF-RAR bit to 1 in the data frame, to inform the AP that the STA whose AID is x still has a data transmission requirement. In this case, after successfully receiving, on the RU3, data transmitted by the STA whose AID is x, the AP determines to accept the data transmission requirement of the STA whose AID is x. Therefore, the AP feeds back an ACK to the STA whose AID is x, and sets T to 0 and R to r2 in the ACK. After receiving the ACK, the STA whose AID is x finds that a new target trigger frame is the first trigger frame in the $r2^{th}$ trigger frame subgroup in a current beacon frame period. Therefore, the STA whose AID is x enters the power saving mode, and does not wake up until a moment at which the first trigger frame in the $r2^{th}$ trigger frame subgroup in the current beacon frame period arrives.

As shown in FIG. 2d, the AP sends the trigger frame TF-R1. In the TF-R1, the AID on the RU7 is y, indicating that the STA whose AID is y is scheduled to send the data frame by using the RU7; the AIDs on the other resources are all 0, indicating that the other resources may be obtained by the STA through contention. As shown in FIG. 2d, the STA whose AID is y transmits the data frame in a scheduling mode by using the RU7, and sets a TF-RAR bit to 1 in the data frame. That is, the STA whose AID is y informs the AP that the STA whose AID is y has a data transmission requirement. The AP does not successfully receive, in a preset time period after sending the TF-R1, the data frame sent by the STA whose AID is y. Therefore, the AP feeds back a NACK to the STA whose AID is y. In the NACK, T is set to 0, and R is set to r1. In FIG. 2d, the RU7 that is scheduled for the STA whose AID is y is marked with a cross, indicating that the AP does not successfully receive data transmitted by the STA whose AID is y. After receiving the TF-R1, the STA whose AID is y enters a power saving mode, and does not wake up until a trigger frame TF-Rr1 arrives. The STA whose AID is y listens to the TF-Rr1, and determines, based on the TF-Rr1, that the AP schedules the STA whose AID is y to transmit a data frame on an RU9 this time. In this case, the STA whose AID is y transmits the data frame on the RU9. The STA may retransmit the data frame that previously fails to be transmitted, or may transmit a new data frame. This is not limited in this embodiment of the present disclosure. The STA whose AID is y sets a TF-RAR bit to 0 in the data frame, that is, informs the AP that the STA whose AID is y has no data transmission requirement. In this case, after the AP successfully receives, on the RU9, data transmitted by the STA whose AID is y, and determines that the STA whose AID is y has no data transmission requirement, the AP feeds back an ACK to the STA whose AID is y.

As shown in FIG. 2e, the AP sends a trigger frame TF-R1. In the TF-R1, an AID on an RU7 is y, indicating that a STA whose AID is y is scheduled to send a data frame by using the RU7; AIDs on other resources are all 0, indicating that the other resources may be obtained by a STA through contention. As shown in FIG. 2e, a STA whose AID is x obtains an RU4 through contention in a contention manner, transmits a data frame by using the RU4, and sets a TF-RAR bit to 1 in the data frame. That is, the STA whose AID is x informs the AP that the STA whose AID is x has a data transmission requirement. The AP successfully receives the data frame sent by the STA whose AID is x, and the AP feeds back an ACK to the STA whose AID is x. In the ACK, T is set to N, and R is set to r3. In this embodiment of the present disclosure, a current beacon frame period is the zeroth beacon frame period. When T is 1, it indicates that there is one beacon frame period between a beacon frame period in which the target trigger frame is sent and the current beacon frame period. In other words, the beacon frame period in which the target trigger frame is sent is the first beacon frame period, and there is one beacon frame period between the first beacon frame period and the zeroth beacon frame period. After receiving the TF-R1, the STA whose AID is x enters a power saving mode, and does not wake up until a trigger frame TF-Rr3 in the $N^{th}$ beacon frame period arrives. The STA whose AID is x listens to the TF-Rr3, and determines, based on the TF-Rr3, that the AP schedules the STA whose AID is x to transmit a data frame on an RU12 this time. In this case, the STA whose AID is x transmits the data frame on the RU12, and sets a TF-RAR bit to 1 in the data frame, to inform the AP that the STA whose AID is x still has a data transmission requirement. In this case, after successfully receiving, on the RU12, data transmitted by the STA whose AID is x, the AP determines not to accept the data transmission requirement of the STA whose AID is x. Therefore, the AP feeds back an ACK to the STA whose AID is x, and sets T to 0 and R to r3 in the ACK. After receiving the ACK, the STA whose AID is x finds that a new target trigger frame is the first trigger frame in the $r3^{th}$ trigger frame subgroup in a current beacon frame period, that is, the $N^{th}$ beacon frame period. However, the first trigger frame in the $r3^{th}$ trigger frame subgroup in the $N^{th}$ beacon frame period has been sent. Therefore, the STA whose AID is x knows that the AP does not accept the data transmission requirement, and the AP subsequently enables a contention mode, so that the STA contends for a resource.

As shown in FIG. 2e, the AP sends a trigger frame TF-R1. In the TF-R1, the AID on the RU7 is y, indicating that the STA whose AID is y is scheduled to send the data frame by using the RU7; the AIDs on the other resources are all 0, indicating that the other resources may be obtained by the STA through contention. As shown in FIG. 2e, the STA whose AID is y transmits the data frame in a scheduling mode by using the RU7, and sets a TF-RAR bit to 1 in the data frame. That is, the STA whose AID is y informs the AP that the STA whose AID is y has a data transmission requirement. The AP does not successfully receive, in a preset time period after sending the TF-R1, the data frame sent by the STA whose AID is y. Therefore, the AP feeds back a NACK to the STA whose AID is y. In the NACK, T is set to 0, and R is set to r1. In FIG. 2e, the RU7 that is scheduled for the STA whose AID is y is marked with a cross, indicating that the AP does not successfully receive data transmitted by the STA whose AID is y. After receiving the TF-R1, the STA whose AID is y enters a power saving mode, and does not wake up until a trigger frame TF-Rr1 arrives. The STA whose AID is y listens to the TF-Rr1.

As shown in FIG. 2e, the AP schedules, in the $N^{th}$ beacon frame period, a STA whose AID is z to transmit data on an RU18. The STA whose AID is z transmits a data frame in a scheduling mode by using the RU18, and sets a TF-RAR bit to 1 in the data frame. That is, the STA whose AID is z informs the AP that the STA whose AID is z has a data transmission requirement. The AP successfully receives, in a preset time period after sending the TF-Rr3, the data frame sent by the STA whose AID is z. Therefore, the AP feeds back an ACK to the STA whose AID is z, and sets T to 0 and R to r4 in the ACK. This indicates that a target trigger frame that the STA whose AID is z needs to access next time is the first trigger frame in the $r4^{th}$ trigger frame subgroup in a current beacon frame period. After receiving the TF-R1, the STA whose AID is z enters a power saving mode, and does not wake up until the trigger frame TF-Rr1 arrives. The STA whose AID is z listens to the TF-Rr1.

As shown in FIG. 2f, the AP sends a trigger frame TF-R1. In the TF-R1, AIDs on resources are all 0, indicating that the resources may be obtained by a STA through contention. As shown in FIG. 2f, a STA whose AID is x obtains an RU4 through contention in a contention manner, transmits a data frame by using the RU4, and sets a TF-RAR bit to 1 in the data frame. That is, the STA whose AID is x informs the AP that the STA whose AID is x has a data transmission requirement. The AP successfully receives the data frame sent by the STA whose AID is x, and the AP feeds back an ACK to the STA whose AID is x. In the ACK, T is set to t, indicating that the STA whose AID is x needs to enter a power saving mode, and wake up when duration t elapses after a current moment. T is set to t, and t represents a time difference between a sending moment of the first beacon frame in a beacon frame period in which the target trigger frame is sent and the current moment. In the figure, it is assumed that the beacon frame period in which the target trigger frame is sent is the $N^{th}$ beacon frame period. In this case, after receiving the TF-R1, the STA whose AID is x enters the power saving mode, and does not wake up until a sending moment of the first beacon frame in the $N^{th}$ beacon frame period. The STA whose AID is x listens to a trigger frame. In this case, the target trigger frame is sent at a moment after the sending moment of the first beacon frame in the $N^{th}$ beacon frame period.

As shown in FIG. 2g, the AP sends a trigger frame TF-R1. In the TF-R1, AIDs on resources are all 0, indicating that the resources may be obtained by a STA through contention. As shown in FIG. 2g, a STA whose AID is x obtains an RU4 through contention in a contention manner, transmits a data frame by using the RU4, and sets a TF-RAR bit to 1 in the data frame. That is, the STA whose AID is x informs the AP that the STA whose AID is x has a data transmission requirement. The AP successfully receives the data frame sent by the STA whose AID is x, and the AP feeds back an ACK to the STA whose AID is x. In the ACK, T is set as empty, and only R is set to 3. R is 3, indicating that a first target wakeup moment is a sending moment of the first trigger frame in the third trigger frame subgroup in a current beacon frame period. After receiving the TF-R1, the STA whose AID is x enters a power saving mode, and does not wake up until the first trigger frame in the third trigger frame subgroup in the current beacon frame period, that is, a TF-R3, arrives. The STA whose AID is x listens to the TF-R3, and determines, based on the TF-R3, that the AP schedules the STA whose AID is x to transmit a data frame on an RU5 this time. In this case, the STA whose AID is x transmits the data frame on the RU5, and sets a TF-RAR bit to 0 in the data frame, to inform the AP that the STA whose AID is x has no data transmission requirement. In this case, after the AP successfully receives, on the RU5, data transmitted by the STA whose AID is x, the AP feeds back an ACK to the STA whose AID is x.

As shown in FIG. 2h, the AP sends a trigger frame TF-R1. In the TF-R1, AIDs on resources are all 0, indicating that the resources may be obtained by a STA through contention. As shown in FIG. 2h, a STA whose AID is x obtains an RU4 through contention in a contention manner, transmits a data frame by using the RU4, and sets a TF-RAR bit to 1 in the data frame. That is, the STA whose AID is x informs the AP that the STA whose AID is x has a data transmission requirement. The AP successfully receives the data frame sent by the STA whose AID is x, and the AP feeds back an ACK to the STA whose AID is x. In the ACK, T is set to 0, and R is set to 2. This indicates that a first target wakeup moment is a sending moment of the first trigger frame in the second trigger frame subgroup in a current beacon frame period. After receiving the TF-R1, the STA whose AID is x enters a power saving mode, and does not wake up until a trigger frame TF-R2 arrives. The STA whose AID is x listens to the TF-R2, and determines, based on the TF-R2, that the AP schedules the STA whose AID is x to transmit a data frame on an RU12 this time. In this case, the STA whose AID is x transmits the data frame on the RU12, and sets a TF-RAR bit to 1 in the data frame, to inform the AP that the STA whose AID is x still has a data transmission requirement. In this case, after the AP successfully receives, on the RU12, data transmitted by the STA whose AID is x, the AP determines to accept the data transmission requirement of the STA whose AID is x. Therefore, the AP feeds back an ACK to the STA whose AID is x, and sets K to 3 in the ACK, but does not set values of T and R. In this case, K is 3, indicating that a first target wakeup moment is the third trigger frame in a current trigger frame subgroup in a current beacon frame period. In the figure, it is assumed that the third trigger frame in the current trigger frame subgroup in the current beacon frame period is a TF-R23. In this case, the STA whose AID is x enters the power saving mode, and does not wake up until the trigger frame TF-R23 arrives. The STA whose AID is x listens to the TF-R23. In the trigger frame TF-R23, no corresponding resource is allocated to the STA whose AID is x. Therefore, after detecting the TF-R23, the STA whose AID is x contends for a resource in a contention mode. In the figure, after detecting the TF-R23, the STA whose AID is x obtains the RU4 through contention. In this case, the STA whose AID is x transmits data on the RU4, and sets a TF-RAR bit to 1, to inform the AP that the STA whose AID is x has a data transmission requirement. After successfully receiving a data frame sent by the STA whose AID is x, the AP feeds back an ACK, and sets K to 1 in the ACK, but does not set values of T and R. In this case, K is 1, indicating that a first target wakeup moment is the first trigger frame in the current trigger frame subgroup in the current beacon frame period. Because the TF-R23 is the third trigger frame in the current trigger frame subgroup in the current beacon frame period and has been sent by the AP, the first target wakeup moment is the first trigger frame in the current trigger frame subgroup in the current beacon frame period, and the first trigger frame has also been sent. That is, in this case, K=1 indicates that the first target wakeup moment is an invalid value. In other words, the AP does not accept the data transmission requirement of the STA. Specifically, when the AP does not accept the data transmission requirement of the STA, that is, the AP refuses to allocate a resource to the STA in a scheduling mode, after receiving the ACK, the STA may still obtain a resource through contention in the contention mode. Therefore, that the AP does not accept the data transmission requirement of the STA specifically means that the AP refuses a scheduling-mode data transmission requirement scheduled by the STA.

Optionally, based on the foregoing descriptions, an embodiment of the present disclosure further provides a backoff method. After a STA receives a trigger frame sent by an AP and needs to contend for a resource in a contention mode, the STA contends for the resource by using the backoff method. The trigger frame sent by the AP may be a source trigger frame, a target trigger frame, or another trigger frame. After receiving the source trigger frame, the target trigger frame, or the other trigger frame, the STA may use the following method when the STA needs to contend for a resource in the contention mode. For clear description, the following content in this embodiment of the present disclosure provides descriptions by using an example in which an AP sends a target trigger frame to a STA, where the target trigger frame requires the STA to contend for a resource in a contention mode.

Optionally, the AP sends, to the STA, a target trigger frame that the STA needs to listen to next time, where the target trigger frame includes information that causes the STA to obtain a target resource in the contention mode after receiving the target trigger frame.

The target trigger frame is used to cause the STA to obtain the target resource through contention by using N backoff processes, that is, the STA obtains the target resource through contention by using the N backoff processes, where N is an integer greater than or equal to 1, one backoff process is corresponding to one beacon frame period, one beacon frame period is corresponding to information about one minimum contention window and one maximum contention window, the minimum contention window and the maximum contention window are two numbers greater than or equal to 0, and the maximum contention window is greater than the minimum contention window.

For the $i^{th}$ backoff process in the N backoff processes, where i is an integer greater than 1 and less than or equal to N, the following operations are performed:

when determining that, in the $(i-1)^{th}$ backoff process, a value of a backoff counter still does not decrease to 0 when the STA receives the first trigger frame in a next beacon frame period of a beacon frame period corresponding to the $(i-1)^{th}$ backoff process, starting, by the STA, the $i^{th}$ backoff process, and updating the value of the backoff counter by using a calculated backoff value corresponding to the $i^{th}$ backoff process, where the value of the backoff counter decreases by 1 when a resource that can be randomly accessed is received; and the backoff value corresponding to the $i^{th}$ backoff process is calculated by using the following formula:

$$Bocurr=\min[Bopre, rand[0, CWO-1]], \text{ where}$$

Bocurr is the backoff value corresponding to the $i^{th}$ backoff process;

Bopre is a value of the backoff counter read when the STA receives the first trigger frame in the next beacon frame period of the beacon frame period corresponding to the $(i-1)^{th}$ backoff process;

CWO is a random integer in a minimum contention window and a maximum contention window that are corresponding to a beacon frame period corresponding to the $i^{th}$ backoff process;

rand[0, CWO-1] represents a random integer between 0 and (CWO-1); and min[Bopre, rand[0, CWO-1]] represents a smaller number in Bopre and rand[0, CWO-1].

FIG. 2i is an example of a schematic diagram of selecting, by a STA, a resource based on a backoff mechanism according to an embodiment of the present disclosure. As shown in FIG. 2i, after receiving a trigger frame TF-R1 that is sent by an AP in the first beacon frame period, the STA determines that the STA needs to contend for the resource in a contention mode. In this case, the STA starts the first backoff process, and selects an initial value of a backoff counter. For the first beacon frame period, a maximum contention window is 2, and a maximum contention window is 50. In this case, the STA selects an initial value of the backoff counter in the first backoff process. A selection range of the initial value of the backoff counter in the first backoff process is [2, 50]. That is, the selection range of the initial value of the backoff counter in the first backoff process is from the minimum contention window to the maximum contention window of the first beacon frame period. Optionally, the minimum contention window 2 may be selected as the initial value of the backoff counter in the first backoff process. Then, the backoff counter decreases by 1 when an accessible resource is detected. When the backoff counter changes to 0, the STA accesses a resource that can be randomly accessed. When access succeeds, the STA transmits data. When resource access fails, a value of the backoff counter increases. Optionally, usually, a value of the backoff counter changes to 2j-1 upon the $j^{th}$ access failure, where j is an integer greater than 1. For example, upon the second access failure, a value of the backoff counter changes to 3; upon the third access failure, a value of the backoff counter changes to 7.

When the STA receives the first beacon frame in the second beacon frame period, for example, a TF-R2 in the figure, a value of the backoff counter corresponding to the STA still does not decrease to 0. For example, the value of the backoff counter multiplies to 17 because the STA fails a plurality of times to access a resource in the first beacon frame period. As shown in FIG. 2i, if the STA backs off based on a current value of the backoff counter, the STA can access a resource RU17 only when receiving the RU17. However, in this embodiment of the present disclosure, in this case, a backoff value corresponding to the second backoff process is recalculated to update the value of the backoff counter, and the second backoff process is corresponding to the second beacon frame period. A minimum contention window corresponding to the second beacon frame period is 10, and a maximum contention window corresponding to the second beacon frame period is 70.

The backoff value, corresponding to the second backoff process, used to update the value of the backoff counter is calculated as follows:

CWO is a random integer in a minimum contention window and a maximum contention window of the beacon frame period corresponding to the second backoff process, that is, an integer is randomly selected from a range of 10 to 70. For example, 10 is selected as CWO.

A value of rand[0, CWO-1] is a random integer selected from 0 to 10. For example, 5 is selected. Bopre is a value of the backoff counter when the STA receives the first beacon frame in a beacon frame period corresponding to the first backoff process. For example, the value is 17.

min[Bopre, rand[0, CWO-1]] represents a smaller number in Bopre and rand[0, CWO-1], for example, 5. That is, Bocurr is the backoff value corresponding to the $i^{th}$ backoff process, and Bocurr is 5.

It can be learned that, when 5 is used to update the value of the backoff counter in the second backoff process, the STA can access an RU5 when the RU5 is received. In this example, it is assumed that an RU1 to an RU18 all are resources that can be randomly accessed.

In this embodiment of the present disclosure, each beacon frame period is corresponding to a backoff process. In the backoff process, the backoff counter changes. However, a maximum value of the backoff counter is not greater than a maximum contention window of a beacon frame period corresponding to the backoff process.

From the foregoing method, it can be learned that an advantage of the foregoing method lies in the following: When there are a large quantity of active STAs in a WLAN, a plurality of random resource access attempts made by a STA are likely to fail. As a result, a value of a backoff counter multiplies. In this case, for a STA that does not successfully back off to 0 in a beacon frame period and needs to start a next backoff process in a next beacon frame period, the method provided in this embodiment of the present disclosure is used, so that in the started next backoff process, an initial value of the backoff counter is a smaller value of a remaining value of the backoff counter in a current backoff process and an initial value calculated by the backoff counter in the next backoff process. This avoids a problem in the prior art that a backoff window multiplies when a new backoff process is started, but achieves an objective of minimizing a backoff window in a next backoff process for a STA that has started a backoff process, and improves resource access efficiency of the STA that has started a backoff process.

In the embodiments of the present disclosure, a basic DCF process based on request to send (RTS)/clear to send (CTS) is as follows: When a value of a backoff counter decreases to 0 in a backoff process, a STA sends an RTS frame, where the RTS frame carries a duration field, used to indicate corresponding duration within which another STA is not allowed to send data. The frame is used for handshake with an AP, and also makes another STA that can listen to the STA remain silent within a sending time of the STA. Similarly, after receiving the RTS, the AP returns a CTS to the STA, and a function of the CTS is similar to that of the RTS. After an RTS/CTS handshake succeeds, data transmission is performed.

From the foregoing content, it can be learned that, in the embodiments of the present disclosure, when the STA has the data transmission requirement and the AP accepts the data transmission requirement, the AP generates the first indication information, where the first indication information includes the information used to indicate the first target wakeup moment, and the first target wakeup moment is not later than the sending moment of the target trigger frame that the STA needs to listen to next time, and is not earlier than the sending moment of the first beacon frame in the beacon frame period in which the target trigger frame is sent; and the AP sends the first indication information to the STA. Because the first target wakeup moment is not later than the sending moment of the target trigger frame that the STA needs to listen to next time, and is not earlier than the sending moment of the first beacon frame in the beacon frame period in which the target trigger frame is sent, after receiving the first indication information, the STA may enter the power saving mode, and does not listen to a trigger frame or wake up until the first target wakeup moment. In addition, after waking up, the STA does not miss time for listening to the target trigger frame. This reduces energy consumption in a data transmission process.

Figure 3:
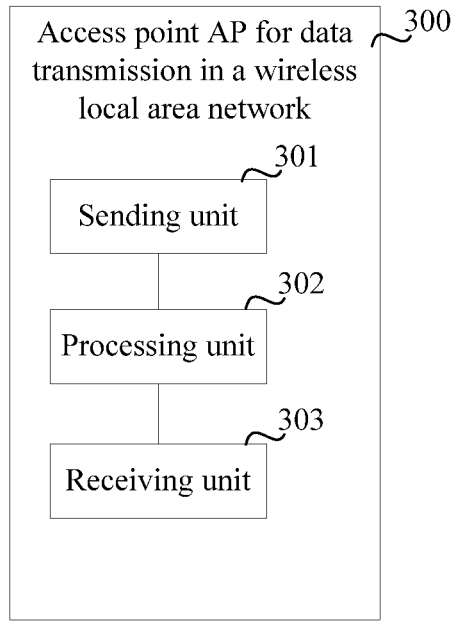
FIG. 3 is a schematic structural diagram of an AP for data transmission in a wireless local area network according to an embodiment of the present disclosure.

FIG. 3 is an example of a schematic structural diagram of an AP for data transmission in a wireless local area network according to an embodiment of the present disclosure.

Based on a same idea, as shown in FIG. 3, the AP for data transmission in a wireless local area network according to this embodiment of the present disclosure is configured to perform the foregoing method process. The AP 300 for data transmission in a wireless local area network includes a sending unit 301, a processing unit 302, and a receiving unit 303.

The processing unit is configured to generate first indication information when a STA has a data transmission requirement and the AP accepts the data transmission requirement, where the first indication information includes information used to indicate a first target wakeup moment, and the first target wakeup moment is not later than a sending moment of a target trigger frame that the STA needs to listen to next time, and is not earlier than a sending moment of the first beacon frame in a beacon frame period in which the target trigger frame is sent.

The sending unit is configured to send the first indication information to the STA.

Optionally, information about the first target wakeup moment is any one of the following content:

the sending moment of the first beacon frame in the beacon frame period in which the target trigger frame is sent;

a sending moment of the first trigger frame included in a trigger frame subgroup to which the target trigger frame belongs;

the sending moment of the target trigger frame; and the first target wakeup moment.

Optionally, when the first target wakeup moment is the sending moment of the first beacon frame in the beacon frame period in which the target trigger frame is sent, the information used to indicate the first target wakeup moment is information capable of indicating a quantity of beacon frame periods between the beacon frame period in which the target trigger frame is sent and a current beacon frame period.

When the first target wakeup moment is the sending moment of the first trigger frame included in the trigger frame subgroup to which the target trigger frame belongs, the information used to indicate the first target wakeup moment is information capable of indicating a quantity of beacon frame periods between the beacon frame period in which the target trigger frame is sent and a current beacon frame period, and information capable of indicating a subgroup identifier of the trigger frame subgroup to which the target trigger frame belongs.

When the first target wakeup moment is the sending moment of the target trigger frame, the information used to indicate the first target wakeup moment is information capable of indicating a quantity of beacon frame periods between the beacon frame period in which the target trigger frame is sent and a current beacon frame period, information capable of indicating a subgroup identifier of the trigger frame subgroup to which the target trigger frame belongs, and information capable of indicating a location identifier that represents a sequence number of the target trigger frame in the trigger frame subgroup to which the target trigger frame belongs.

Each preset trigger frame in one beacon frame period is corresponding to one trigger frame subgroup, each trigger frame subgroup includes at least one trigger frame, and all trigger frames included in each trigger frame subgroup are corresponding to one subgroup identifier.

Optionally, when the first target wakeup moment is the sending moment of the first trigger frame included in the trigger frame subgroup to which the target trigger frame belongs, if the beacon frame period in which the target trigger frame is sent is the current beacon frame period, the information capable of indicating the quantity of beacon frame periods between the beacon frame period in which the target trigger frame is sent and the current beacon frame period is empty.

When the first target wakeup moment is the sending moment of the target trigger frame, if the beacon frame period in which the target trigger frame is sent is the current beacon frame period and the trigger frame subgroup to which the target trigger frame belongs is a current trigger frame subgroup, the information capable of indicating the quantity of beacon frame periods between the beacon frame period in which the target trigger frame is sent and the current beacon frame period is empty, and the information capable of indicating the subgroup identifier of the trigger frame subgroup to which the target trigger frame belongs is empty.

Optionally, the first indication information further includes:

information used to indicate a mode in which the STA obtains a target resource, where the target resource is used by the STA after the STA receives the target trigger frame.

The information used to indicate the mode in which the STA obtains the target resource is information that causes the STA to obtain the target resource in a contention mode after receiving the target trigger frame.

Alternatively, the information used to indicate the mode in which the STA obtains the target resource is an identifier of the target resource allocated by the AP to the STA and an identity of the STA, so that the STA obtains, in a scheduling mode after receiving the target trigger frame, the target resource corresponding to the identifier of the target resource.

Optionally, the processing unit is further configured to:
when determining not to accept the data transmission requirement of the STA, generate second indication information used to indicate that the AP does not accept the data transmission requirement of the STA.

The sending unit is further configured to:
send the second indication information to the STA.

Optionally, the second indication information includes information that indicates a second target wakeup moment as an invalid value.

The second target wakeup moment is any one of the following content:
the sending moment of the first beacon frame in the beacon frame period in which the target trigger frame is sent;
the sending moment of the first trigger frame included in the trigger frame subgroup to which the target trigger frame belongs; and
the sending moment of the target trigger frame.

Optionally, when the second target wakeup moment is the sending moment of the first beacon frame in the beacon frame period in which the target trigger frame is sent, the information that indicates the second target wakeup moment as the invalid value is information that indicates, as an invalid value, the quantity of beacon frame periods between the beacon frame period in which the target trigger frame is sent and the current beacon frame period.

When the second target wakeup moment is the sending moment of the first trigger frame included in the trigger frame subgroup to which the target trigger frame belongs, the information that indicates the second target wakeup moment as the invalid value is information that indicates, as an invalid value or a special value, the quantity of beacon frame periods between the beacon frame period in which the target trigger frame is sent and the current beacon frame period, and information that indicates, as an invalid value, the subgroup identifier of the trigger frame subgroup to which the target trigger frame belongs.

When the second target wakeup moment is the sending moment of the target trigger frame, the information that indicates the second target wakeup moment as the invalid value is information that indicates, as an invalid value or a special value, the quantity of beacon frame periods between the beacon frame period in which the target trigger frame is sent and the current beacon frame period, information that indicates, as an invalid value or a special value, the subgroup identifier of the trigger frame subgroup to which the target trigger frame belongs, and information that indicates, as an invalid value, the location identifier that represents the sequence number of the target trigger frame in the trigger frame subgroup to which the target trigger frame belongs.

Each preset trigger frame in one beacon frame period is corresponding to one trigger frame subgroup, each trigger frame subgroup includes at least one trigger frame, and all trigger frames included in each trigger frame subgroup are corresponding to one subgroup identifier.

Optionally, when the second target wakeup moment is the sending moment of the first trigger frame included in the trigger frame subgroup to which the target trigger frame belongs, the information that indicates, as the special value, the quantity of beacon frame periods between the beacon frame period in which the target trigger frame is sent and the current beacon frame period is empty; or
when the second target wakeup moment is the sending moment of the target trigger frame, the information that indicates, as the special value, the quantity of beacon frame periods between the beacon frame period in which the target trigger frame is sent and the current beacon frame period is empty, and/or the information that indicates, as the invalid value, the subgroup identifier of the trigger frame subgroup to which the target trigger frame belongs is empty.

Optionally, the processing unit is further configured to:
determine a quantity of times that the STA has a data transmission requirement in a preset time period; and
when the determined quantity of times that the STA has a data transmission requirement is not greater than a quantity-of-times threshold, determine to accept the data transmission requirement of the STA; or otherwise, determine not to accept the data transmission requirement of the STA.

Optionally, the sending unit is further configured to:
send a source trigger frame to the STA, where the source trigger frame includes an identifier of a source resource that is allocated by the AP to the STA and that is used by the STA when the STA sends a data frame, and the identity of the STA; and send a negative acknowledgement frame to the STA.

The processing unit is further configured to:
when the data frame transmitted by the STA is not successfully received within specified duration after the source trigger frame is sent, add the second indication information to the negative acknowledgement frame.

Optionally, the sending unit is further configured to:
send a source trigger frame to the STA, where the source trigger frame includes an identifier of a source resource that is allocated by the AP to the STA and that is used by the STA when the STA sends a data frame, and the identity of the STA; and send a negative acknowledgement frame to the STA.

The processing unit is further configured to:
when the data frame transmitted by the STA is not successfully received within specified duration after the source trigger frame is sent, add the first indication information to the negative acknowledgement frame.

Optionally, the processing unit is further configured to:
when the data frame transmitted by the STA is successfully received, add the second indication information to an acknowledgement frame.

The sending unit is further configured to:
send the acknowledgement frame to the STA.

Optionally, the processing unit is further configured to:
when the data frame transmitted by the STA is successfully received, add the first indication information to an acknowledgement frame.

The sending unit is further configured to:
send the acknowledgement frame to the STA.

Optionally, the AP further includes a receiving unit, configured to:
receive third indication information that is sent by the STA and that is used to indicate that the STA has the data transmission requirement.

The processing unit is specifically configured to:
when the third indication information is successfully received, determine that the STA has the data transmission requirement.

Optionally, the third indication information is any one or more of the following content:
indication information on a newly added random access request flag bit RAR in the data frame;
indication information in a more data field (More Data Field) in the data frame; and
indication information in a buffer (Buffer) field in the data frame.

Optionally, the sending unit is further configured to:
send, to the STA, the target trigger frame that the STA needs to listen to next time, where the target trigger frame includes information that causes the STA to obtain a target resource in a contention mode after receiving the target trigger frame, where the target trigger frame is used to cause the STA to obtain the target resource through contention by using N backoff processes, N is an integer greater than or equal to 1, one backoff process is corresponding to one beacon frame period, one beacon frame period is corresponding to information about one minimum contention window and one maximum contention window, the minimum contention window and the maximum contention window are two numbers greater than or equal to 0, and the maximum contention window is greater than the minimum contention window; and for the $i^{th}$ backoff process in the N backoff processes, where i is an integer greater than 1 and less than or equal to N, the following operations are performed:

when determining that, in the $(i-1)^{th}$ backoff process, a value of a backoff counter still does not decrease to 0 when the STA receives the first trigger frame in a next beacon frame period of a beacon frame period corresponding to the $(i-1)^{th}$ backoff process, starting, by the STA, the $i^{th}$ backoff process, and updating the value of the backoff counter by using a calculated backoff value corresponding to the $i^{th}$ backoff process, where the value of the backoff counter decreases by 1 when a resource that can be randomly accessed is received; and the backoff value corresponding to the $i^{th}$ backoff process is calculated by using the following formula:

$$Bocurr=min[Bopre,rand[0,CWO-1]], \text{ where}$$

Bocurr is the backoff value corresponding to the $i^{th}$ backoff process;

Bopre is a value of the backoff counter read when the STA receives the first trigger frame in the next beacon frame period of the beacon frame period corresponding to the $(i-1)^{th}$ backoff process;

CWO is a random integer in a minimum contention window and a maximum contention window that are corresponding to a beacon frame period corresponding to the $i^{th}$ backoff process;

rand[0, CWO−1] represents a random integer between 0 and (CWO−1); and min[Bopre, rand[0, CWO−1]] represents a smaller number in Bopre and rand[0, CWO−1].

From the foregoing content, it can be learned that, in this embodiment of the present disclosure, when the STA has the data transmission requirement and the AP accepts the data transmission requirement, the AP generates the first indication information, where the first indication information includes the information used to indicate the first target wakeup moment, and the first target wakeup moment is not later than the sending moment of the target trigger frame that the STA needs to listen to next time, and is not earlier than the sending moment of the first beacon frame in the beacon frame period in which the target trigger frame is sent; and the AP sends the first indication information to the STA. Because the first target wakeup moment is not later than the sending moment of the target trigger frame that the STA needs to listen to next time, and is not earlier than the sending moment of the first beacon frame in the beacon frame period in which the target trigger frame is sent, after receiving the first indication information, the STA may enter the power saving mode, and does not listen to a trigger frame or wake up until the first target wakeup moment. In addition, after waking up, the STA does not miss time for listening to the target trigger frame. This reduces energy consumption in a data transmission process.

Figure 4:
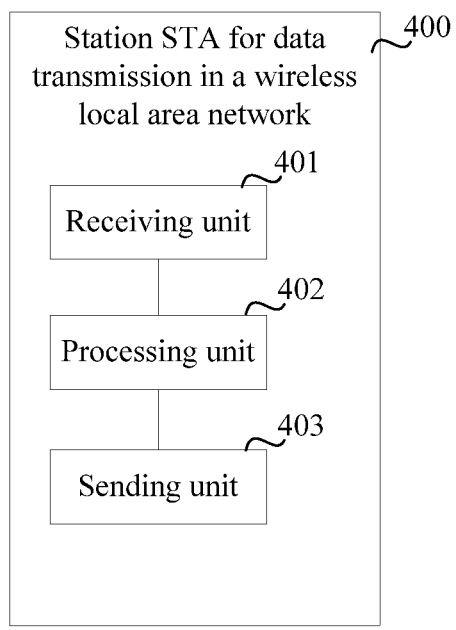
FIG. 4 is a schematic structural diagram of a STA for data transmission in a wireless local area network according to an embodiment of the present disclosure.

FIG. 4 is an example of a schematic structural diagram of a STA for data transmission in a wireless local area network according to an embodiment of the present disclosure.

Based on a same idea, as shown in FIG. 4, the STA for data transmission in a wireless local area network according to this embodiment of the present disclosure is configured to perform the foregoing method process. The STA 400 for data transmission in a wireless local area network includes a receiving unit 401, a processing unit 402, and a sending unit 403.

The receiving unit is configured to receive first indication information sent by an AP, where the first indication information is generated by the AP when the STA has a data transmission requirement and the AP accepts the data transmission requirement, the first indication information includes information used to indicate a first target wakeup moment, and the first target wakeup moment is not later than a sending moment of a target trigger frame that the STA needs to listen to next time, and is not earlier than a sending moment of the first beacon frame in a beacon frame period in which the target trigger frame is sent.

The processing unit is configured to make the STA wake up at the first target wakeup moment and listen to the target trigger frame.

Optionally, information about the first target wakeup moment is any one of the following content:

the sending moment of the first beacon frame in the beacon frame period in which the target trigger frame is sent;

a sending moment of the first trigger frame included in a trigger frame subgroup to which the target trigger frame belongs;

the sending moment of the target trigger frame; and the first target wakeup moment.

Optionally, when the first target wakeup moment is the sending moment of the first beacon frame in the beacon frame period in which the target trigger frame is sent, the information used to indicate the first target wakeup moment is information capable of indicating a quantity of beacon frame periods between the beacon frame period in which the target trigger frame is sent and a current beacon frame period.

When the first target wakeup moment is the sending moment of the first trigger frame included in the trigger frame subgroup to which the target trigger frame belongs, the information used to indicate the first target wakeup moment is information capable of indicating a quantity of beacon frame periods between the beacon frame period in which the target trigger frame is sent and a current beacon frame period, and information capable of indicating a subgroup identifier of the trigger frame subgroup to which the target trigger frame belongs.

When the first target wakeup moment is the sending moment of the target trigger frame, the information used to indicate the first target wakeup moment is information capable of indicating a quantity of beacon frame periods between the beacon frame period in which the target trigger frame is sent and a current beacon frame period, information capable of indicating a subgroup identifier of the trigger frame subgroup to which the target trigger frame belongs, and information capable of indicating a location identifier that represents a sequence number of the target trigger frame in the trigger frame subgroup to which the target trigger frame belongs.

Each preset trigger frame in one beacon frame period is corresponding to one trigger frame subgroup, each trigger frame subgroup includes at least one trigger frame, and all trigger frames included in each trigger frame subgroup are corresponding to one subgroup identifier.

Optionally, when the first target wakeup moment is the sending moment of the first trigger frame included in the trigger frame subgroup to which the target trigger frame belongs, if the beacon frame period in which the target trigger frame is sent is the current beacon frame period, the information capable of indicating the quantity of beacon frame periods between the beacon frame period in which the target trigger frame is sent and the current beacon frame period is empty.

When the first target wakeup moment is the sending moment of the target trigger frame, if the beacon frame period in which the target trigger frame is sent is the current beacon frame period and the trigger frame subgroup to which the target trigger frame belongs is a current trigger frame subgroup, the information capable of indicating the quantity of beacon frame periods between the beacon frame period in which the target trigger frame is sent and the current beacon frame period is empty, and the information capable of indicating the subgroup identifier of the trigger frame subgroup to which the target trigger frame belongs is empty.

Optionally, the first indication information further includes:

information used to indicate a mode in which the STA obtains a target resource, where the target resource is used by the STA after the STA receives the target trigger frame.

The information used to indicate the mode in which the STA obtains the target resource is information that causes the STA to obtain the target resource in a contention mode after receiving the target trigger frame.

Alternatively, the information used to indicate the mode in which the STA obtains the target resource is an identifier of the target resource allocated by the AP to the STA and an identity of the STA, so that the STA obtains, in a scheduling mode after receiving the target trigger frame, the target resource corresponding to the identifier of the target resource.

Optionally, the receiving unit is further configured to:

receive second indication information that is sent by the AP and that is used to indicate that the AP does not accept the data transmission requirement of the STA, where the second indication information is generated by the AP when the AP determines not to accept the data transmission requirement of the STA.

Optionally, the second indication information includes information that indicates a second target wakeup moment as an invalid value.

The second target wakeup moment is any one of the following content:

the sending moment of the first beacon frame in the beacon frame period in which the target trigger frame is sent;

the sending moment of the first trigger frame included in the trigger frame subgroup to which the target trigger frame belongs; and the sending moment of the target trigger frame.

Optionally, when the second target wakeup moment is the sending moment of the first beacon frame in the beacon frame period in which the target trigger frame is sent, the information that indicates the second target wakeup moment as the invalid value is information that indicates, as an invalid value, the quantity of beacon frame periods between the beacon frame period in which the target trigger frame is sent and the current beacon frame period.

When the second target wakeup moment is the sending moment of the first trigger frame included in the trigger frame subgroup to which the target trigger frame belongs, the information that indicates the second target wakeup moment as the invalid value is information that indicates, as an invalid value or a special value, the quantity of beacon frame periods between the beacon frame period in which the target trigger frame is sent and the current beacon frame period, and information that indicates, as an invalid value, the subgroup identifier of the trigger frame subgroup to which the target trigger frame belongs.

When the second target wakeup moment is the sending moment of the target trigger frame, the information that indicates the second target wakeup moment as the invalid value is information that indicates, as an invalid value or a special value, the quantity of beacon frame periods between the beacon frame period in which the target trigger frame is sent and the current beacon frame period, information that indicates, as an invalid value or a special value, the subgroup identifier of the trigger frame subgroup to which the target trigger frame belongs, and information that indicates, as an invalid value, the location identifier that represents the sequence number of the target trigger frame in the trigger frame subgroup to which the target trigger frame belongs.

Each preset trigger frame in one beacon frame period is corresponding to one trigger frame subgroup, each trigger frame subgroup includes at least one trigger frame, and all trigger frames included in each trigger frame subgroup are corresponding to one subgroup identifier.

Optionally, when the second target wakeup moment is the sending moment of the first trigger frame included in the trigger frame subgroup to which the target trigger frame belongs, the information that indicates, as the invalid value, the quantity of beacon frame periods between the beacon frame period in which the target trigger frame is sent and the current beacon frame period is empty; or when the second target wakeup moment is the sending moment of the target trigger frame, the information that indicates, as the invalid value, the quantity of beacon frame periods between the beacon frame period in which the target trigger frame is sent and the current beacon frame period is empty, and/or the information that indicates, as the invalid value, the subgroup identifier of the trigger frame subgroup to which the target trigger frame belongs is empty.

Optionally, the receiving unit is further configured to:

receive a source trigger frame sent by the AP, where the source trigger frame includes an identifier of a source resource that is allocated by the AP to the STA and that is used by the STA when the STA sends a data frame, and the identity of the STA; and receive a negative acknowledgement frame sent by the AP, where the negative acknowledgement frame is sent by the AP when the AP does not successfully receive, within specified duration after sending the source trigger frame, the data frame transmitted by the STA, and the negative acknowledgement frame includes the second indication information.

The STA further includes a sending unit, configured to:

send the data frame to the AP by using the source resource corresponding to the identifier of the source resource in the source trigger frame.

Optionally, the receiving unit is further configured to:

receive a source trigger frame sent by the AP, where the source trigger frame includes an identifier of a source resource that is allocated by the AP to the STA and that is used by the STA when the STA sends a data frame, and the identity of the STA; and receive a negative acknowledgement frame sent by the AP, where the negative acknowledgement frame is sent by the AP when the AP does not successfully receive, within specified duration after sending the source trigger frame, the data frame transmitted by the STA, and the negative acknowledgement frame includes the first indication information.

The STA further includes a sending unit, configured to:

send the data frame to the AP by using the source resource corresponding to the identifier of the source resource in the source trigger frame.

Optionally, the STA further includes a sending unit, configured to:

send the data frame to the AP.

The receiving unit is specifically configured to:

receive an acknowledgement frame sent by the AP, where the acknowledgement frame is sent by the AP when the AP successfully receives the data frame transmitted by the STA, and the acknowledgement frame includes the second indication information.

Optionally, the STA further includes a sending unit, configured to:

send the data frame to the AP.

The receiving unit is specifically configured to:

receive an acknowledgement frame sent by the AP, where the acknowledgement frame is sent by the AP when the AP successfully receives the data frame transmitted by the STA, and the acknowledgement frame includes the first indication information.

Optionally, the sending unit is further configured to:

send, to the AP, third indication information used to indicate that the STA has the data transmission requirement, so that the AP determines, when successfully receiving the third indication information, that the STA has the data transmission requirement.

Optionally, the third indication information is any one or more of the following content:

indication information on a newly added random access request flag bit RAR in the data frame;

indication information in a more data field (More Data Field) in the data frame; and indication information in a buffer (Buffer) field in the data frame.

Optionally, the processing unit is further configured to:

wake up at the first target wakeup moment, and listen to the target trigger frame sent by the AP;

determine, based on the received target trigger frame, information that the STA needs to obtain the target resource through contention in a contention mode; and obtain the target resource through contention by using N backoff processes, where N is an integer greater than or equal to 1, one backoff process is corresponding to one beacon frame period, one beacon frame period is corresponding to information about one minimum contention window and one maximum contention window, the minimum contention window and the maximum contention window are two numbers greater than or equal to 0, and the maximum contention window is greater than the minimum contention window; and for the $i^{th}$ backoff process in the N backoff processes, where i is an integer greater than 1 and less than or equal to N, the following operations are performed:

when determining that, in the $(i-1)^{th}$ backoff process, a value of a backoff counter still does not decrease to 0 when the STA receives the first trigger frame in a next beacon frame period of a beacon frame period corresponding to the $(i-1)^{th}$ backoff process, starting, by the STA, the $i^{th}$ backoff process, and updating the value of the backoff counter by using a calculated backoff value corresponding to the $i^{th}$ backoff process, where the value of the backoff counter decreases by 1 when a resource that can be randomly accessed is received; and the backoff value corresponding to the $i^{th}$ backoff process is calculated by using the following formula:

Bocurr=min[Bopre,rand[0,CWO−1]], where

Bocurr is the backoff value corresponding to the $i^{th}$ backoff process;

Bopre is a value of the backoff counter read when the STA receives the first trigger frame in the next beacon frame period of the beacon frame period corresponding to the $(i-1)^{th}$ backoff process;

CWO is a random integer in a minimum contention window and a maximum contention window that are corresponding to a beacon frame period corresponding to the $i^{th}$ backoff process;

rand[0, CWO−1] represents a random integer between 0 and (CWO−1); and min[Bopre, rand[0, CWO−1]] represents a smaller number in Bopre and rand[0, CWO−1].

From the foregoing content, it can be learned that, in this embodiment of the present disclosure, when the STA has the data transmission requirement and the AP accepts the data transmission requirement, the AP generates the first indication information, where the first indication information includes the information used to indicate the first target wakeup moment, and the first target wakeup moment is not later than the sending moment of the target trigger frame that the STA needs to listen to next time, and is not earlier than the sending moment of the first beacon frame in the beacon frame period in which the target trigger frame is sent; and the AP sends the first indication information to the STA. Because the first target wakeup moment is not later than the sending moment of the target trigger frame that the STA needs to listen to next time, and is not earlier than the sending moment of the first beacon frame in the beacon frame period in which the target trigger frame is sent, after receiving the first indication information, the STA may enter the power saving mode, and does not listen to a trigger frame or wake up until the first target wakeup moment. In addition, after waking up, the STA does not miss time for listening to the target trigger frame. This reduces energy consumption in a data transmission process.

Figure 5:
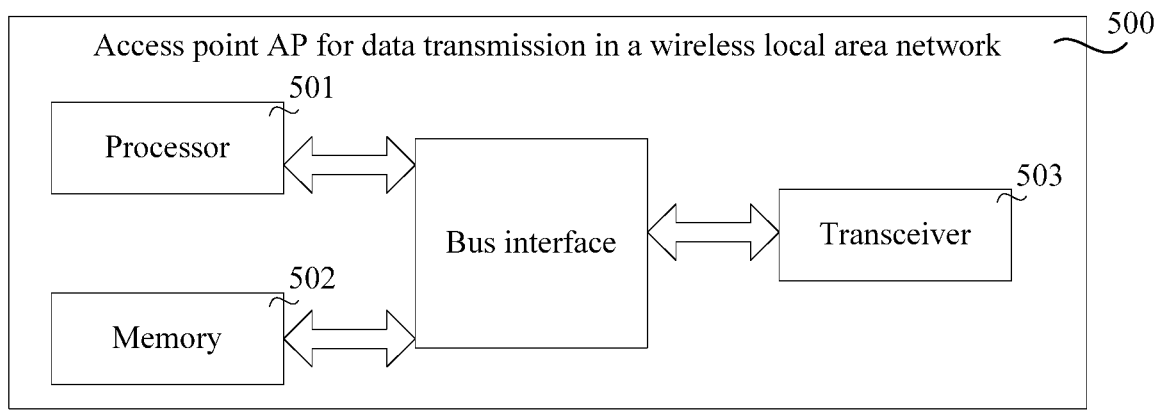
FIG. 5 is a schematic structural diagram of an AP for data transmission in a wireless local area network according to an embodiment of the present disclosure.

FIG. 5 is an example of a schematic structural diagram of an AP for data transmission in a wireless local area network according to an embodiment of the present disclosure.

Based on a same idea, as shown in FIG. 5, the AP for data transmission in a wireless local area network according to this embodiment of the present disclosure is configured to perform the foregoing method process. The AP 500 for data transmission in a wireless local area network includes a processor 501, a transceiver 503, and a memory 502.

The processor is configured to read a program in the memory, to perform the following process:

generating first indication information when a STA has a data transmission requirement and the AP accepts the data transmission requirement, where the first indication information includes information used to indicate a first target wakeup moment, and the first target wakeup moment is not later than a sending moment of a target trigger frame that the STA needs to listen to next time, and is not earlier than a sending moment of the first beacon frame in a beacon frame period in which the target trigger frame is sent.

The transceiver is configured to send the first indication information to the STA.

Optionally, information about the first target wakeup moment is any one of the following content:

the sending moment of the first beacon frame in the beacon frame period in which the target trigger frame is sent;

a sending moment of the first trigger frame included in a trigger frame subgroup to which the target trigger frame belongs;

the sending moment of the target trigger frame; and the first target wakeup moment.

Optionally, when the first target wakeup moment is the sending moment of the first beacon frame in the beacon frame period in which the target trigger frame is sent, the information used to indicate the first target wakeup moment is information capable of indicating a quantity of beacon frame periods between the beacon frame period in which the target trigger frame is sent and a current beacon frame period.

When the first target wakeup moment is the sending moment of the first trigger frame included in the trigger frame subgroup to which the target trigger frame belongs, the information used to indicate the first target wakeup moment is information capable of indicating a quantity of beacon frame periods between the beacon frame period in which the target trigger frame is sent and a current beacon frame period, and information capable of indicating a subgroup identifier of the trigger frame subgroup to which the target trigger frame belongs.

When the first target wakeup moment is the sending moment of the target trigger frame, the information used to indicate the first target wakeup moment is information capable of indicating a quantity of beacon frame periods between the beacon frame period in which the target trigger frame is sent and a current beacon frame period, information capable of indicating a subgroup identifier of the trigger frame subgroup to which the target trigger frame belongs, and information capable of indicating a location identifier that represents a sequence number of the target trigger frame in the trigger frame subgroup to which the target trigger frame belongs.

Each preset trigger frame in one beacon frame period is corresponding to one trigger frame subgroup, each trigger frame subgroup includes at least one trigger frame, and all trigger frames included in each trigger frame subgroup are corresponding to one subgroup identifier.

Optionally, when the first target wakeup moment is the sending moment of the first trigger frame included in the trigger frame subgroup to which the target trigger frame belongs, if the beacon frame period in which the target trigger frame is sent is the current beacon frame period, the information capable of indicating the quantity of beacon frame periods between the beacon frame period in which the target trigger frame is sent and the current beacon frame period is empty.

When the first target wakeup moment is the sending moment of the target trigger frame, if the beacon frame period in which the target trigger frame is sent is the current beacon frame period and the trigger frame subgroup to which the target trigger frame belongs is a current trigger frame subgroup, the information capable of indicating the quantity of beacon frame periods between the beacon frame period in which the target trigger frame is sent and the current beacon frame period is empty, and the information capable of indicating the subgroup identifier of the trigger frame subgroup to which the target trigger frame belongs is empty.

Optionally, the first indication information further includes:

information used to indicate a mode in which the STA obtains a target resource, where the target resource is used by the STA after the STA receives the target trigger frame.

The information used to indicate the mode in which the STA obtains the target resource is information that causes the STA to obtain the target resource in a contention mode after receiving the target trigger frame.

Alternatively, the information used to indicate the mode in which the STA obtains the target resource is an identifier of the target resource allocated by the AP to the STA and an identity of the STA, so that the STA obtains, in a scheduling mode after receiving the target trigger frame, the target resource corresponding to the identifier of the target resource.

Optionally, the processor is further configured to:

when determining not to accept the data transmission requirement of the STA, generate second indication information used to indicate that the AP does not accept the data transmission requirement of the STA; and send the second indication information to the STA.

Optionally, the second indication information includes information that indicates a second target wakeup moment as an invalid value.

The second target wakeup moment is any one of the following content:

the sending moment of the first beacon frame in the beacon frame period in which the target trigger frame is sent;

the sending moment of the first trigger frame included in the trigger frame subgroup to which the target trigger frame belongs; and the sending moment of the target trigger frame.

Optionally, when the second target wakeup moment is the sending moment of the first beacon frame in the beacon frame period in which the target trigger frame is sent, the information that indicates the second target wakeup moment as the invalid value is information that indicates, as an invalid value, the quantity of beacon frame periods between the beacon frame period in which the target trigger frame is sent and the current beacon frame period.

When the second target wakeup moment is the sending moment of the first trigger frame included in the trigger frame subgroup to which the target trigger frame belongs, the information that indicates the second target wakeup moment as the invalid value is information that indicates, as an invalid value or a special value, the quantity of beacon frame periods between the beacon frame period in which the target trigger frame is sent and the current beacon frame period, and information that indicates, as an invalid value, the subgroup identifier of the trigger frame subgroup to which the target trigger frame belongs.

When the second target wakeup moment is the sending moment of the target trigger frame, the information that indicates the second target wakeup moment as the invalid value is information that indicates, as an invalid value or a special value, the quantity of beacon frame periods between the beacon frame period in which the target trigger frame is sent and the current beacon frame period, information that indicates, as an invalid value or a special value, the subgroup identifier of the trigger frame subgroup to which the target trigger frame belongs, and information that indicates, as an invalid value, the location identifier that represents the sequence number of the target trigger frame in the trigger frame subgroup to which the target trigger frame belongs.

Each preset trigger frame in one beacon frame period is corresponding to one trigger frame subgroup, each trigger frame subgroup includes at least one trigger frame, and all trigger frames included in each trigger frame subgroup are corresponding to one subgroup identifier.

Optionally, when the second target wakeup moment is the sending moment of the first trigger frame included in the trigger frame subgroup to which the target trigger frame belongs, the information that indicates, as the special value, the quantity of beacon frame periods between the beacon frame period in which the target trigger frame is sent and the current beacon frame period is empty; or when the second target wakeup moment is the sending moment of the target trigger frame, the information that indicates, as the special value, the quantity of beacon frame periods between the beacon frame period in which the target trigger frame is sent and the current beacon frame period is empty, and/or the information that indicates, as the invalid value, the subgroup identifier of the trigger frame subgroup to which the target trigger frame belongs is empty.

Optionally, the processor is further configured to:
determine a quantity of times that the STA has a data transmission requirement in a preset time period; and
when the determined quantity of times that the STA has a data transmission requirement is not greater than a quantity-of-times threshold, determine to accept the data transmission requirement of the STA; or otherwise, determine not to accept the data transmission requirement of the STA.

Optionally, the transceiver is further configured to:
send a source trigger frame to the STA, where the source trigger frame includes an identifier of a source resource that is allocated by the AP to the STA and that is used by the STA when the STA sends a data frame, and the identity of the STA; and send a negative acknowledgement frame to the STA.

The processor is further configured to:
when the data frame transmitted by the STA is not successfully received within specified duration after the source trigger frame is sent, add the second indication information to the negative acknowledgement frame.

Optionally, the transceiver is further configured to:
send a source trigger frame to the STA, where the source trigger frame includes an identifier of a source resource that is allocated by the AP to the STA and that is used by the STA when the STA sends a data frame, and the identity of the STA; and send a negative acknowledgement frame to the STA.

The processor is further configured to:
when the data frame transmitted by the STA is not successfully received within specified duration after the source trigger frame is sent, add the first indication information to the negative acknowledgement frame.

Optionally, the processor is further configured to:
when the data frame transmitted by the STA is successfully received, add the second indication information to an acknowledgement frame.

The transceiver is further configured to:
send the acknowledgement frame to the STA.

Optionally, the processor is further configured to:
when the data frame transmitted by the STA is successfully received, add the first indication information to an acknowledgement frame.

The transceiver is further configured to:
send the acknowledgement frame to the STA.

Optionally, the transceiver is further configured to:
receive third indication information that is sent by the STA and that is used to indicate that the STA has the data transmission requirement.

The processor is specifically configured to:
when the third indication information is successfully received, determine that the STA has the data transmission requirement.

Optionally, the third indication information is any one or more of the following content:
indication information on a newly added random access request flag bit RAR in the data frame;
indication information in a more data field (More Data Field) in the data frame; and
indication information in a buffer field in the data frame.

Optionally, the transceiver is further configured to:
send, to the STA, the target trigger frame that the STA needs to listen to next time, where the target trigger frame includes information that causes the STA to obtain a target resource in a contention mode after receiving the target trigger frame, where the target trigger frame is used to cause the STA to obtain the target resource through contention by using N backoff processes, N is an integer greater than or equal to 1, one backoff process is corresponding to one beacon frame period, one beacon frame period is corresponding to information about one minimum contention window and one maximum contention window, the minimum contention window and the maximum contention window are two numbers greater than or equal to 0, and the maximum contention window is greater than the minimum contention window; and for the $i^{th}$ backoff process in the N backoff processes, where
i is an integer greater than 1 and less than or equal to N, the following operations are performed:
when determining that, in the $(i-1)^{th}$ backoff process, a value of a backoff counter still does not decrease to 0 when the STA receives the first trigger frame in a next beacon frame period of a beacon frame period corresponding to the $(i-1)^{th}$ backoff process, starting, by the STA, the $i^{th}$ backoff process, and updating the value of the backoff counter by using a calculated backoff value corresponding to the $i^{th}$ backoff process, where the value of the backoff counter decreases by 1 when a resource that can be randomly accessed is received; and
the backoff value corresponding to the $i^{th}$ backoff process is calculated by using the following formula:

$$Bocurr=min[Bopre,rand[0,CWO-1]], \text{ where}$$

Bocurr is the backoff value corresponding to the $i^{th}$ backoff process;
Bopre is a value of the backoff counter read when the STA receives the first trigger frame in the next beacon frame period of the beacon frame period corresponding to the $(i-1)^{th}$ backoff process;
CWO is a random integer in a minimum contention window and a maximum contention window that are corresponding to a beacon frame period corresponding to the $i^{th}$ backoff process;
rand[0, CWO−1] represents a random integer between 0 and (CWO−1); and
min[Bopre, rand[0, CWO−1]] represents a smaller number in Bopre and rand[0, CWO−1].

A bus architecture may include any quantity of interconnected buses and bridges that are specifically connected by using various circuits of one or more processors represented by a processor and a memory represented by a memory. The bus architecture may also connect various other circuits, such as a peripheral device circuit, a voltage stabilizer circuit, and a power management circuit. This is commonly known in the art. Therefore, this specification does not provide further descriptions. A bus interface provides an interface. The transceiver may be a plurality of elements, that is, may include a transmitter and a transceiver, and provides a unit configured to bidirectionally communicate with various other apparatuses on a transmission medium. The processor is responsible for bus architecture management and general processing. The memory may store data that is used by the processor when the processor performs an operation.

From the foregoing content, it can be learned that, in this embodiment of the present disclosure, when the STA has the data transmission requirement and the AP accepts the data transmission requirement, the AP generates the first indication information, where the first indication information includes the information used to indicate the first target wakeup moment, and the first target wakeup moment is not later than the sending moment of the target trigger frame that the STA needs to listen to next time, and is not earlier than the sending moment of the first beacon frame in the beacon frame period in which the target trigger frame is sent; and the AP sends the first indication information to the STA. Because the first target wakeup moment is not later than the sending moment of the target trigger frame that the STA needs to listen to next time, and is not earlier than the sending moment of the first beacon frame in the beacon frame period in which the target trigger frame is sent, after receiving the first indication information, the STA may enter the power saving mode, and does not listen to a trigger frame or wake up until the first target wakeup moment. In addition, after waking up, the STA does not miss time for listening to the target trigger frame. This reduces energy consumption in a data transmission process.

Figure 6:
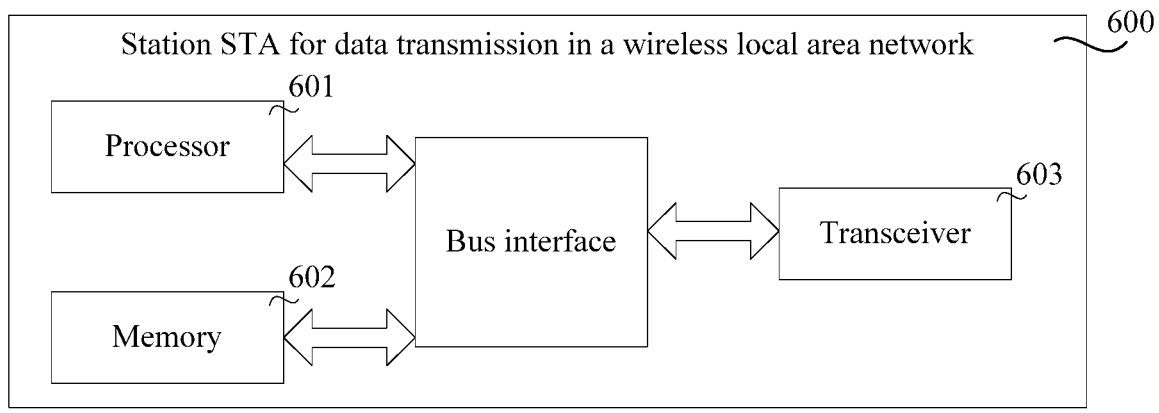
FIG. 6 is a schematic structural diagram of a STA for data transmission in a wireless local area network according to an embodiment of the present disclosure.

FIG. 6 is an example of a schematic structural diagram of a STA for data transmission in a wireless local area network according to an embodiment of the present disclosure.

Based on a same idea, as shown in FIG. 6, the STA for data transmission in a wireless local area network according to this embodiment of the present disclosure is configured to perform the foregoing method process. The STA 600 for data transmission in a wireless local area network includes a processor 601, a transceiver 603, and a memory 602.

The processor is configured to read a program in the memory, to perform the following process:

receiving, by using the transceiver, first indication information sent by an AP, where the first indication information is generated by the AP when the STA has a data transmission requirement and the AP accepts the data transmission requirement, the first indication information includes information used to indicate a first target wakeup moment, and the first target wakeup moment is not later than a sending moment of a target trigger frame that the STA needs to listen to next time, and is not earlier than a sending moment of the first beacon frame in a beacon frame period in which the target trigger frame is sent; and making the STA wake up at the first target wakeup moment and listen to the target trigger frame.

The transceiver is configured to receive the first indication information sent by the AP.

Optionally, information about the first target wakeup moment is any one of the following content:

the sending moment of the first beacon frame in the beacon frame period in which the target trigger frame is sent;

a sending moment of the first trigger frame included in a trigger frame subgroup to which the target trigger frame belongs;

the sending moment of the target trigger frame; and the first target wakeup moment.

Optionally, when the first target wakeup moment is the sending moment of the first beacon frame in the beacon frame period in which the target trigger frame is sent, the information used to indicate the first target wakeup moment is information capable of indicating a quantity of beacon frame periods between the beacon frame period in which the target trigger frame is sent and a current beacon frame period.

When the first target wakeup moment is the sending moment of the first trigger frame included in the trigger frame subgroup to which the target trigger frame belongs, the information used to indicate the first target wakeup moment is information capable of indicating a quantity of beacon frame periods between the beacon frame period in which the target trigger frame is sent and a current beacon frame period, and information capable of indicating a subgroup identifier of the trigger frame subgroup to which the target trigger frame belongs.

When the first target wakeup moment is the sending moment of the target trigger frame, the information used to indicate the first target wakeup moment is information capable of indicating a quantity of beacon frame periods between the beacon frame period in which the target trigger frame is sent and a current beacon frame period, information capable of indicating a subgroup identifier of the trigger frame subgroup to which the target trigger frame belongs, and information capable of indicating a location identifier that represents a sequence number of the target trigger frame in the trigger frame subgroup to which the target trigger frame belongs.

Each preset trigger frame in one beacon frame period is corresponding to one trigger frame subgroup, each trigger frame subgroup includes at least one trigger frame, and all trigger frames included in each trigger frame subgroup are corresponding to one subgroup identifier.

Optionally, when the first target wakeup moment is the sending moment of the first trigger frame included in the trigger frame subgroup to which the target trigger frame belongs, if the beacon frame period in which the target trigger frame is sent is the current beacon frame period, the information capable of indicating the quantity of beacon frame periods between the beacon frame period in which the target trigger frame is sent and the current beacon frame period is empty.

When the first target wakeup moment is the sending moment of the target trigger frame, if the beacon frame period in which the target trigger frame is sent is the current beacon frame period and the trigger frame subgroup to which the target trigger frame belongs is a current trigger frame subgroup, the information capable of indicating the quantity of beacon frame periods between the beacon frame period in which the target trigger frame is sent and the current beacon frame period is empty, and the information capable of indicating the subgroup identifier of the trigger frame subgroup to which the target trigger frame belongs is empty.

Optionally, the first indication information further includes:

information used to indicate a mode in which the STA obtains a target resource, where the target resource is used by the STA after the STA receives the target trigger frame.

The information used to indicate the mode in which the STA obtains the target resource is information that causes the STA to obtain the target resource in a contention mode after receiving the target trigger frame.

Alternatively, the information used to indicate the mode in which the STA obtains the target resource is an identifier of the target resource allocated by the AP to the STA and an identity of the STA, so that the STA obtains, in a scheduling mode after receiving the target trigger frame, the target resource corresponding to the identifier of the target resource.

Optionally, the transceiver is further configured to:

receive second indication information that is sent by the AP and that is used to indicate that the AP does not accept the data transmission requirement of the STA, where the second indication information is generated by the AP when the AP determines not to accept the data transmission requirement of the STA.

Optionally, the second indication information includes information that indicates a second target wakeup moment as an invalid value.

The second target wakeup moment is any one of the following content:

the sending moment of the first beacon frame in the beacon frame period in which the target trigger frame is sent;

the sending moment of the first trigger frame included in the trigger frame subgroup to which the target trigger frame belongs; and the sending moment of the target trigger frame.

Optionally, when the second target wakeup moment is the sending moment of the first beacon frame in the beacon frame period in which the target trigger frame is sent, the information that indicates the second target wakeup moment as the invalid value is information that indicates, as an invalid value, the quantity of beacon frame periods between the beacon frame period in which the target trigger frame is sent and the current beacon frame period.

When the second target wakeup moment is the sending moment of the first trigger frame included in the trigger frame subgroup to which the target trigger frame belongs, the information that indicates the second target wakeup moment as the invalid value is information that indicates, as an invalid value or a special value, the quantity of beacon frame periods between the beacon frame period in which the target trigger frame is sent and the current beacon frame period, and information that indicates, as an invalid value, the subgroup identifier of the trigger frame subgroup to which the target trigger frame belongs.

When the second target wakeup moment is the sending moment of the target trigger frame, the information that indicates the second target wakeup moment as the invalid value is information that indicates, as an invalid value or a special value, the quantity of beacon frame periods between the beacon frame period in which the target trigger frame is sent and the current beacon frame period, information that indicates, as an invalid value or a special value, the subgroup identifier of the trigger frame subgroup to which the target trigger frame belongs, and information that indicates, as an invalid value, the location identifier that represents the sequence number of the target trigger frame in the trigger frame subgroup to which the target trigger frame belongs.

Each preset trigger frame in one beacon frame period is corresponding to one trigger frame subgroup, each trigger frame subgroup includes at least one trigger frame, and all trigger frames included in each trigger frame subgroup are corresponding to one subgroup identifier.

Optionally, when the second target wakeup moment is the sending moment of the first trigger frame included in the trigger frame subgroup to which the target trigger frame belongs, the information that indicates, as the invalid value, the quantity of beacon frame periods between the beacon frame period in which the target trigger frame is sent and the current beacon frame period is empty; or when the second target wakeup moment is the sending moment of the target trigger frame, the information that indicates, as the invalid value, the quantity of beacon frame periods between the beacon frame period in which the target trigger frame is sent and the current beacon frame period is empty, and/or the information that indicates, as the invalid value, the subgroup identifier of the trigger frame subgroup to which the target trigger frame belongs is empty.

Optionally, the transceiver is further configured to:

receive a source trigger frame sent by the AP, where the source trigger frame includes an identifier of a source resource that is allocated by the AP to the STA and that is used by the STA when the STA sends a data frame, and the identity of the STA; and receive a negative acknowledgement frame sent by the AP, where the negative acknowledgement frame is sent by the AP when the AP does not successfully receive, within specified duration after sending the source trigger frame, the data frame transmitted by the STA, and the negative acknowledgement frame includes the second indication information; and send the data frame to the AP by using the source resource corresponding to the identifier of the source resource in the source trigger frame.

Optionally, the transceiver is further configured to:

receive a source trigger frame sent by the AP, where the source trigger frame includes an identifier of a source resource that is allocated by the AP to the STA and that is used by the STA when the STA sends a data frame, and the identity of the STA; and receive a negative acknowledgement frame sent by the AP, where the negative acknowledgement frame is sent by the AP when the AP does not successfully receive, within specified duration after sending the source trigger frame, the data frame transmitted by the STA, and the negative acknowledgement frame includes the first indication information; and send the data frame to the AP by using the source resource corresponding to the identifier of the source resource in the source trigger frame.

Optionally, the transceiver is further configured to:

send the data frame to the AP; and receive an acknowledgement frame sent by the AP, where the acknowledgement frame is sent by the AP when the AP successfully receives the data frame transmitted by the STA, and the acknowledgement frame includes the second indication information.

Optionally, the transceiver is further configured to:

send the data frame to the AP; and receive an acknowledgement frame sent by the AP, where the acknowledgement frame is sent by the AP when the AP successfully receives the data frame transmitted by the STA, and the acknowledgement frame includes the first indication information.

Optionally, the transceiver is further configured to:

send, to the AP, third indication information used to indicate that the STA has the data transmission requirement, so that the AP determines, when successfully receiving the third indication information, that the STA has the data transmission requirement.

Optionally, the third indication information is any one or more of the following content:

indication information on a newly added random access request flag bit RAR in the data frame;

indication information in a more data field (More Data Field) in the data frame; and indication information in a buffer (Buffer) field in the data frame.

Optionally, the processor is further configured to:

wake up at the first target wakeup moment, and listen to the target trigger frame sent by the AP;

determine, based on the received target trigger frame, information that the STA needs to obtain the target resource through contention in a contention mode; and obtain the target resource through contention by using N backoff processes, where N is an integer greater than or equal to 1, one backoff process is corresponding to one beacon frame period, one beacon frame period is corresponding to information about one minimum contention window and one maximum contention window, the minimum contention window and the maximum contention window are two numbers greater than or equal to 0, and the maximum contention window is greater than the minimum contention window; and for the $i^{th}$ backoff process in the N backoff processes, where i is an integer greater than 1 and less than or equal to N, the following operations are performed:

when determining that, in the $(i-1)^{th}$ backoff process, a value of a backoff counter still does not decrease to 0 when the STA receives the first trigger frame in a next beacon frame period of a beacon frame period corresponding to the $(i-1)^{th}$ backoff process, starting, by the STA, the $i^{th}$ backoff process, and updating the value of the backoff counter by using a calculated backoff value corresponding to the $i^{th}$ backoff process, where the value of the backoff counter decreases by 1 when a resource that can be randomly accessed is received; and the backoff value corresponding to the $i^{th}$ backoff process is calculated by using the following formula:

$$Bocurr=\min[Bopre,rand[0,CWO-1]], \text{ where}$$

Bocurr is the backoff value corresponding to the $i^{th}$ backoff process;

Bopre is a value of the backoff counter read when the STA receives the first trigger frame in the next beacon frame period of the beacon frame period corresponding to the $(i-1)^{th}$ backoff process;

CWO is a random integer in a minimum contention window and a maximum contention window that are corresponding to a beacon frame period corresponding to the $i^{th}$ backoff process;

rand[0, CWO−1] represents a random integer between 0 and (CWO−1); and min[Bopre, rand[0, CWO−1]] represents a smaller number in Bopre and rand[0, CWO−1].

A bus architecture may include any quantity of interconnected buses and bridges that are specifically connected by using various circuits of one or more processors represented by a processor and a memory represented by a memory. The bus architecture may also connect various other circuits, such as a peripheral device circuit, a voltage stabilizer circuit, and a power management circuit. This is commonly known in the art. Therefore, this specification does not provide further descriptions. A bus interface provides an interface. The transceiver may be a plurality of elements, that is, may include a transmitter and a transceiver, and provides a unit configured to bidirectionally communicate with various other apparatuses on a transmission medium. The processor is responsible for bus architecture management and general processing. The memory may store data that is used by the processor when the processor performs an operation.

From the foregoing content, it can be learned that, in this embodiment of the present disclosure, when the STA has the data transmission requirement and the AP accepts the data transmission requirement, the AP generates the first indication information, where the first indication information includes the information used to indicate the first target wakeup moment, and the first target wakeup moment is not later than the sending moment of the target trigger frame that the STA needs to listen to next time, and is not earlier than the sending moment of the first beacon frame in the beacon frame period in which the target trigger frame is sent; and the AP sends the first indication information to the STA. Because the first target wakeup moment is not later than the sending moment of the target trigger frame that the STA needs to listen to next time, and is not earlier than the sending moment of the first beacon frame in the beacon frame period in which the target trigger frame is sent, after receiving the first indication information, the STA may enter the power saving mode, and does not listen to a trigger frame or wake up until the first target wakeup moment. In addition, after waking up, the STA does not miss time for listening to the target trigger frame. This reduces energy consumption in a data transmission process.

A person skilled in the art should understand that the embodiments of the present disclosure may be provided as a method or a computer program product. Therefore, the present disclosure may use a form of hardware-only embodiments, software-only embodiments, or embodiments with a combination of software and hardware. Moreover, the present disclosure may use a form of a computer program product that is implemented on one or more computer-usable storage media (including but not limited to a magnetic disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer readable memory that can instruct a computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Although embodiments of the present disclosure have been described, a person skilled in the art may make additional changes and modifications to these embodiments once learning about the basic inventive concepts. Therefore, the appended claims are intended to be interpreted as including the embodiments and all changes and modifications falling within the scope of the present disclosure.

Apparently, a person skilled in the art may make various modifications and variations to the present disclosure without departing from the scope of the present disclosure. The present disclosure is intended to cover these modifications and variations provided that these modifications and variations of the present disclosure fall within the scope of the claims of the present disclosure and equivalent technologies thereof.

What is claimed is:

1. An access point (AP) for data transmission in a wireless local area network, the AP comprising:
    a processor, configured to: generate first indication information when a station (STA) has a data transmission requirement and the AP accepts the data transmission requirement, wherein the first indication information comprises information for indicating a first target wakeup moment, and the first target wakeup moment is not later than a sending moment of a target trigger frame that the STA needs to listen to next time, and is not earlier than a sending moment of a first beacon frame in a beacon frame period in which the target trigger frame is sent, wherein information about the first target wakeup moment is one of the following content: the sending moment of the first beacon frame in the beacon frame period in which the target trigger frame is sent; a sending moment of the first trigger frame comprised in a trigger frame subgroup to which the target trigger frame belongs; the sending moment of the target trigger frame; and the first target wakeup moment; and when determining not to accept the data transmission requirement of the STA, generate second indication information for indicating that the AP does not accept the data transmission requirement of the STA; and
    a transceiver, configured to send the first indication information to the STA.

2. The AP according to claim 1, wherein:
when the first target wakeup moment is the sending moment of the first beacon frame in the beacon frame period in which the target trigger frame is sent, the information for indicating the first target wakeup moment is information capable of indicating a quantity of beacon frame periods between the beacon frame period in which the target trigger frame is sent and a current beacon frame period;
when the first target wakeup moment is the sending moment of the first trigger frame comprised in the trigger frame subgroup to which the target trigger frame belongs, the information for indicating the first target wakeup moment is information capable of indicating a quantity of beacon frame periods between the beacon frame period in which the target trigger frame is sent and a current beacon frame period, and information capable of indicating a subgroup identifier of the trigger frame subgroup to which the target trigger frame belongs; or
when the first target wakeup moment is the sending moment of the target trigger frame, the information for indicating the first target wakeup moment is information capable of indicating a quantity of beacon frame periods between the beacon frame period in which the target trigger frame is sent and a current beacon frame period, information capable of indicating a subgroup identifier of the trigger frame subgroup to which the target trigger frame belongs, and information capable of indicating a location identifier that represents a sequence number of the target trigger frame in the trigger frame subgroup to which the target trigger frame belongs; and
wherein each preset trigger frame in one beacon frame period corresponds to one trigger frame subgroup comprising at least one trigger frame, and all trigger frames comprised in each trigger frame subgroup correspond to one subgroup identifier.

3. The AP according to claim 2, wherein:
when the first target wakeup moment is the sending moment of the first trigger frame comprised in the trigger frame subgroup to which the target trigger frame belongs, if the beacon frame period in which the target trigger frame is sent is the current beacon frame period, the information capable of indicating the quantity of beacon frame periods between the beacon frame period in which the target trigger frame is sent and the current beacon frame period is empty; or
when the first target wakeup moment is the sending moment of the target trigger frame, if the beacon frame period in which the target trigger frame is sent is the current beacon frame period and the trigger frame subgroup to which the target trigger frame belongs is a current trigger frame subgroup, the information capable of indicating the quantity of beacon frame periods between the beacon frame period in which the target trigger frame is sent and the current beacon frame period is empty, and the information capable of indicating the subgroup identifier of the trigger frame subgroup to which the target trigger frame belongs is empty.

4. The AP according to claim 1, wherein:
the first indication information further comprises:
    information for indicating a mode in which the STA obtains a target resource, the target resource for use by the STA after the STA receives the target trigger frame; and
wherein the information for indicating the mode in which the STA obtains the target resource is:
    information for causing the STA to obtain the target resource in a contention mode after receiving the target trigger frame, or
    an identifier of the target resource allocated by the AP to the STA and an identity of the STA, to enable the STA to obtain, in a scheduling mode after receiving the target trigger frame, the target resource corresponding to the identifier of the target resource.

5. The AP according to claim 1, wherein:
the second indication information comprises information for indicating a second target wakeup moment as an invalid value; and the second target wakeup moment is any one of the following content:
the sending moment of the first beacon frame in the beacon frame period in which the target trigger frame is sent,
the sending moment of the first trigger frame comprised in the trigger frame subgroup to which the target trigger frame belongs, and
the sending moment of the target trigger frame.

6. The AP according to claim 5, wherein:
when the second target wakeup moment is the sending moment of the first beacon frame in the beacon frame period in which the target trigger frame is sent, the information for indicating the second target wakeup moment as the invalid value is information that indicates, as an invalid value, the quantity of beacon frame periods between the beacon frame period in which the target trigger frame is sent and the current beacon frame period;
when the second target wakeup moment is the sending moment of the first trigger frame comprised in the trigger frame subgroup to which the target trigger frame belongs, the information for indicating the second target wakeup moment as the invalid value is information that indicates, as an invalid value or a special value, the quantity of beacon frame periods between the beacon frame period in which the target trigger frame is sent and the current beacon frame period, and information that indicates, as an invalid value, the subgroup identifier of the trigger frame subgroup to which the target trigger frame belongs; or
when the second target wakeup moment is the sending moment of the target trigger frame, the information for indicating the second target wakeup moment as the invalid value is information that indicates, as an invalid value or a special value, the quantity of beacon frame periods between the beacon frame period in which the target trigger frame is sent and the current beacon frame period, information that indicates, as an invalid value or a special value, the subgroup identifier of the trigger frame subgroup to which the target trigger frame belongs, and information that indicates, as an invalid value, the location identifier that represents the sequence number of the target trigger frame in the trigger frame subgroup to which the target trigger frame belongs; and
wherein each preset trigger frame in one beacon frame period corresponds to one trigger frame subgroup comprising at least one trigger frame, and all trigger frames comprised in each trigger frame subgroup correspond to one subgroup identifier.

7. The AP according to claim 1, wherein:
the transceiver is further configured to:
send a source trigger frame to the STA, wherein the source trigger frame comprises an identifier of a source resource that is allocated by the AP to the STA for use by the STA when the STA sends a data frame, and the identity of the STA, and
send a negative acknowledgement frame or an acknowledgement frame to the STA; and
the processor is further configured to:
when the data frame transmitted by the STA is not successfully received within specified duration after the source trigger frame is sent, add the second indication information or the first indication information to the negative acknowledgement frame, or
when the data frame transmitted by the STA is successfully received after the source trigger frame is sent, add the second indication information or the first indication information to the acknowledgement frame.

8. The AP according to claim 5, wherein:
the transceiver is further configured to:
receive third indication information that is sent by the STA and that is used to indicate that the STA has the data transmission requirement; and
the processor is configured to:
when the third indication information is successfully received, determine that the STA has the data transmission requirement.

9. A station (STA) for data transmission in a wireless local area network, the STA comprising:
a transceiver, configured to: receive first indication information sent by an access point (AP), wherein the first indication information is generated by the AP when the STA has a data transmission requirement and the AP accepts the data transmission requirement, the first indication information comprises information used to indicate a first target wakeup moment, and the first target wakeup moment is not later than a sending moment of a target trigger frame that the STA needs to listen to next time, and is not earlier than a sending moment of a first beacon frame in a beacon frame period in which the target trigger frame is sent, wherein information about the first target wakeup moment is one of the following content: the sending moment of the first beacon frame in the beacon frame period in which the target trigger frame is sent; a sending moment of the first trigger frame comprised in a trigger frame subgroup to which the target trigger frame belongs; the sending moment of the target trigger frame; and the first target wakeup moment; and receive second indication information sent by the AP for indicating that the AP does not accept the data transmission requirement of the STA, wherein the second indication information is generated by the AP when the AP determines not to accept the data transmission requirement of the STA; and
a processor, configured to make the STA wake up at the first target wakeup moment and listen to the target trigger frame.

10. The STA according to claim 9, wherein:
when the first target wakeup moment is the sending moment of the first beacon frame in the beacon frame period in which the target trigger frame is sent, the information used to indicate the first target wakeup moment is information capable of indicating a quantity of beacon frame periods between the beacon frame period in which the target trigger frame is sent and a current beacon frame period;
when the first target wakeup moment is the sending moment of the first trigger frame comprised in the trigger frame subgroup to which the target trigger frame belongs, the information used to indicate the first target wakeup moment is information capable of indicating a quantity of beacon frame periods between the beacon frame period in which the target trigger frame is sent and a current beacon frame period, and information capable of indicating a subgroup identifier of the trigger frame subgroup to which the target trigger frame belongs; or
when the first target wakeup moment is the sending moment of the target trigger frame, the information used to indicate the first target wakeup moment is information capable of indicating a quantity of beacon frame periods between the beacon frame period in which the target trigger frame is sent and a current beacon frame period, information capable of indicating a subgroup identifier of the trigger frame subgroup to which the target trigger frame belongs, and information capable of indicating a location identifier that represents a sequence number of the target trigger frame in the trigger frame subgroup to which the target trigger frame belongs; and wherein each preset trigger frame in one beacon frame period corresponds to one trigger frame subgroup comprising at least one trigger frame, and all trigger frames comprised in each trigger frame subgroup correspond to one subgroup identifier.

11. The STA according to claim 10, wherein:
when the first target wakeup moment is the sending moment of the first trigger frame comprised in the trigger frame subgroup to which the target trigger frame belongs, if the beacon frame period in which the target trigger frame is sent is the current beacon frame period, the information capable of indicating the quantity of beacon frame periods between the beacon frame period in which the target trigger frame is sent and the current beacon frame period is empty; or
when the first target wakeup moment is the sending moment of the target trigger frame, if the beacon frame period in which the target trigger frame is sent is the current beacon frame period and the trigger frame subgroup to which the target trigger frame belongs is a current trigger frame subgroup, the information capable of indicating the quantity of beacon frame periods between the beacon frame period in which the target trigger frame is sent and the current beacon frame period is empty, and the information capable of indicating the subgroup identifier of the trigger frame subgroup to which the target trigger frame belongs is empty.

12. The STA according to claim 9, wherein:
the first indication information further comprises:
information used to indicate a mode in which the STA obtains a target resource, wherein the target resource is used by the STA after the STA receives the target trigger frame; and
wherein the information used to indicate the mode in which the STA obtains the target resource is:
information that causes the STA to obtain the target resource in a contention mode after receiving the target trigger frame, or
an identifier of the target resource allocated by the AP to the STA and an identity of the STA, so that the STA obtains, in a scheduling mode after receiving the target trigger frame, the target resource corresponding to the identifier of the target resource.

13. The STA according to claim 9, wherein:
the second indication information comprises information that indicates a second target wakeup moment as an invalid value; and
the second target wakeup moment is any one of the following content:
the sending moment of the first beacon frame in the beacon frame period in which the target trigger frame is sent,
the sending moment of the first trigger frame comprised in the trigger frame subgroup to which the target trigger frame belongs, and the sending moment of the target trigger frame.

14. The STA according to claim 13, wherein:
when the second target wakeup moment is the sending moment of the first beacon frame in the beacon frame period in which the target trigger frame is sent, the information that indicates the second target wakeup moment as the invalid value is information that indicates, as an invalid value, the quantity of beacon frame periods between the beacon frame period in which the target trigger frame is sent and the current beacon frame period;
when the second target wakeup moment is the sending moment of the first trigger frame comprised in the trigger frame subgroup to which the target trigger frame belongs, the information that indicates the second target wakeup moment as the invalid value is information that indicates, as an invalid value or a special value, the quantity of beacon frame periods between the beacon frame period in which the target trigger frame is sent and the current beacon frame period, and information that indicates, as an invalid value, the subgroup identifier of the trigger frame subgroup to which the target trigger frame belongs; or
when the second target wakeup moment is the sending moment of the target trigger frame, the information that indicates the second target wakeup moment as the invalid value is information that indicates, as an invalid value or a special value, the quantity of beacon frame periods between the beacon frame period in which the target trigger frame is sent and the current beacon frame period, information that indicates, as an invalid value or a special value, the subgroup identifier of the trigger frame subgroup to which the target trigger frame belongs, and information that indicates, as an invalid value, the location identifier that represents the sequence number of the target trigger frame in the trigger frame subgroup to which the target trigger frame belongs; and
wherein each preset trigger frame in one beacon frame period corresponds to one trigger frame subgroup comprising at least one trigger frame, and all trigger frames comprised in each trigger frame subgroup are corresponding to one subgroup identifier.

15. The STA according to claim 9, wherein the transceiver is further configured to:
receive a source trigger frame sent by the AP, wherein the source trigger frame comprises an identifier of a source resource that is allocated by the AP to the STA and that is used by the STA when the STA sends a data frame, and the identity of the STA;
receive a negative acknowledgement frame sent by the AP; and
send the data frame to the AP by using the source resource corresponding to the identifier of the source resource in the source trigger frame, wherein the negative acknowledgement frame is sent by the AP when the AP does not successfully receive, within specified duration after sending the source trigger frame, the data frame transmitted by the STA, and the negative acknowledgement frame comprises the second indication information or the first indication information.

16. The STA according to claim 9, wherein the transceiver is further configured to:
send, to the AP, third indication information for indicating that the STA has the data transmission requirement to enable the AP to determine, when successfully receiving the third indication information, that the STA has the data transmission requirement.

* * * * *